(12) United States Patent
Iqbal et al.

(10) Patent No.: US 10,298,423 B2
(45) Date of Patent: *May 21, 2019

(54) WIRELESS SC-FDMA COMMUNICATIONS SYSTEM

(71) Applicant: KING FAHD UNIVERSITY OF PETROLEUM AND MINERALS, Dhahran (SA)

(72) Inventors: Naveed Iqbal, Dhahran (SA); Azzedine Zeguine, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/008,882

(22) Filed: Jun. 14, 2018

(65) Prior Publication Data

US 2018/0302250 A1 Oct. 18, 2018

Related U.S. Application Data

(63) Continuation of application No. 15/895,557, filed on Feb. 13, 2018, now Pat. No. 10,110,400, which is a continuation of application No. 14/883,348, filed on Oct. 14, 2015, now Pat. No. 9,992,044.

(60) Provisional application No. 62/167,656, filed on May 28, 2015.

(51) Int. Cl.
*H04B 7/26* (2006.01)
*H04L 1/06* (2006.01)
*H04L 25/03* (2006.01)

(52) U.S. Cl.
CPC ..... *H04L 25/03159* (2013.01); *H04B 7/2621* (2013.01); *H04L 1/0606* (2013.01); *H04L 1/0631* (2013.01); *H04L 25/03057* (2013.01)

(58) Field of Classification Search
CPC ......... H04L 25/03159; H04L 25/03057; H04L 25/03006; H04L 25/03949; H04L 25/03891; H04L 25/03038
See application file for complete search history.

(56) References Cited

U.S. PATENT DOCUMENTS

| | | | |
|---|---|---|---|
| 5,787,118 A * | 7/1998 | Ueda | H04B 7/082 375/232 |
| 7,460,594 B2 | 12/2008 | Yousef | |
| 7,869,497 B2 | 1/2011 | Benvenuto et al. | |
| 8,615,035 B2 | 12/2013 | Wei et al. | |

(Continued)

OTHER PUBLICATIONS

Arablouei, R., et al., "MIMO-DFE Coupled with V-Blast for Adaptive Equalization of Wideband MIMO Channels", 19th European Signal Processing Conference (EUSIPCO 2011), pp. 639-643, (Aug. 29-Sep. 2, 2011).

(Continued)

*Primary Examiner* — Omer S Mian
(74) *Attorney, Agent, or Firm* — Oblon, McClelland, Maier & Neustadt, L.L.P.

(57) ABSTRACT

A device includes circuitry configured to determine feedforward and feedback coefficients for an adaptive frequency-domain decision feedback equalizer (AFD-DFE) based on previously received signals. The equalizer output is determined by applying the feedforward and feedback coefficients of the AFD-DFE to a received signal, and the feedforward and feedback coefficients of the AFD-DFE are updated based on the equalizer output.

7 Claims, 28 Drawing Sheets

(56) References Cited

U.S. PATENT DOCUMENTS

| | | | | |
|---|---|---|---|---|
| 2004/0001538 A1* | 1/2004 | Garrett | .............. | H04L 25/03057 |
| | | | | 375/229 |
| 2004/0008765 A1* | 1/2004 | Chung | ................. | H03G 3/3052 |
| | | | | 375/233 |
| 2006/0029149 A1 | 2/2006 | Kim et al. | | |
| 2006/0121946 A1* | 6/2006 | Walton | ................. | H04B 7/0417 |
| | | | | 455/561 |
| 2008/0037621 A1* | 2/2008 | Higure | ................. | H04L 25/0307 |
| | | | | 375/231 |
| 2010/0177817 A1* | 7/2010 | Dong | ................ | H04L 25/03038 |
| | | | | 375/233 |
| 2014/0179334 A1* | 6/2014 | Forenza | ................. | H04B 7/024 |
| | | | | 455/452.2 |
| 2015/0163517 A1* | 6/2015 | Mun | ....................... | H04L 29/00 |
| | | | | 375/240.27 |

OTHER PUBLICATIONS

Ueng, F. B., et al., "MIMO receivers for SFBC SC-FDMA communication systems", URL: http://ieeexplore.ieee.org/xpl/articleDetails.jsp?tp=&arnumber=6582856&queryText%3DSC-FDMA+Uplink+Block+Transmission, Total 1 Page, (Apr. 16-19, 2013).

\* cited by examiner

WIRELESS SC-FDMA COMMUNICATIONS SYSTEM

CROSS-REFERENCE TO RELATED APPLICATIONS

The present application is a Continuation of 15/895,557, having a filing date of Feb. 13, 2018, now allowed, which is a Continuation of 14/883,348, having a filing date of Oct. 14, 2015, now allowed, which claims benefit of the filing date of U.S. Provisional Application No. 62/167,656, having a filing date of May 28, 2015, incorporated herein by reference in its entirety.

BACKGROUND

Technical Field

The present disclosure relates to equalization of Single-Carrier Frequency Division Multiple Access) SC-FDMA signals via adaptive frequency-domain decision feedback equalizers (AFD-DFEs).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Orthogonal Frequency Domain Multiple Access (OFDMA) is a multiple access technique which has been adopted in many standards like ETSI DVB-RCT as described in European Telecommunications Standards Institute (ETSI), "Digital video broadcating (DVB); Interaction channel for Digital Terrestrial Television (RCT) Incorporating Multiple Access OFDMA," *ETSI EN*301 958, vol. 1.1.1, 2002, D. Prendergast, B. Caron, and Y. Wu, "The Implementation of a Return Channel for ATSC-DTV," *IEEE Transactions on Broadcasting*, vol. 53, pp. 521-529, June 2007, WiFi as described in IEEE Std 802.11-2007, "IEEE Standard for Information technology-Local and metropolitan area networks—Part 11: Wireless LAN Medium Access Control (MAC) and Physical Layer (PHY) Specifications," 2007, and WiMAX as described in IEEE Std 802.16-2009, "IEEE Standard for Local and metropolitan area networks— Part 16: Air Interface for Fixed and Mobile Broadband Wireless Access Systems," 2009.

Single-Carrier Frequency Division Multiple Access (SC-FDMA) is a multiple access technique which has been adopted in wireless broadband communication systems such as the Long Term Evolution (LTE) standard described in 3GPP, "Physical Channels and Modulation," *ETSI TS* 136.211 V10.0.0, 2011. SC-FDMA has comparable complexity and performance to that of the Orthogonal Frequency Division Multiple Access (OFDMA) as described in Q. Wang, C. Yuan, J. Zhang, and Y. Li, "Frequency Domain Soft-Decision Feedback Equalization for SC-FDMA with Insufficient Cyclic Prefix," *International Journal of Computer Science (IJCSI)*, vol. 9, no. 6, pp. 103-108, 2012, but with an additional benefit of having a low Peak Average Power Ratio (PAPR), which helps in reducing power consumption and increasing battery life in mobile terminals.

SC-FDMA is selected as a standard technique for the uplink LTE. The sensitivity analysis of SC-FDMA is reported in K. Raghunath and A. Chockalingam, "SC-FDMA Versus OFDMA: Sensitivity to Large Carrier Frequency and Timing Offsets on the Uplink," *IEEE Global Telecommunications Conference (GLOBECOM)*, pp. 1-6, November 2009, and it can be shown that for large Carrier Frequency Offset (CFO) the performance of SC-FDMA can get worse than OFDMA.

The use of the Frequency-Domain Linear Equalizer (FD-LE) in SC-FDMA may not be effective for frequency-selective fading channels with spectral nulls which result in significant noise enhancement. The Frequency-Domain Decision Feedback Equalizer (FD-DFE) may be a more attractive solution when dealing with these kind of scenarios.

SUMMARY

In an exemplary embodiment, a device includes circuitry configured to determine feedforward and feedback coefficients for an adaptive frequency-domain decision feedback equalizer (AFD-DFE) based on previously received signals. The equalizer output is determined by applying the feedforward and feedback coefficients of the AFD-DFE to a received signal, and the feedforward and feedback coefficients of the AFD-DFE are updated based on the equalizer output.

In another exemplary embodiment, a method includes determining, via circuitry, feedforward and feedback coefficients for an adaptive frequency-domain decision feedback equalizer (AFD-DFE) based on previously received signals, determining, via the circuitry, an equalizer output by applying the feedforward and feedback coefficients of the AFD-DFE to a received signal, and updating, via the circuitry, the feedforward and feedback coefficients of the AFD-DFE based on the equalizer output.

In another exemplary embodiment, a system includes a transmitter configured to transmit a signal through a channel; a receiver configured to receive the signal; and circuitry configured to determine feedforward and feedback coefficients for an adaptive frequency-domain decision feedback equalizer (AFD-DFE) based on previously received signals, determine an equalizer output by applying the feedforward and feedback coefficients of the AFD-DFE to a received signal, and update the feedforward and feedback coefficients of the AFD-DFE based on the equalizer output.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
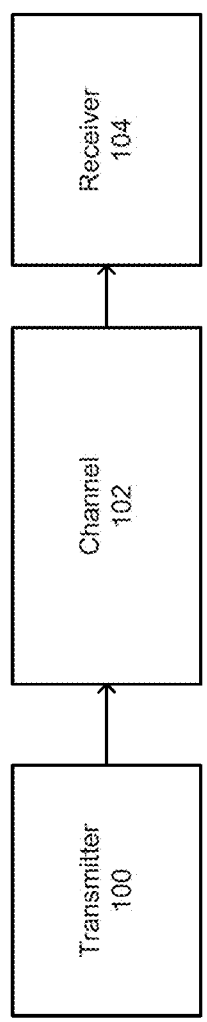
FIG. 1A is a schematic diagram of a communication system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to an Adaptive Frequency Domain Decision Feedback Equalization (AFD-DFE) designed for a SC-FDMA system. In certain embodiments, designing an adaptive hybrid DFE can be computationally prohibitive due to involvement of both time and frequency-domain signals. Therefore, the adaptive DFE algorithm described herein employs both frequency-domain feedforward and feedback filters. The block RLS algorithm, as described in A. H. Sayed, Fundamentals of Adaptive Filtering. New york: Wiley, 2003, the entire contents of which is herein incorporated by reference, is used to update both the feedforward and feedback filters due to tracking/convergence properties but can be computationally complex due to the matrix inversion operations. Through the embodiments described herein, the structure of the matrices used in performing the block RLS algorithm can reduce the computational complexity. In addition, the design of the AFD-DFE described herein can be extended to SFBC SC-FDMA, Spatially-Multiplexed (SM) SC-FDMA and hybrid SM-SFBC SC-FDMA systems. The AFD-DFE in SC-FDMA can be more complicated in some implementations when compared to an AFD linear equalizer (AFD-LE) due to iterative procedures. However, SC-FDMA transmissions may be confined to the uplink, where processing is done at a Base Station (BS), which may have fewer power limitations than user terminals. In addition, the AFD-DFE implementations described herein may not depend on the subcarrier mapping techniques in SC-FDMA. In addition, the AFD-DFE described herein can be more computationally efficient than a channel-estimate-based DFE, as described in C. Zhang, Z. Wang, Z. Yang, J. Wang, and J. Song, "Frequency Domain Decision Feedback Equalization for Uplink SC-FDMA," *IEEE Transactions on Broadcasting*, vol. 56, pp. 253-257, June 2010, the contents of which are incorporated herein by reference. It can also be demonstrated that the AFD-DFE has improved performance compared to the LE and LMS-based approaches because the AFD-DFE is robust to Inter-carrier Interference (ICI) caused by high Doppler and CFO.

In SC-FDMA, equalization is performed after transforming the received signal from the time-domain to the frequency-domain using the Discrete Fourier Transform (DFT). A linear equalizer (LE) can be adopted in SC-FDMA but for severe frequency-selective fading channels, in which spectral nulls are present, the LE may not be effective as the noise in these spectral nulls can be amplified which can cause performance degradation. Therefore, a DFE may be a more attractive solution.

To improve reliability at the user terminal, a transmit diversity is employed in LTE-Advanced (LTE-A), as described in "Technical specification group radio access Network," *LTE-A transmit diversity schemes for PUCCH format 1/1a/b, RI-092340*, 2009, the contents of which are incorporated by reference in their entirety. In addition, other diversity techniques can combat multi-path fading. For example, a transmit diversity scheme with two antennas was proposed by Alamout, as described by S. Alamouti, "A simple transmit diversity technique for wireless communications," *IEEE Journal on Selected Areas in Communica-* tions, vol. 16, no. 8, pp. 1451-1458, 1998, the contents of which are incorporated by reference in their entirety. Although the overall throughput is not increased, the Alamouti technique has features which can be implemented. For example, the Alamouti technique is an open loop technique, which means that Channel State Information (CSI) may not be required at the transmitter, encoding and decoding complexity is reduced due to linear processing at the terminals, and overall complexity is reduced. Furthermore, the Alamouti technique achieves full spatial diversity gain at rate 1 (since two symbol are transmitted in two time slots) and failure of one antenna chain does not result in data loss, so the Alamouti technique is compatible with single antenna systems.

The scheme proposed by Alamouti is a special case of Space Time Block Codes (STBC), as described in V. Tarokh, H. Jafarkhani, and A. Calderbank, "Space-time block codes from orthogonal designs," *IEEE Transactions on Information Theory*, vol. 45, pp. 1456-1467, July 1999, the contents of which are incorporated by reference in their entirety. Alamouti's STBC can be applied to the 3GPP LTE uplink over two SC-FDMA symbols and two transmit antennas. Due to single carrier transmission from both antennas, the low PAPR property of SC-FDMA may not be affected by signs and/or the complex-conjugate operation. Unfortunately, STBC cannot be used in SC-FDMA because for STBC, the encoding is done in pairs, therefore, the frames in SC-FDMA include an even number of SC-FDMA symbols, which may not be guaranteed in LTE systems (referred to as the orphan symbol problem). In some examples, the frames contain an odd number of SC-FDMA symbols. Moreover, in STBC it can be assumed that the channel remains constant for two SC-FDMA symbols, which may not be valid in cases of fast varying channels, which can result in performance degradation.

An alternative scheme to STBC is Space-Frequency Block Codes (SFBC), as described in K. Lee and D. Williams, "A space-frequency transmitter diversity technique for OFDM systems," *IEEE. Global Telecommunications Conference (Globecom)*, vol. 3, pp. 1473-1477, 2000, the contents of which are incorporated by reference in their entirety. SFBC is applied within each M-point DFT block. Therefore, SFBC may not suffer from the orphan symbol problem faced by STBC when used in SC-FDMA and the number of symbols in each frame may not be restricted to an even number. As SFBC is applied to each SC-FDMA symbol, the size of the block is even which may be guaranteed in LTE systems. However, one drawback of SFBC is that the low PAPR property is affected due to frequency inversions between successive subcarriers as described in C. Ciochina, D. Castelain, D. Mottier, and H. Sari, "A Novel Space-Frequency Coding Scheme for Single Carrier Modulations," *IEEE 18th International Symposium on Personal, Indoor and Mobile Radio Communications*, pp. 1-5, September 2007, the contents of which are incorporated by reference in their entirety. Therefore, a scheme is proposed in Alcatel Shanghai Bell Alcatel-Lucent, "STBC-II scheme with non-paired symbols for LTE-Advanced uplink transmit diversity," in *R*1-090058, 3*GPP TSG RAN WG* 1 *Meeting* #55 *bis,* 2008, the contents of which are incorporated by reference in their entirety, in order to tackle the orphan symbol problem. For example, spatial repetition is used on odd symbols and STBC is applied on even symbols, which cannot achieve full diversity, and performance degrades at high Signal-to-Noise Ratios (SNR). In W. Y. Lim and Z. Lei, "Space-time block code design for single-carrier frequency division multiple access," *IEEE* 20th *International Sympo-* *sium on Personal, Indoor and Mobile Radio Communications*, pp. 516-520, September 2009, the contents of which are incorporated by reference in their entirety, another approach is presented to avoid the orphan symbol problem by applying the STBC before the M-point DFT. However, in some channels performance may not be satisfactory, especially at high SNR. In certain embodiments described herein, conventional SFBC is used.

In D. Falconer, S. Ariyavisitakul, A. Benyamin-Seeyar, and B. Eidson, "Frequency domain equalization for single-carrier broadband wireless systems," *IEEE Communications Magazine*, vol. 40, pp. 58-66, April 2002, the contents of which are incorporated by reference in their entirety, N. Benvenuto and S. Tomasin, "On the comparison between OFDM and single carrier modulation with a DFE using a frequency-domain feedforward filter," *IEEE Transactions on Communications*, vol. 50, pp. 947-955, June 2002, the contents of which are incorporated by reference in their entirety, and H. Witschnig, M. Kemptner, R. Weigel, and A. Springer, "Decision feedback equalization for a single carrier system with frequency domain equalization—an overall system approach," 1*st International Symposium on Wireless Communication Systems*, pp. 26-30, 2004, the contents of which are incorporated by reference in their entirety, a hybrid DFE structure is used for Single Carrier Frequency-Domain Equalization (SC-FDE) systems to perform equalization in the frequency-domain. In hybrid DFE, the feedforward filter is implemented in the frequency-domain while the feedback filter is realized in the time-domain. Due to frequency-domain implementation of the feedforward filter, there can be a reduction in complexity in a hybrid DFE as compared to a time-domain counterpart. In G. Huang, A. Nix, and S. Armour, "Decision feedback equalization in SC-FDMA," 19*th IEEE International Symposium on Personal, Indoor and Mobile Radio Communications*, pp. 1-5, September 2008, the contents of which are incorporated by reference in their entirety, a hybrid DFE is developed for SC-FDMA to be applied for each user individually. In N. Benvenuto and S. Tomasin, "Iterative Design and Detection of a DFE in the Frequency Domain," *IEEE Transactions on Communications*, vol. 53, pp. 1867-1875, November 2005, the contents of which are incorporated by reference in their entirety, both the feedforward and feedback filters are implemented in the frequency-domain and an iterative procedure is used to solve the causality problem.

The complexity of a DFE with both filters implemented in the frequency-domain is reduced as compared to the hybrid DFE. In C. Zhang, Z. Wang, Z. Yang, J. Wang, and J. Song, "Frequency Domain Decision Feedback Equalization for Uplink SC-FDMA," *IEEE Transactions on Broadcasting*, vol. 56, pp. 253-257, June 2010, the contents of which are incorporated by reference in their entirety, a framework is proposed to compute the optimum weights of the frequency-domain DFE for SC-FDMA systems and it was shown that its performance is better than the Frequency Domain LE (FD-LE) in frequency selective channels. All of the above mentioned DFE structures are non-adaptive and may require CSI at the receiver.

As equalization in SC-FDMA requires CSI, which is estimated from pilot symbols inserted in each block of data and optimum equalization is used to remove channel effects. Alternatively, an adaptive equalizer can be used which does not rely on CSI estimation and, hence, the channel estimation overhead will be reduced. Moreover, an adaptive equalizer can also help in tracking time varying channels. An adaptive LE for STBC SC-FDE system is developed and extended for multiuser scenarios in W. Younis, A. Sayed, and N. Al-Dhahir, "Efficient adaptive receivers for joint equalization and interference cancellation in multiuser space-time block-coded systems," *IEEE Transactions on Signal Processing*, vol. 51, pp. 2849-2862, November 2003, the contents of which are incorporated by reference in their entirety.

Constraint-based algorithms help in achieving the better performance by putting some condition on the behavior of the algorithm. There are several examples of the constraint-based algorithms like normalized LMS, as described in D. Slock, "On the convergence behavior of the LMS and the normalized LMS algorithms," *IEEE Transactions on Signal Processing*, vol. 41, no. 9, pp. 2811-2825, 1993, the contents of which are incorporated by reference in their entirety, noise constraint LMS, as described in S. Gelfand and J. Krogmeier, "Noise-constrained least mean squares algorithm," *IEEE Transactions on Signal Processing*, vol. 49, no. 9, pp. 1961-1970, 2001, the contents of which are incorporated by reference in their entirety, $l_0$ norm constraint LMS, as described in Y. Gu, J. Jin, and S. Mei, "l0 Norm Constraint LMS Algorithm for Sparse System Identification," *IEEE Signal Processing Letters*, vol. 16, pp. 774-777, September 2009, the contents of which are incorporated by reference in their entirety, and noise-constraint diffusion LMS, as described in M. O. Bin Saeed, A. Zerguine, and S. A. Zummo, "A noise-constrained algorithm for estimation over distributed networks," *International Journal of Adaptive Control and Signal Processing*, pp. 827-845, October 2012, the contents of which are incorporated by reference in their entirety, and the like. In a time-domain DFE, the previous decisions are fed back but not the present not the present decision. To ensure that the present symbol is not canceled out, the feedback filter coefficient corresponding to that symbol is set to zero. In certain embodiments described herein, the frequency-domain version of DFE is used, therefore, to make sure that the present symbol is not canceled out in the feedback loop, and the equalizer is constrained to follow this action in order to enhance performance.

FIG. 1A is a schematic diagram of a communication system, according to certain embodiments. The communication system may include a transmitter 100 and a receiver 104. Data between the transmitter 100 and the receiver 104 is transmitted via communication channel 102. The transmitter 100 may be any electronic subsystem that produces a modulated signal. The receiver 104 obtains input samples via the communication channel 102 and performs equalization on the input samples to obtain block estimates, which are estimates of transmit blocks (transmitted by the transmitter 100). A data block may be also called a packet, a frame, and the like.

Figure 1B:
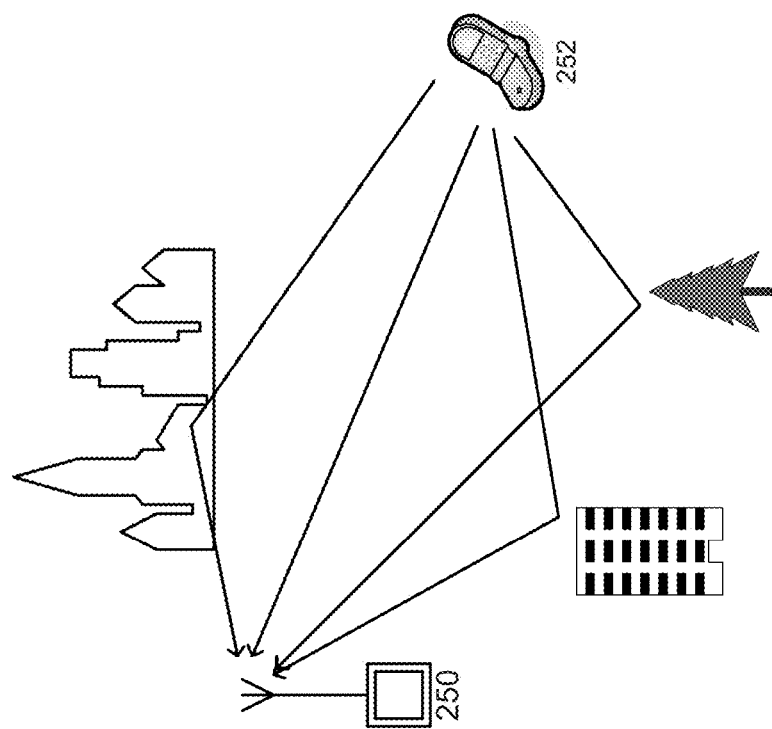
FIG. 1B is a schematic diagram that shows a transmission from a wireless device to a base station, according to certain embodiments.

FIG. 1B is a schematic diagram that shows a transmission from a wireless device to a base station, according to certain embodiments. FIG. 1B shows a base station 250 and a wireless device 252. In an uplink transmission system, the transmitter 100 is part of the wireless device 252 and the receiver 104 is part of the base station 250. In other embodiments, the transmitter 100 may be part of the base station 250, and the receiver 104 is part of the wireless device 252. The base station 250 is typically a fixed station that communicates with the wireless devices 100. The wireless device 252 may be fixed or mobile. The wireless device 252 may be a cellular phone, a personal digital assistant (PDA), a wireless modem card, or the like. The wireless device 252 may transmit a signal to the base station 250. The signal may be a radio frequency (RF) signal. The signal may reach the base station 250 is one or more signal paths as shown in FIG. 1B. The signals may include a direct path and reflected paths. The reflected paths may be created by reflections from obstacles such as trees, buildings, or other structures. A received RF signal at the base station 250 is a superposition of all received signals at the base station 250.

Figure 1C:
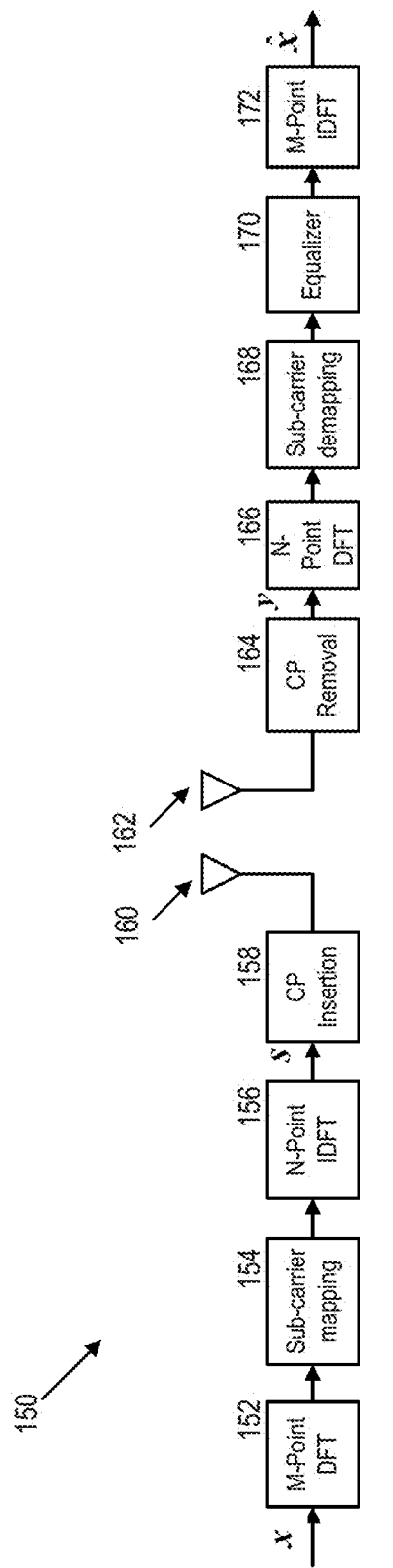
FIG. 1C is an exemplary block diagram of a transceiver of a SC-FDMA system, according to certain embodiments.

FIG. 1C is an exemplary block diagram of a transceiver 150 of a SC-FDMA system, according to certain embodiments. The transceiver 150 includes processing circuitry configured to execute the processes described further herein. The transceiver 150 can be applied to localized and interleaved sub-carrier mapping methods. In some implementations, K users and M sub-carriers for each user result in a total of N sub-carriers, according to N=KM. For the $m^{th}$ user, M data symbols are grouped to form a signal block x(m), i.e., $x^{(m)}=[x(0)^{(m)};\ x(1)^{(m)};\ \ldots\ ;\ x(M-1)^{(m)}]^T$, where T denotes the transpose operation. An M-point DFT module 152 applies the M-point DFT to the signal block to transform the signal block $x^{(m)}$ to the frequency-domain symbol, $X^{(m)}=[X(0)^{(m)};\ X(1)^{(m)};\ \ldots\ ;\ X(M-1)^{(m)}]^T$.

At subcarrier mapping stage 154, the frequency-domain symbol $X^{(m)}$ is mapped to N sub-carriers with one or more mapping techniques, such that $$S^m = R^m X^m, m=1,2,\ldots,K \qquad (1)$$

where, $R^{(m)}$ can be an N×M resource allocation matrix for the $m^{th}$ user. For a localized mapping schemes, $R^{(m)}=[0_{M\times(k-1)M} I_M 0_{M\times(K-k)M}]$, where $I_M$ is M×M identity matrix with columns $I_1; I_2; \ldots ; I_M$, and $0_{M\times M}$ is M×M all zero matrix. In addition, $R^{(m)}$ can be orthogonal for the users, which can be defined by $$R^{(m)T} R^{(l)} = \begin{cases} I_M, & m=l \\ 0_{M\times M}, & m\neq l \end{cases}.$$

At the N-point Inverse DFT (IDFT) module 156, the block $S^{(m)}$ is transformed to the time domain, $s^{(m)}$, by applying an N-point IDFT according to the equation $$s^{(m)} = F_N^H R^{(m)} F_M x^{(m)} = F_N^H R^{(m)} X^{(m)} \qquad (2)$$

Where $F_N$ is an N×N DFT matrix and H denotes the Hermitian (i.e., complex-conjugate transpose) operation. At cycle prefix (CP) insertion module 158, a CP of length $L_{CP}$ is inserted into the signal, $s^{(m)}$. According to some implementations, the CP matrix can be defined a $$C_1 = \begin{bmatrix} 0_{L_{CP}\times(N-L_{CP})} & I_{L_{CP}} \\ I_N \end{bmatrix} \qquad (3)$$

The transmit signal is formed by converting the signal $s_{CP}^{(m)}$ from parallel to serial, such that $s_{CP}^{(m)} = C_1 s^{(m)}$. The impulse response of the channel for the $m^{th}$ user is denoted by $h^{(m)}=[h_0^{(m)}, h_1^{(m)}, \ldots, h_{L(m)}^{(m)}]$. In order to eliminate inter-symbol interference (ISI) from the cycle prefix, L(m) is shorter in length than $L_{CP}$. The transmit signal can be transmitted across a channel via transmitter 160 and received at receiver 162.

At CP removal module 164, the processing circuitry removes the CP from the received signal. The CP insertion at the transmitter 160 and removal at the receiver 162 can be expressed as a circular convolution between the transmitted signal and the channel vectors. For example, the received signal after CP removal can be expressed as $$y = \Sigma_{m=1}^K s^{(m)} \circledast h^{(m)} + n^{(m)} \qquad (4)$$

where ⊛ denotes the N-point circular convolution operation, and $n^{(m)}$ is a noise vector.

An N-point DFT is applied to the received signal at N-point DFT module 166 to transform the received signal into the frequency-domain and can be expressed as $$\acute{Y}=\Sigma_{m=1}^{K}\hat{\Lambda}^{(m)}R^{(m)}X^{(m)}+N \quad (5)$$

Where $\hat{\Lambda}^{(m)}$ is a N×N diagonal matrix including the DFT of $h^{(m)}$ as diagonal elements, N is noise vector due to $\Sigma_{m=1}^{K}n^{(m)}$ with variance of $\sigma_N^2 I_N$.

Then, the signal is provided to a subcarrier de-mapping module 168. After de-mapping, the $m^{th}$ user's received signal can be expressed as $$Y^{(m)}=R^{(m)T}\hat{\Lambda}^{(m)}R^{(m)}X^{(m)}+N^{(m)} \quad (6)$$

In addition, if $\Lambda^{(m)}=R^{(m)T}\hat{\Lambda}^{(m)}R^{(m)}$, then $\Lambda(m)$ is a M×M diagonal matrix, and simplifying the notation without the loss of generality by omitting the superscript m, equation (6) becomes $$Y=\Lambda X+N \quad (7)$$

The signal is then provided to an equalizer 170. In one implementation, the equalizer 120 can be a linear equalizer (LE), and in other implementations, the equalizer 120 is a decision feedback equalizer (DFE) that includes feedforward and feedback filters. For an AFD-DFE for SISO (Single-Input Single-Output)SC-FDMA systems, let Z=diag(Y) and denote the feedforward and feedback filter coefficients in the frequency-domain as F and B, respectively. The output of the equalizer in the frequency-domain at instant k is given by $$\acute{x}_k=Z_k F_{k-1}+D_k B_{k-1} \quad (8)$$

The coefficients of the feedforward and feedback filters can be expressed as F(0), F(1), ..., F(M−1) and B(0), B(1), ..., B(M−1), respectively. Explicit knowledge of the filter coefficients may not be needed for development of the adaptive solution. The decision matrix $D_k$ is defined as $$D_k = \begin{cases} diag(F_M(x_k)) & \text{for training} \\ diag(F_M(\hat{x}_k)) & \text{for decision-directed} \end{cases}$$

The weight vector of the linear equalizer (LE) can be denoted by $$W_k = \begin{bmatrix} F_K \\ B_k \end{bmatrix},$$

equation (8) can be expressed as $$\acute{x}_k=[Z_k D_k]W_{k-1} \quad (9)$$

Hence, the output of the equalizer in the time domain is $\acute{x}_k=F_M^H \acute{x}_k$. Implementations of the equalizer 170 as an adaptive frequency-domain decision feedback equalizer (AFD-DFE) are discussed further herein.

The output of the equalizer 170 is fed to a M-point IDFT module 172 where the equalized symbols are transformed back to the time domain via IDFT. Detection and decoding can take place in the time domain.

According to certain embodiments, the AFD-DFE for SISO SC-FDMA systems uses a recursive least squares (RLS)-based implementation. In some implementations, a constraint can be applied to formulate a constraint-based least squares solution for DFE taps to be used in SC-FDMA systems, which can be referred to as recursive least squares with constraint (CRLS), which can help improve performance of the system. The constraint can be used to cancel out pre and post cursers but not the desired components of the signal. In the embodiments described herein, the constraint applied is described in N. Benvenuto and S. Tomasin, "Iterative Design and Detection of a DFE in the Frequency Domain," *IEEE Transactions on Communications*, vol. 53, pp. 1867-1875, November 2005, the contents of which are incorporated by reference in their entirety. For example, the feedback filter weights in the time-domain may be $b_0$, $b_1$, ..., $b_L$. The filter weight $b_0$ that corresponds to the current symbol can be set to zero so that the current filter weight is not provided as feedback. In frequency-domain, this constraint can be translated to $\Sigma_{i=0}^{M-1}B(i)=0$. In other implementations, the RLS approach to the AFE-DFE can also be applied to SC-FDMA systems without the use of constraints.

Derivations of AFD-DFE algorithms are described further herein, according to certain embodiments. In one embodiment, the frequency-domain RLS AFD-DFE can be developed from a least squares problem, which is referred to throughout the disclosure as Case 1 of the RLS AFD-DFE. For example, k+1 realizations of the matrices {Z, D} are available and collected as $$\Pi = \begin{bmatrix} Z_0 & D_0 \\ Z_1 & D_1 \\ \vdots & \vdots \\ Z_k & D_k \end{bmatrix} \quad (10)$$

and $$\acute{D} = \begin{bmatrix} D_0 \\ D_1 \\ \vdots \\ D_k \end{bmatrix} \quad (11)$$

where $[D_k(0); D(1); ...; D(M-1)]^T$ is a vector having the diagonal elements of $D_k$. First, a combined cost function of the feedforward and feedback filters is minimized according to $$\min_W \|\acute{D}-\Pi W\|^2 \text{ subject to } \Sigma_{i=0}^{M-1}B(i)=0 \quad (12)$$

where the notation $\|.\|^2$ denotes the squared Euclidean norm of its argument. To solve the optimization problem, the Lagrange multiplier method is used for a case of complex valued data. According to the Lagrange multiplier method, the objective function has two terms, given on the right side of the equation $$J=\|\acute{D}-\Pi W\|^2+2Re\{\alpha^* \Sigma_{i=0}^{M-1}B(i)\} \quad (13)$$

where α is complex valued Lagrange multiplier and asterisk denotes complex conjugation. Since the square of Euclidean norm $\|\acute{D}-\acute{X}\|^2$ is a real-valued function, the real part operator, Re{.}, is applied to the second term of equation (13) to ensure that the contribution to the objective function is real-valued. The objective function, J, is quadratic, as shown by expanding equation (13) into $$J=\acute{D}^H \acute{D}-\acute{D}^H \Pi W-W^H \Pi^H \Pi W+2Re\{\alpha^* GW\} \quad (14)$$

The objective function J is differentiated with respect to the weight vector W to find the least squares solution For example, the real-valued function J is differentiated with respect to the complex-valued vector W to achieve $$\frac{\partial J}{\partial W} = -D\acute{\Pi} + W^H \Pi^H \Pi + \alpha^* G \qquad (15)$$

where $G=[0_{1\times M} \; 1_{1\times M}]$ with $0_{1\times M}$ as an all zeros row vector and $1_{1\times M}$ as an all ones row vector of size M. The final solution of equation (15) then becomes $$W = (\Pi^H \Pi)^{-1}(\Pi^H \acute{D} - \mathcal{G}) \qquad (16)$$

Where $\mathcal{G} = \alpha G^T$.

The least squares solution of equation (16) can be updated recursively, according to certain embodiments. The time updated least squares problem can be represented as $$\min_W \|\acute{D}_{k+1} - \Pi_{k+1} W\|^2 \text{ subject to } \Sigma_{i=0}^{M-1} B(i) = 0 \qquad (17)$$

which has the following solution:

$$W_{k+1} = (\Pi_{k+1}^H \Pi_{k+1})^{-1}(\Pi_{k+1}^H \acute{D}_{k+1} - \mathcal{G}_{k+1}) \qquad (18)$$

To develop an update scheme for the least squares solution (18), $\Pi_{k+1}$ and $\acute{D}_{k+1}$ can be written as $$\Pi_{k+1} = \begin{bmatrix} \Pi_k \\ \Pi_{k+1} \end{bmatrix} \qquad (19)$$

and $$\acute{D}_{k+1} = \begin{bmatrix} \acute{D}_k \\ \acute{D}_{k+1} \end{bmatrix} \qquad (20)$$

In addition, $$\Pi_{k+1}^H \Pi_{k+1} = \Pi_k^H \Pi_k + [Z_{k+1} D_{k+1}]^H [Z_{k+1} D_{k+1}] \qquad (21)$$

and $$\Pi_{k+1}^H \acute{D}_{k+1} - \mathcal{G}_{k+1} = \Pi_k^H \acute{D}_k - \mathcal{G}_k + [Z_{k+1} D_{k+1}]^H \acute{D}_{k+1} - \alpha_{k+1} G^T \qquad (22)$$

Also, the following matrix can be introduced $$\mathcal{P}_{k+1} = (\Pi_{k+1}^H \Pi_{k+1})^{-1} \qquad (23)$$

So that equation (18) can be written more compactly as $$W_{k+1} = \mathcal{P}_{k+1}(\Pi_{k+1}^H \acute{D}_{k+1} - \mathcal{G}_{k+1}) \qquad (24)$$

By substituting equation (21) into equation (23), the result is $$\mathcal{P}_{k+1} = (\Pi_k^H \Pi_k + [Z_{k+1} D_{k+1}]^H [Z_{k+1} D_{k+1}])^{-1} \qquad (25)$$

and $$\mathcal{P}_{k+1}^{-1} = \mathcal{P}_k^{-1} + [Z_{k+1} D_{k+1}]^H [Z_{k+1} D_{k+1}] \qquad (26)$$

By applying a matrix inversion identity, $$\mathcal{P}_{k+1} = \mathcal{P}_k - \mathcal{P}_k [Z_{k+1} D_{k+1}]^H \beta [Z_{k+1} D_{k+1}] \mathcal{P}_k \qquad (27)$$

where $\beta = (I_M + [Z_{k+1} \; D_{k+1}]\mathcal{P}_k[Z_{k+1} \; D_{k+1}]^H)^{-1}$. Equations (27) and (22) can be substituted into equation (24), resulting in $$W_{k+1} = (\mathcal{P}_k - \mathcal{P}_k [Z_{k+1} \; D_{k+1}]^H \beta [Z_{k+1} \; D_{k+1}] P_k)(\Pi_k^H \acute{D}_k - \qquad (28)$$
$$\mathcal{G}_k + [Z_{k+1} \; D_{k+1}]' \acute{D}_{k+1} - \alpha_{k+1} G^T)$$
$$= \mathcal{P}_k \Pi_k^H \acute{D}_k - \mathcal{P}_k \mathcal{G}_k -$$
$$\left( P_k[Z_{k+1} \; D_{k+1}]^H \beta [Z_{k+1} \; D_{k+1}] \mathcal{P}_k \left( \Pi_k^H \acute{D}_k - \mathcal{G}_k \right) + \right.$$
$$\mathcal{P}_k[Z_{k+1} \; D_{k+1}]^H (I_M -$$
$$\left. \beta [Z_{k+1} \; D_{k+1}] \mathcal{P}_k [Z_{k+1} \; D_{k+1}]^H \right) D_{k+1} - \mathcal{P}_{k+1}(\alpha_{k+1} G^T)$$

After rearranging, equation (28) becomes $$W_{k+1} = W_k + (\mathcal{P}_k[Z_{k+1} \; D_{k+1}]^H \beta)(D_{k+1} - \qquad (29)$$
$$[Z_{k+1} \; D_{k+1}]W_k) - \mathcal{P}_{k+1}(\alpha_{k+1} G^T)$$
$$= W_k + \mathcal{P}_{k+1}[Z_{k+1} \; D_{k+1}]^H (D_{k+1} -$$
$$[Z_{k+1} \; D_{k+1}]W_k) - \mathcal{P}_{k+1}(\alpha_{k+1} G^T)$$

In addition, $$\mathcal{P}_{k+1}[Z_{k+1} D_{k+1}]^H = (\mathcal{P}_k[Z_{k+1} D_{k+1}]^H \beta) \qquad (30)$$

Finally, the weight vector update equation becomes $$W_{k+1} = \mathcal{P}_{k+1}([Z_{k+1} D_{k+1}]^H (D_{k+1} - [Z_{k+1} D_{k+1}]W_k) - \qquad (31)$$
$$\alpha_{k+1} G^T)$$

If an exponentially-weighted RLS algorithm is used, then equation (27) becomes $$\mathcal{P}_{k+1} = \lambda^{-1}[\mathcal{P}_k - \lambda^{-1} \mathcal{P}_k[Z_{k+1}D_{k+1}]^H \beta [Z_{k+1} \qquad (32)$$
$$D_{k+1}]\mathcal{P}_k]$$

where $0 \ll \lambda < 1$. The multiplier $\alpha_{k+1}$ can be updated according to a stochastic gradient method as $$\alpha_{k+1} = \alpha_k + \mu \left(\frac{\partial J}{\partial \alpha}\right)_k^* \qquad (33)$$

Differentiating equation (13) with respect to $\alpha$ produces $$\frac{\partial J}{\partial \alpha} = \left(\sum_{i=0}^{M-1} B(i)\right)^*. \qquad (34)$$

Therefore, equation (33) can be rewritten as $$\alpha_{k+1} = \alpha_k + \mu(\Sigma_{i=0}^{M-1} B(i)). \qquad (35)$$

In Case 2 of the RLS AFD-DFE for SISO SC-FDMA, the AFD-DFE can be implemented with the RLS algorithm that is applied with a stochastic gradient method and can be either constrained or unconstrained. For example, the Mean Square Error (MSE) at the $i^{th}$ frequency bin can be represented as $$MSE(i) = E[|D(i) - \check{X}(i)|^2] \qquad (36)$$

Where E[.] represents the expectation operator. In the constraint-based approach, the coat function becomes $$J = E\left[|D(i) - X'(i)|^2\right] + 2Re\left[\alpha^* \sum_{i=0}^{M-1} \mathcal{B}(i)\right] \qquad (37)$$

Expanding the cost function and disregarding the expectation results in $$J = D^*(i)D(i) - D^*(i)y(i)\mathcal{F}(i) - D^*(i)D(i)\mathcal{B}(i) - \mathcal{F}^*(i)y^*(i)D(i) - \qquad (38)$$
$$\mathcal{B}^*(i)D^*(i)D(i) + \mathcal{F}^*(i)y^*(i)y(i)\mathcal{F}(i) + \mathcal{F}^*(i)y(i)D(i)\mathcal{B}(i) +$$
$$\mathcal{B}^*(i)D^*(i)y(i)\mathcal{F}(i) + \mathcal{B}^*(i)D^*(i)D(i)\mathcal{B}(i) + 2Re\left[\alpha^* \sum_{i=0}^{M-1} \mathcal{B}(i)\right]$$

Minimizing equation (38) for the feedforward and feedback filters separately results in the following updates at instant (k+1):

$$\mathcal{F}_{k+1}(i) = \mathcal{F}_k(i) - \mu^1_{k+1}(i)\left(\frac{\partial J}{\partial \mathcal{F}(i)}\right)^*_k \qquad (39)$$
$$= \mathcal{F}_k(i) + \mu^1_{k+1}(i)y^1_{k+1}\{\mathcal{D}_{k+1}(i) - [y_{K+1}(i)\mathcal{F}(i) + \mathcal{D}_{k+1}(i)\mathcal{B}_k(i)]\}$$

and $$\mathcal{B}_{k+1}(i) = \mathcal{B}_k(i) - \mu^2_{k+1}(i)\left(\frac{\partial J}{\partial \mathcal{B}(i)}\right)^*_k \qquad (40)$$
$$= \mathcal{B}_k(i) + \mu^2_{k+1}(i)\mathcal{D}^*_{k+1}(i)\{D_{k+1}(i) - [y_{k+1}(i)\mathcal{F}_k(i) + \mathcal{D}_{k+1}(i)\mathcal{B}_k(i)]\} - \mu^2_{k+1}(i)\alpha_{k+1}$$

where $\mu(i)^1_{k+1}$ and $\mu(i)^2_{k+1}$ are the time-varying step-sizes, given as $$\mu(i)^1_{k+1} = \frac{\mu_{k+1}}{\epsilon_{k+1} + E[y(i)^*y(i)]}, \mu(i)^2_{k+1} = \frac{\mu_{k+1}}{\epsilon_{k+1} + E[D^*(i)D(i)]} \qquad$$

For the unconstrained RLS algorithm, the feedforward and feedback filters can be described by $$\mathcal{F}_{k+1}(i) = \mathcal{F}_k(i) + \left(\frac{\mu_{k+1}}{\epsilon_{k+1} + E[y(i)^*y(i)]}\right) \qquad (41)$$
$$y^*_{k+1}(i)\{D_{k+1}(i) - [y_{k+1}(i)\mathcal{F}_k(i) + D_{k+1}(i)\mathcal{B}_k(i)]\} \text{ and}$$

$$\mathcal{B}_{k+1}(i) = \mathcal{B}_k(i) + \left(\frac{\mu_{k+1}}{\epsilon_{k+1} + E[D^*(i)D(i)]}\right) \qquad (42)$$
$$D^*_k(i)\{D_{k+1}(I) - [y_{k+1}(i)\mathcal{F}_k(i) + D_{k+1}(i)\mathcal{B}_k(i)]\}$$

Next, E[Y(i)*Y(i)] and E[D(i)*D(i)] are replaced by corresponding estimates, which for the RLS update, are chosen as exponentially-weighted sample averages that can be described by $$E[y(i)^*y(i)] = \frac{1}{(k+2)}\sum_{j=0}^{k+1}\lambda^{k+1-j}y_j(i)^*y_j(i) \qquad (43)$$

and $$E\{D(i)^*D(i)] = \frac{1}{(k+2)}\sum_{j=0}^{k+1}\lambda^{k+1-j}D_j(i)^*D_j(i) \qquad (44)$$

For some scalar 0<<λ<1. For example, equations (43) and (44) correspond to an average of all past regressors up to time k+1. The step size can be chosen as $\mu_{k+1} = 1/(k+2)$ and the regularization factor as $\in_{k+1} = \lambda^{k+2}\in/(k+2)$, and collecting the coefficients into $\mathcal{W}$ equations (39) and (40) for the constrained RLS algorithm become $$w_{k+1} = w_k + \left[\lambda^{k+2}\epsilon I_{2M} + \sum_{j=0}^{k+1}\lambda^{k+1-j}\mathcal{A}^H_j\mathcal{A}_j\right]^{-1}(\mathcal{A}^H_{k+1}\varepsilon_{k+1} - \alpha_{k+1}G^T) \qquad (45)$$

where $\mathcal{A}_k$ and $\varepsilon_k$ are described by $$\mathcal{A}_k = \begin{bmatrix} \mathcal{Z}_k & 0 \\ 0 & \mathcal{D}_k \end{bmatrix} \qquad (46)$$

and $$\varepsilon_k = \begin{bmatrix} D_k - \tilde{X}_k \\ D_k - \tilde{X}_k \end{bmatrix} \qquad (47)$$

For the unconstrained RLS algorithm, equations (41) and (42) become $$w_{k+1} = w_k + \left[\lambda^{k+2}\epsilon I_{2M} + \sum_{j=0}^{k+1}\lambda^{k+1-j}\mathcal{A}^H_j\mathcal{A}_j\right]^{-1}\mathcal{A}^H_{k+1}\varepsilon_{k+1} \qquad (48)$$

Computing the inverse of the matrix in (45) and (48) can be costly due to combining all previous and present data form and then invert the matrix. Therefore, the following equation can be defined $$\Theta_{k+1} \triangleq \left(\lambda^{k+2}\epsilon I_2 + \sum_{j=0}^{k+1}\lambda^{k+1-j}\mathcal{A}^H_j\mathcal{A}_j\right) \qquad (49)$$

which satisfies the following recursion $$\Theta_{k+1} = \lambda\Theta_k + \mathcal{A}^H_{k+1}\mathcal{A}_{k+1}, \Theta_0 = \epsilon I_{2M} \qquad (50)$$

Let, $\mathcal{P}_{k+1} = \Theta^{-1}_{k+1}$ and apply matrix inversion to result in
$$\mathcal{P}_{k+1} = \lambda^{-1}[\mathcal{P}_k - \lambda^{-1}\mathcal{P}_k\mathcal{A}^H_{k+1}\times$$
$$(I_{2M} + \lambda^{-1}\mathcal{A}_{k+1}\mathcal{P}_k\mathcal{A}^H_{k+1})^{-1}\mathcal{A}_{k+1}\mathcal{P}_k] \qquad (51)$$

where λ is a forgetting factor chosen to be a value that is close to 1. The RLS update equation for the constrained algorithm is described by $$\mathcal{W}_{k+1} = \mathcal{W}_k + \mathcal{P}_{k+1}(\mathcal{A}^H_{k+1}\varepsilon_{k+1} - \alpha_{k+1}G^T) \qquad (52)$$

In addition, the RLS update equation for the unconstrained algorithm is described by $$\mathcal{W}_{k+1} = \mathcal{W}_k + \mathcal{P}_{k+1}\mathcal{A}^H_{k+1}\varepsilon_{k+1} \qquad (53)$$

In both (52) and (53), $\varepsilon_k$ is as defined in equation (47). Initially, $\mathcal{W}_0 = 0$ and $\mathcal{P}_0 = \text{diag}(\epsilon^{-1}_F I_M \epsilon^{-1}_B I_M)$.

In some implementations, $\mathcal{P}_k$ in Case 2 of the RLS AFD-DFE algorithm estimates an input covariance matrix for each filter as the input of the feedforward filter and feedback filter, which are taken into account independently. Therefore, $\mathcal{P}_k$ in the second case of the RLS AFD-DFE algorithm may have better performance than the first case of the RLS AFD-DFE algorithm described previously herein. Also, the decision error for the second case does not affect the feedforward filter. The computational complexity for the second case is also lower than for the first case because matrix inversion is not performed. Details regarding simulation results and computational complexity for Case 1 and Case of the AFD-DFE algorithm are discussed further herein.

According to certain embodiments, due to the structure of $\mathcal{P}_{k+1}$ that eliminates the performance of matrix inversion, the computational complexity of the AFD-DFE algorithm can be reduced. In some implementations, the matrix $P_{k+1}$ can have a diagonal structure, i.e., $P_{k+1} = \text{diag}([P^1_{k+1} \ P^2_{k+1}])$, where $P^1_{k+1}$ and $P^2_{k+1}$ are also diagonal. $P^1_{k+1}$ can be written as $$P^2_{k+1} = \lambda^{-1}[P^2_k - \lambda^{-1}P^2_k(|\mathcal{D}_{k+1}|^{-2} + \lambda^{-1}P^2_k)^{-1}P^2_k] \qquad (54)$$

Moreover, the term $(I_M+\lambda^{-1}|\mathcal{Z}_{k+1}|^2 P_k^1)^{-1}$ is also diagonal, therefore, $$P_{k+1}^1 = \lambda^{-1}[P_k^1 - \lambda^{-1}P_k^1(|\mathcal{Z}_{k+1}|^{-2}+\lambda^{-1}P_k^1)^{-1}P_k^1] \quad (55)$$

and the matrix inversion has M scalar inversions. Likewise, the determination of $P_{k+1}^2$ follows $P_{k+1}^1$ such that $$P_{k+1}^1 = \lambda^{-1}[P_k^1 - \lambda^{-1}P_k^1\mathcal{Z}_{k+1}^H(I_M + \lambda^{-1}\mathcal{Z}_{k+1}P_k^1\mathcal{Z}_{k+1}^H)^{-1}\mathcal{Z}_{k+1}P_k^1] \quad (56)$$
$$= \lambda^{-1}[P_k^1 - \lambda^{-1}P_k^1\mathcal{Z}_{k+1}^H(I_M + \lambda^{-1}|\mathcal{Z}_{k+1}|^2 P_k^1)^{-1}\mathcal{Z}_{k+1}P_k^1]$$

Therefore, the final reduced-complexity constrained RLS update has the form $$\mathcal{W}_{k+1} = \mathcal{W}_k + \text{diag}([P_{k+1}^1 P_{k+1}^2])(\mathcal{A}_{k+1}^H \epsilon_{k+1} - \alpha_{k+1}G^T) \quad (57)$$

and the constraint, $\alpha_{k+1}$, is updated based on equation (35). In addition, the reduced-complexity unconstrained RLS update has the form $$\mathcal{W}_{k+1} = \mathcal{W}_k + \text{diag}([P_{k+1}^1 P_{k+1}^2])(\mathcal{A}_{k+1}^H \epsilon_{k+1}) \quad (58)$$

While the embodiments herein describe the derivation of an AFD-DFE, the derivations can also be applied to a linear equalizer by setting the feedback coefficients equal to zero.

Figure 2:
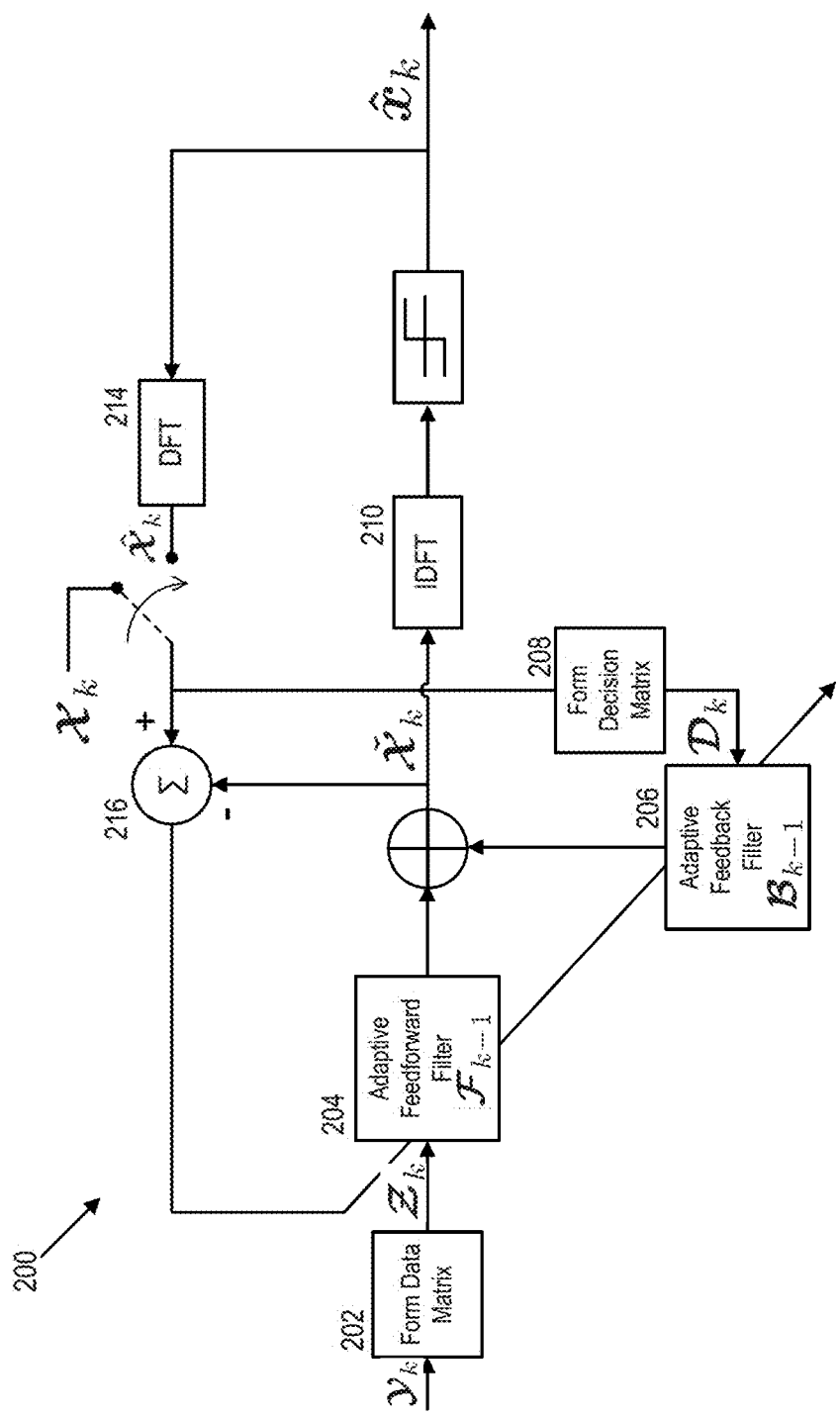
FIG. 2 is an exemplary block diagram of an adaptive frequency-domain decision feedback equalizer, according to certain embodiments.

FIG. 2 is an exemplary block diagram of an AFD-DFE 200, according to certain embodiments. For example, the AFD-DFE 200 can be used as the equalizer 170 in the transceiver 150. The AFD-DFE 200 can be implemented in SISO SC-FDMA systems and can employ algorithms such as the Case 1 and Case 2 RLS and CRLS AFD-DFE algorithms described previously herein. At the forming data matrix module 202, the received signal $\mathcal{Y}_k$ is formed into diagonal matrix $\mathcal{Z}$.

The AFD-DFE 200 uses a training mode to allow the algorithm to converge before switching to a decision-directed mode where the AFD-DFE 200 uses previous decisions to update the weighting factors of the adaptive feedforward filter 204 and adaptive feedback filter 206. For example, in the training mode, the AFD-DFE 200 receives known M-block training signal, $X_k$, which is compared to the received signal after the adaptive feedforward filter 204 and adaptive feedback filter 206 have been applied according to equation (8), denoted by $\check{X}_k$, at the summing module 216. In some implementations, a causality problem that can exist in equation (8) can be solved using an iterative procedure as described in K. Berberidis and P. Karaivazoglou, "An efficient block adaptive decision feedback equalizer implemented in the frequency domain," *IEEE Transactions on Signal Processing*, vol. 50, pp. 2273-2285, September 2002 and V. Kekatos, K. Berberidis, and A. A. Rontogiannis, "A Block Adaptive Frequency Domain MIMO DFE for Wideband Channels," *IEEE International Conference on Acoustics, Speech and Signal Processing (ICASSP)*, pp. III-197-III-200, 2007, the entire contents of which are incorporated by reference in their entirety. The output of the summing module 206 is an error signal that is used to update the coefficients of the adaptive feedforward filter 204 and the adaptive feedback filter 206. The error signal is generated by comparing the equalizer output with a desired response in the frequency-domain, which is applied in equations (57) and (58). In addition, the M-block training signal is used to form the decision matrix, $\mathcal{D}_k$, at the form decision matrix module 208, which is then used to update the adaptive feedback filter 206. To prevent the algorithm of the AFD-DFE 200 from diverging, such as in the case of fast fading channels, retraining blocks can also be used.

In the decision-directed mode, the AFD-DFE 200 uses the equalizer output from the previous iteration after an M-point DFT is applied at the DFT module 214 to calculate the error signal at the summing module 216. For example, the error signal is based on the difference between the output of the DFT-module 214, $\hat{X}_k$, and the received signal after the adaptive feedforward filter 204 and adaptive feedback filter 206 have been applied, denoted by $\check{X}_k$, according to equation (8). The adaptive feedforward filter 204 and the adaptive feedback filter 206 are updated based on the error signal output from the summing module 216. In addition, the iterated decision, $\hat{X}k$, can be used to produce the decision matrix $\mathcal{D}_k$, at the form decision matrix module 208, which is then used to update the adaptive feedback filter 206. The equalizer output, $\check{X}_k$, is transformed to the time domain using an IDFT at the IDFT module 210, and the output signal from the equalizer 170 is denoted as $\hat{x}_k$.

Figure 3:
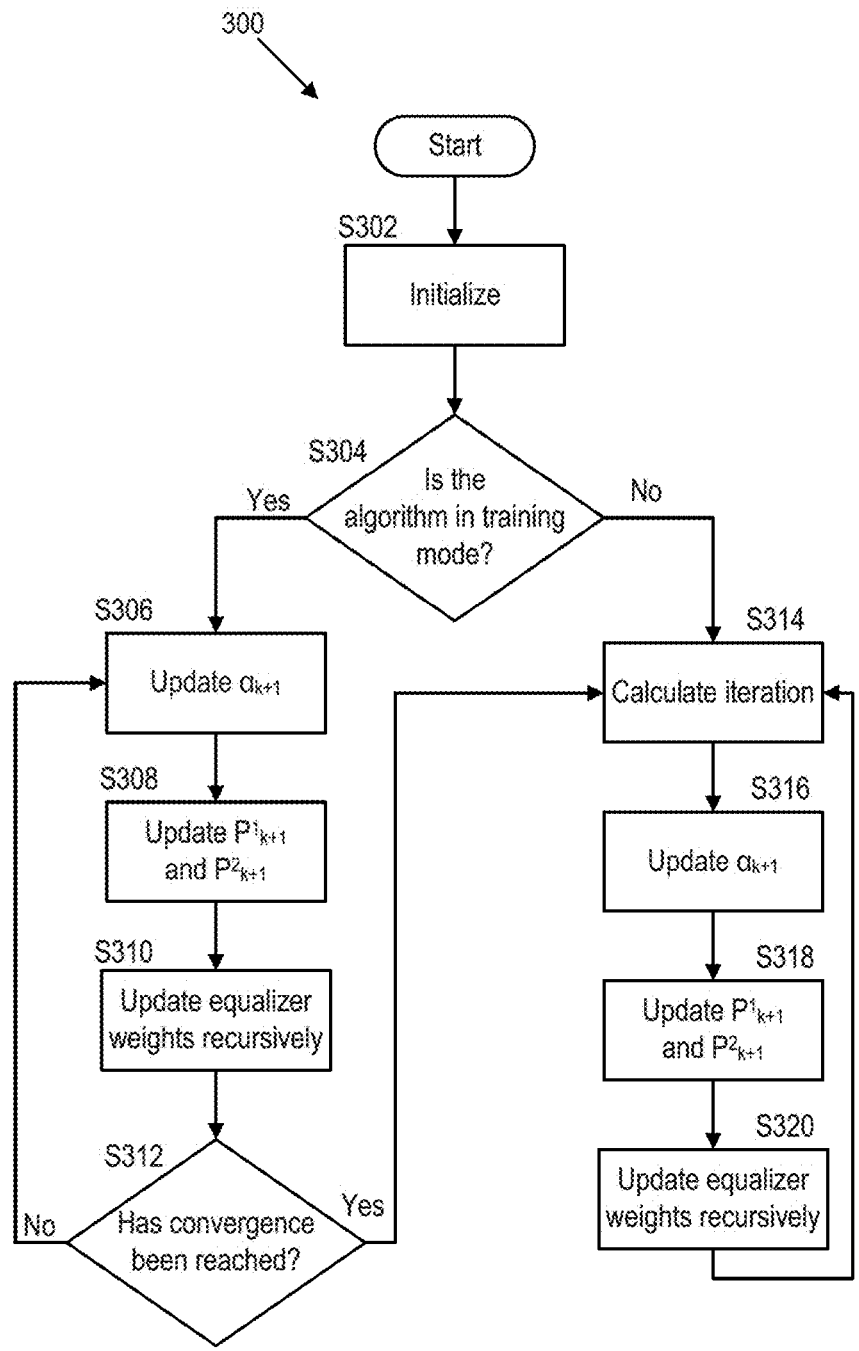
FIG. 3 is an exemplary flowchart of an adaptation algorithm for the AFD-DFE, according to certain embodiments.

FIG. 3 is an exemplary flowchart of an adaptation algorithm 300 for the AFD-DFE 200, according to certain embodiments. The adaptation algorithm 300 can be applied to any of the embodiments of the AFD-DFE described herein for SISO and/or MIMO systems. In addition, Table I illustrates a summary of the adaptation algorithm 300. At step S302, the algorithm is initialized according to the following: $\mathcal{W}_0=0$, $\alpha_0=0$, $\lambda$ set to a value approximately equal to 1, and $$\mathcal{P}_0 = \begin{bmatrix} \epsilon_\mathcal{F}^{-1} I_M & 0 \\ 0 & \epsilon_\mathcal{B}^{-1} I_M \end{bmatrix}.$$

TABLE 1

Summary of the adaptation algorithm for AFD-DFE initialization:
Initialize the algorithm by setting
$\mathcal{W}_0 = 0$
$\alpha_0 = 0$
$\lambda$ is close to one and $\mathcal{P}_0 = \begin{bmatrix} \epsilon_\mathcal{F}^{-1} I_M & 0 \\ 0 & \epsilon_\mathcal{B}^{-1} I_M \end{bmatrix}$ For each instant of time, k=0,1,2,...
In training mode:
(1) Update $\alpha_{k+1}$ as
$\quad \alpha_{k+1} = \alpha_k + \mu \Sigma_{i=0}^{M-1} \mathcal{B}_k(i)$
(2) Update $P_{k+1}^1$ and $P_{k+1}^2$ via
$\quad P_{k+1}^1 = \lambda^{-1}[P_k^1 - \lambda^{-1}P_k^1(|\mathcal{Z}_{k+1}|^{-2} + \lambda^{-1}P_k^1)^{-1}P_k^1]$
$\quad P_{k+1}^2 = \lambda^{-1}[P_k^2 - \lambda^{-1}P_k^2(|\chi_{k+1}|^{-2} + \lambda^{-1}P_k^2)^{-1}P_k^2]$
(3) Update the equalizer weights $\mathcal{W}_{k+1}$ recursively as
$\quad \mathcal{W}_{k+1} = \mathcal{W}_k + \text{diag}([P_{k+1}^1 \ P_{k+1}^2])(\mathcal{A}_{k+1}^H \epsilon_{k+1} - \alpha_{k+1}G^T)$
in decision-directed mode:
(1) Iterate on $\bar{\chi}_{k+1} = \mathcal{Z}_{k+1}\mathcal{F}_k + \mathcal{D}_{k+1}\mathcal{B}_k$
(2) Update $\alpha_{k+1}$ as
$\quad \alpha_{k+1} = \alpha_k + \mu \Sigma_{i=0}^{M-1} \mathcal{B}_k(i)$
(3) Update $P_{k+1}^1$ and $P_{k+1}^2$ via
$\quad P_{k+1}^1 = \lambda^{-1}[P_k^1 - \lambda^{-1}P_k^1(|\mathcal{Z}_{k+1}|^{-2} + \lambda^{-1}P_k^1)^{-1}P_k^1]$
$\quad P_{k+1}^2 = \lambda^{-1}[P_k^2 - \lambda^{-1}P_k^2(|\bar{\chi}_{k+1}|^{-2} + \lambda^{-1}P_k^2)^{-1}P_k^2]$
(4) Update the equalizer weights $\mathcal{W}_{k+1}$ recursively as
$\quad \mathcal{W}_{k+1} = \mathcal{W}_k + \text{diag}([P_{k+1}^1 \ P_{k+1}^2])(\mathcal{A}_{k+1}^H \epsilon_{k+1} - \alpha_{k+1}G^T)$ At step S304, a determination is made whether the algorithm is in training mode or decision-directed mode. Details regarding the training mode and the decision-directed mode are discussed further herein. If the algorithm is in training mode, resulting in a "yes" at step S304, then step S306 is performed. Otherwise, if the algorithm is in decision-directed mode, resulting in a "no" at step S304, then step S314 is performed.

In training mode, for each instance of time k=0, 1, 2 . . . , at step S306, $\alpha_{k+1}$ is updated according to equation (35). At step S308, $\mathcal{P}_{k+1}^1$ and $\mathcal{P}_{k+1}^2$ are updated according to the following:

$$P_{k+1}^1 = \lambda^{-1}[P_k^1 - \lambda^{-1}P_k^1(|\mathcal{Z}_{k+1}|^{-2} + \lambda^{-1}P_k^1)^{-1}P_k^1]$$

$$P_{k+1}^2 = \lambda^{-1}[P_k^2 - \lambda^{-1}P_k^2(|X_{k+1}|^{-2} + \lambda^{-1}P_k^2)^{-1}P_k^2]$$

where $X_{k+1}$ represents the training signal.

At step S310, the equalizer weight $\mathcal{W}_{k+1}$ can be recursively updated according to equations (52) and/or (53). At step S312, the processing circuitry determines whether the algorithm has reached convergence. In some implementations, convergence is based on magnitude of an error signal comparing the difference between the equalizer output and the desired response. For example, the error signal can correspond to a difference between a training signal and the equalizer output. If the error signal is less than a predetermined threshold, then the processing circuitry can determine that convergence has been achieved. If the determination is made that the algorithm has converged, resulting in a "yes" at step S312, then the algorithm switches to decision-directed mode, and step S314 is performed. Otherwise, if it is determined that convergence has not been reached, resulting in a "no" at step S312, then step S306 is performed for the next instance of time, k.

In decision-directed mode, at step S314, an iteration of the equalizer output is determined according to equation (8). At step S316, $\alpha_{k+1}$ is updated according to equation (35). At step S318, $\mathcal{P}_{k+1}^1$ and $\mathcal{P}_{k+1}^2$ are updated according to the following:

$$P_{k+1}^1 = \lambda^{-1}[P_k^1 - \lambda^{-1}P_k^1(|\mathcal{Z}_{k+1}|^{-2} + \lambda^{-1}P_k^1)^{-1}P_k^1]$$

$$P_{k+1}^2 = \lambda^{-1}[P_k^2 - \lambda^{-1}P_k^2(|\check{X}_{k+1}|^{-2} + \lambda^{-1}P_k^2)^{-1}P_k^2]$$

where $\check{X}_{k+1}$ represents the equalizer output signal.

At step S320, the equalizer weights $\mathcal{W}_{k+1}$ can be recursively updated according to equations (52) and/or (53), and the adaptation algorithm returns to step S314 to compute the next iteration of the equalizer output.

In some implementations, the adaptation algorithm 300 can be implemented in a reduced training mode. For example, instead of using M training symbols in one SC-FDMA block, the training overhead can be reduced by using T training symbols and M-T modulated symbols. The remaining weights can be interpolated by introducing an iterative procedure in training mode. Table II illustrates of a summary of the reduced training mode for the adaptation algorithm 300.

According to certain embodiments, perfect frequency synchronization is not assumed between the transmitter and receiver due to carrier frequency offset (CFO) that arises in practical SC-FDMA systems due to misalignment between transmitter/receiver frequency oscillators which causes interference, also referred to as energy leakage, from neighboring sub-carriers.

TABLE II

Summary of the reduced-training
adaptation algorithm for AFD-DFE

For each instant of time, k=0,1,2,...
In training mode:
(1) Iterate on $\check{\chi}_{k+1} = \mathcal{Z}_{k+1}\mathcal{F}_k + \mathcal{D}_{k+1}\mathcal{B}_k$ with SC-FDMA block containing T training symbols and M − T modulated data symbols
(2) Update $\alpha_{k+1}$ as
    $\alpha_{k+1} = \alpha_k + \mu \Sigma_{i=0}^{M-1} \mathcal{B}_k(i)$ TABLE II-continued Summary of the reduced-training
adaptation algorithm for AFD-DFE (3) Update $P_{k+1}^1$ and $P_{k+1}^2$ via
    $P_{k+1}^1 = \lambda^{-1}[P_k^1 - \lambda^{-1}P_k^1(|\mathcal{Z}_{k+1}|^{-2} + \lambda^{-1}P_k^1)^{-1}P_k^1]$
    $P_{k+1}^2 = \lambda^{-1}[P_k^2 - \lambda^{-1}P_k^2(|\check{\chi}_{k+1}|^{-2} + \lambda^{-1}P_k^2)^{-1}P_k^2]$
(4) Update the equalizer weights $\mathcal{W}_{k+1}$ recursively as
    $\mathcal{W}_{k+1} = \mathcal{W}_k + \text{diag}([P_{k+1}^1 \; P_{k+1}^2])(\mathcal{A}_{k+1}^H \varepsilon_{k+1} - \alpha_{k+1}G^T)$ For example, let the $m^{th}$ user's CFO normalized by the sub-carrier spacing be denoted by $\Omega_m$ where $0 \leq \Omega_m \leq 0.5$. In addition, a diagonal matrix can be defined to characterize the effects of CFO as $$C^{(m)} = \text{diag}([e^{j2\pi\Omega_m \times 0/N} e^{j2\pi\Omega_m \times 1/N} \cdots e^{j2\pi\Omega_m \times (N-1)/N}]) \quad (59)$$

In this case, the pre-DFT received signal can be expressed as $$y = \sum_{m=1}^{K} C^{(m)}(s^{(m)} \otimes h^{(m)}) + n^{(m)} \quad (60)$$

After applying the N-point DFT, the received signal can be expressed by $$\acute{y} = \sum_{m=1}^{K} \mathcal{C}^{(m)} \hat{\Lambda}^{(m)} R^{(m)} \chi^{(m)} + \mathcal{N} \quad (61)$$

Where $\mathcal{C}^{(m)}$ is a circulant matrix with entries $$\mathcal{C}_{p,q}^{(m)} = \frac{1}{N} \sum_{n=0}^{N-1} e^{j2\pi(\Omega^{(m)} + p - q)n/N}, \; p, q, = 1, \ldots, N.$$

Figure 4:
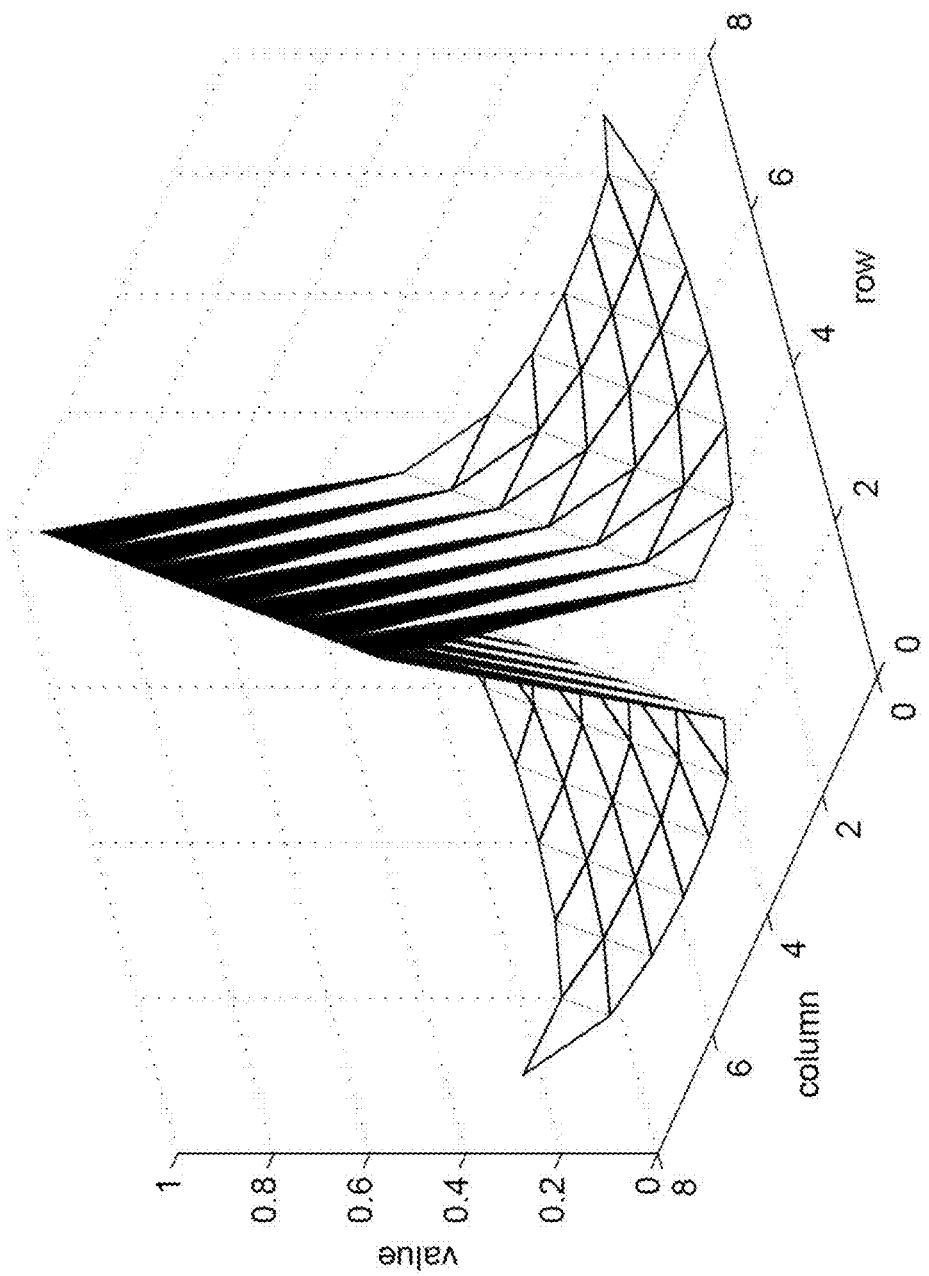
FIG. 4 is an exemplary illustration of the structure of the channel matrix, according to certain embodiments.

FIG. 4 is an exemplary illustration of the structure of the channel matrix $\mathcal{C}^{(m)}\hat{\Lambda}^{(m)}$. As shown in FIG. 4, the energy of the matrix is concentrated in three primary diagonals of the channel matrix. In one implementation, an assumption is made that the channel matrix entries other than the three primary diagonals are equal to zero such that the AFD-DFE 200 is a three tap equalizer in the frequency-domain. After de-mapping occurs at the de-mapping module 118, the $m^{th}$ user's received signal is equal to $\mathcal{Y}^{(m)} = R^{(m)T}\acute{y}$ To simplify the notation, the superscript m can be ignored, and In addition, the equalizer tap matrix can have a structure that corresponds to the structure of the channel matrix such that the equalizer tap matrix has non-zero entries on the three primary diagonals. For example, the output of a minimum mean square error (MMSE) 3-tap LE can be represented as $\mathcal{Y} = [\mathcal{Y}(0), \mathcal{Y}(1), \ldots, \mathcal{Y}(M-1)]^T$ $$\begin{bmatrix} \check{X}(0) \\ \check{X}(1) \\ \check{X}(2) \\ \vdots \\ \check{X}(M-1) \end{bmatrix} = \quad (62)$$

-continued $$\begin{bmatrix} \mathcal{F}_1(0) & \mathcal{F}_2(0) & & & \\ \mathcal{F}_1(1) & \mathcal{F}_2(1) & \mathcal{F}_3(1) & & \\ & \mathcal{F}_1(2) & \ddots & \ddots & \\ & & \ddots & \ddots & \mathcal{F}_3(M-2) \\ & & & \mathcal{F}_1(M-1) & \mathcal{F}_2(M-1) \end{bmatrix} \begin{bmatrix} y(0) \\ y(1) \\ y(2) \\ \vdots \\ y(M-1) \end{bmatrix}$$

where $\mathcal{F}_i(j)$ represents the tap of the LE. In addition, the output of a DFE can be represented as $$\begin{bmatrix} \check{X}(0) \\ \check{X}(1) \\ \check{X}(2) \\ \vdots \\ \check{X}(M-1) \end{bmatrix} = \begin{bmatrix} \mathcal{F}_1(0) & \mathcal{F}_2(0) & & & \\ \mathcal{F}_1(1) & \mathcal{F}_2(1) & \mathcal{F}_3(1) & & \\ & \mathcal{F}_1(2) & \ddots & \ddots & \\ & & \ddots & \ddots & \mathcal{F}_3(M-2) \\ & & & \mathcal{F}_1(M-1) & \mathcal{F}_2(M-1) \end{bmatrix} \quad (63)$$

$$\begin{bmatrix} y(0) \\ y(1) \\ y(2) \\ \vdots \\ y(M-1) \end{bmatrix} + \begin{bmatrix} \mathcal{B}(0) & & & & \\ & \mathcal{B}(1) & & & \\ & & \mathcal{B}(2) & & \\ & & & \ddots & \\ & & & & \mathcal{B}(M-1) \end{bmatrix} \begin{bmatrix} \mathcal{D}(0) \\ \mathcal{D}(1) \\ \mathcal{D}(2) \\ \vdots \\ \mathcal{D}(M-1) \end{bmatrix}$$

where $\mathcal{F}_i(j)$ and $\mathcal{B}_i(j)$ represent the tap coefficient of the feedforward and feedback filter, respectively. For an adaptive solution for the AFD-DFE, the result may not be an explicit solution. Denoting $\mathcal{U}_i = [\mathcal{Y}_k(i-1) \mathcal{Y}_k(i) \mathcal{Y}_k(i+1)]$ for $i=1, 2, \ldots, M-2$, $\mathcal{U}_0 = [[\mathcal{Y}_k(0)] [\mathcal{U}(1)]]$, equation (63) can be written alternatively as $$\begin{bmatrix} \check{X}(0) \\ \check{X}(1) \\ \check{X}(2) \\ \vdots \\ \check{X}(M-1) \end{bmatrix} = \begin{bmatrix} u_0 & & & & \\ & u_1 & & & \\ & & u_2 & & \\ & & & \ddots & \\ & & & & u_{M-1} \end{bmatrix} \quad (64)$$

$$\begin{bmatrix} \mathcal{F}_1(0) \\ \mathcal{F}_2(0) \\ \mathcal{F}_1(1) \\ \vdots \\ \mathcal{F}_2(M-1) \end{bmatrix} + \begin{bmatrix} D(0) & & & & \\ & D(1) & & & \\ & & D(2) & & \\ & & & \ddots & \\ & & & & D(M-1) \end{bmatrix} \begin{bmatrix} \mathcal{B}(0) \\ \mathcal{B}(1) \\ \mathcal{B}(2) \\ \vdots \\ \mathcal{B}(M-1) \end{bmatrix}$$

Equation (64) can be written in compact notation, at instant k, as $$\check{X}_k = \mathcal{Z}_k \mathcal{F}_{k-1} + \mathcal{D}_k \mathcal{B}_{k-1} \quad (65)$$

Defining $\mathcal{A}_k$, $\varepsilon_k$, and $\mathcal{P}_k$ as in equations (46), (47), and (51), the RLS update can be represented by equation (57).

In addition, the computational complexity of the 3-tap CRLS AFD-DFE is reduced because matrix inversion is not implemented in the AFD-DFE. For example, starting with k=0 and using $P_0^1 = \varepsilon I_{3M-2}$, $P_1^1$ can be represented by $$P_1^1 = \lambda^{-1}\left[P_0^1 - \lambda^{-1}P_0^1 \mathcal{Z}_1^H (I_M + \lambda^{-1}\mathcal{Z}_1 P_0^1 \mathcal{Z}_1^H)^{-1} \mathcal{Z}_1 P_0^1\right] \quad (66)$$

$$= \lambda^{-1}\left[\varepsilon^{-1} I_{3M-2} - \lambda^{-1}\varepsilon^{-1} I_{3M-2} \mathcal{Z}_1^H (I_M + \lambda^{-1}\varepsilon^{-1}\mathcal{Z}_1 \mathcal{Z}_1^H)^{-1} \mathcal{Z}_1 \varepsilon^{-1} I_{3M-2}\right]$$

Because $\mathcal{Z}_1 \mathcal{Z}_1^H = \text{diag}[|\mathcal{U}_{0,1}|^2 |\mathcal{U}_{1,1}|^2 \ldots |\mathcal{U}_{M-1,1}|^2]$, solving equation (66) does not necessitate using matrix inversion.

Also, $$\mathcal{Z}_1^H (I_M + \lambda^{-1}\varepsilon^{-1}\mathcal{Z}_1 \mathcal{Z}_1^H)^{-1}\mathcal{Z}_1 = \begin{bmatrix} \phi_0 & & & \\ & \phi_1 & & \\ & & \ddots & \\ & & & \phi_{M-1} \end{bmatrix} \quad (67)$$

whereas the entries $\phi_i$, I=1, ..., M−2 are 3×3 matrices and $\phi_i$, I=0, ..., M−1 are 2×2 matrices given by $\phi_i = \mathcal{U}_{i,1}^H (1 + \lambda^{-1}\varepsilon^{-1}|\mathcal{U}_{i,1}|^2) \mathcal{U}_{i,1}$, i=0, ..., M−1. Thus, $\mathcal{P}_1^1$ can have the following structure:

$$P_1^1 = \begin{bmatrix} P_{1,0}^1 & & & \\ & P_{1,1}^1 & & \\ & & \ddots & \\ & & & P_{1,M-1}^1 \end{bmatrix} \quad (68)$$

where $P_{1,i}^1 = \lambda^{-1}[\varepsilon^{-1}I_d - \lambda^{-1}\varepsilon^{-2}\phi_i]$, d=2 for i=0, M−1 and d=3 for i=1, ..., M−2. For k=1, $$P_2^1 = \lambda^{-1}[P_1^1 - \lambda^{-1}P_1^1 \mathcal{Z}_2^H (I_M + \lambda^{-1}\mathcal{Z}_2 P_1^1 \mathcal{Z}_2^H)^{-1} \mathcal{Z}_2 P_1^1] \quad (69)$$

where $\mathcal{Z}_2 P_1^1 \mathcal{Z}_2^H = \text{diag}[\mathcal{U}_{0,2} P_{1,0}^1 \mathcal{U}_{0,2}^H \quad \mathcal{U}_{1,2} P_{1,1}^1 \mathcal{U}_{1,2}^H \ldots \mathcal{U}_{M-1,2} P_{1,M-1}^1 \mathcal{U}_{M-1,2}^H]$ and $\mathcal{U}_{X,2} \mathcal{P}_1^1 \mathcal{U}_{i,2}^H$ is a scalar quantity, thus the matrix inversion equates to M scalar inversions. For k>1, $\mathcal{P}_k^1$ has a structure that corresponds to the matrix structure for k=1. Also, the method of determining of $\mathcal{P}_k^2$ corresponds to the method of determining $\mathcal{P}_k^2$ for a one-tap AFD-DFE for SFBC.

According to certain embodiments, the AFD-DFE design can also be applied to MIMO SC-FDMA systems. MIMO systems can be used to enhance performance (spatial diversity) and/or to increase the data transfer rate (spatial multiplexing) of a data transfer system, such as a transceiver. One type of coding scheme that can be applied to a MIMO system is space-frequency block coding (SFBC).

Figure 5:
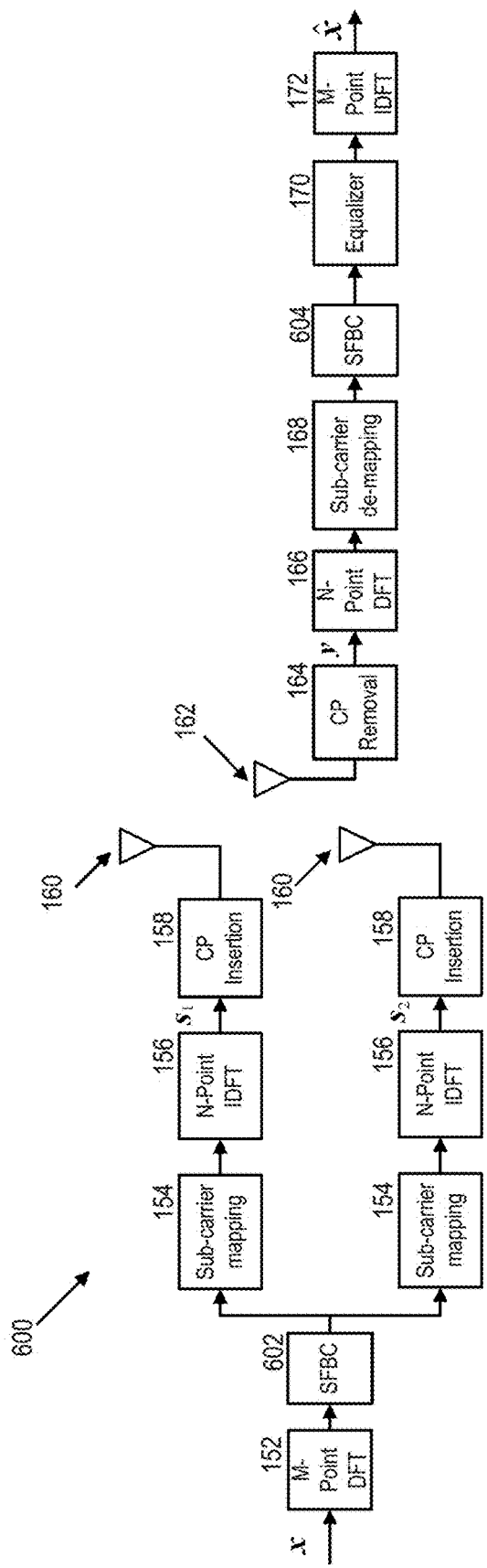
FIG. 5 is an exemplary illustration of a transceiver for SFBC SC-FDMA system, according to certain embodiments.

FIG. 5 is an exemplary illustration of a transceiver 600 for SFBC SC-FDMA system, according to certain embodiments. On technique for achieving spatial diversity is Conventional Space-Frequency Block Coding (C-SFBC), which can be implemented on a block level for the AFD-DFE. An M-point DFT module 152 applies the M-point DFT to a data block, $x^{(m)}$, to transform the signal block $x^{(m)}$ to the frequency-domain symbol, $X^{(m)} = [X(0)^{(m)}; X(1)^{(m)}; \ldots; X(M-1)^{(m)}]^T$. At the SFBC module 602, the processing circuitry of the transceiver 600 applies the SFBC coding scheme to the data block, which results in $X_2^{(m)} = [X(0)^{(m)}; -X^*(1)^{(m)}; \ldots; X(M-2)^{(m)}; -X^*(M-1)^{(m)}]^T$, and $X_1^{(m)} = [X(1)^{(m)}; X^*(0)^{(m)}; \ldots; X(M-1)^{(m)}; X^*(M-2)^{(m)}]^T$, where $(.)^*$ denotes the complex-conjugate operation. After mapping is performed at mapping module 154, and the circuitry applies the N-point IDFT at the IDFT module 156, the transmit signals from the two antennas are referred to as $s_1^{(m)}$ and $S_2^{(m)}$ which correspond to $X^{(m)}$ and $X^{(m)}$. In addition, CP is inserted into the transmit signals at CP insertion module 158.

The transmit signals can be transmitted across a channel via transmitter 160 and received at receiver 162. At the receiver 610, the circuitry of the transceiver 600 performs CP removal at the CP removal module 164 and applies an N-point DFT at N-point DFT module 166. In addition, at sub-carrier de-mapping module 168, the circuitry de-maps the received signal as discussed with respect to the de-mapping module 118 in transceiver 100.

The received signal for the m$^{th}$ user, after received signal is decoded at the SFBC module 604, can be expressed as $$\mathcal{Y}_{oe} = \begin{bmatrix} \mathcal{Y}_o \\ \mathcal{Y}_e^* \end{bmatrix} \qquad (70)$$

$$= \begin{bmatrix} \Lambda_{1o} & \Lambda_{2o} \\ \Lambda_{2e}^* & -\Lambda_{1e}^* \end{bmatrix} \begin{bmatrix} X_o \\ X_e \end{bmatrix} + \begin{bmatrix} \mathcal{N}_o \\ \mathcal{N}_e^* \end{bmatrix}$$

$$\triangleq \Lambda \mathcal{X}_{oe} + \mathcal{N}_{oe}$$

where $\mathcal{Y}_{k,o}(X_O)$ and $\mathcal{Y}_{k,e}(X_e)$ represent the odd and even components, respectively, of the frequency-domain received signal $\mathcal{Y}_k(X)$. Also, $\Lambda_{io}$ and $\Lambda_{ie}$ are diagonal matrices including odd and even components, respectively, of the frequency-domain channel corresponding to the i$^{th}$ transmit antenna. In some implementations, it can be assumed that $\Lambda_{io} = \Lambda_{ie}$ for i=1, 2, such that $\Lambda$ becomes an Alamouti-like matrix. According to certain embodiments, an Alamouti-type matrix has the form $$\begin{bmatrix} \Delta_1 & \Delta_2 \\ \Delta_1^* & \Delta_2^* \end{bmatrix}.$$

The output from the equalizer 170 can be expressed as $$\begin{bmatrix} \check{X}_o \\ \check{X}_e \end{bmatrix} = \left( \Lambda^H \Lambda + \frac{1}{SNR} I_{2M} \right)^{-1} \Lambda^H \mathcal{Y}_{oe}, \qquad (71)$$

where SNR is the signal-to-noise ratio at the receiver 610. Since $\tilde{\Lambda}\Lambda^H$ has an Alamouti-type structure, then $$\begin{bmatrix} \check{X}_o \\ \check{X}_e \end{bmatrix} = \begin{bmatrix} \Phi_1 & \Phi_2 \\ \Phi_2^* & -\Phi_1^* \end{bmatrix} \begin{bmatrix} \mathcal{Y}_o \\ \mathcal{Y}_e^* \end{bmatrix} \qquad (72)$$

where $\Phi_1$ and $\Phi_2$ are diagonal matrices. Alternatively, equation (72) can be written as $$\begin{bmatrix} \check{X}_o \\ \check{X}_e^* \end{bmatrix} = \begin{bmatrix} \text{diag}(\mathcal{Y}_o) & \text{diag}(\mathcal{Y}_e^*) \\ -\text{diag}(\mathcal{Y}_e) & \text{diag}(\mathcal{Y}_o^*) \end{bmatrix} \begin{bmatrix} \Upsilon_1 \\ \Upsilon_2 \end{bmatrix} \qquad (73)$$

where $\Upsilon_1$ and $\Upsilon_2$ are vectors that include the diagonal elements of $\Phi_1$ and $\Phi_2$. The equalizer output from a DFE can be expressed as $$\check{\mathcal{X}}_{oe} = \begin{bmatrix} \check{\mathcal{X}}_o \\ \check{\mathcal{X}}_e^* \end{bmatrix} = \begin{bmatrix} \text{diag}(\mathcal{Y}_o) & \text{diag}(\mathcal{Y}_e^*) \\ -\text{diag}(\mathcal{Y}_e) & \text{diag}(\mathcal{Y}_o^*) \end{bmatrix} \qquad (74)$$

$$\begin{bmatrix} \Upsilon_1 \\ \Upsilon_2 \end{bmatrix} + \begin{bmatrix} \text{diag}(\mathcal{D}_o) & 0 \\ 0 & \text{diag}(\mathcal{D}_e^*) \end{bmatrix} \begin{bmatrix} \Psi_1 \\ \Psi_2 \end{bmatrix} \triangleq \mathcal{Z}\mathcal{F} + \mathcal{DB}$$

where $\mathcal{D}_o$ and $\mathcal{D}_e$ are $X_o$ and $X_e$, respectively, for the training mode or frequency-domain decisions on $\check{X}_o$ and $\check{X}_e$, respectively, for the decision-directed mode. The feedforward and feedback filter coefficients in the frequency-domain are $\mathcal{F} = [F(0) \ldots F(M-1)]^T$ and $\mathcal{B} = \mathcal{B}B(0) \ldots \mathcal{B}(M-1)]^T$ including the elements $\{\Upsilon_1, \Upsilon_2\}$ and $\{\Psi_1, \Psi_2\}$, respectively. Moreover, Z is an M×M Alamouti-type matrix including the received symbols, and $\mathcal{D}$ is a diagonal matrix including decisions. The coefficients for the feedforward and feedback filters are computed adaptively so that exact solutions may not be required. At the k$^{th}$ instant, the output of the equalizer can be represented as $$\check{\mathcal{X}}_{oe,k} = \mathcal{Z}_k \mathcal{F}_{k-1} + \mathcal{D}_k \mathcal{B}_{k-1} \qquad (75)$$

The AFD-DFE recursions for the constrained algorithm can be represented by equation (52) with $G = [0_{1\times(3M-2)} \; 1_{1\times M}]$, and the AFD-DFE recursions for the unconstrained algorithm can be represented by equation (53). The error vector can be represented by $$\varepsilon_k = \begin{bmatrix} D_k - \check{\mathcal{X}}_{oe,k} \\ D_k - \check{\mathcal{X}}_{ae,k} \end{bmatrix} \qquad (76)$$

where $\mathcal{D}_k$ denotes the decisions made at the k$^{th}$ instant, e.g., $$\mathcal{D}_k = \begin{bmatrix} \mathcal{D}_{o,k} \\ \mathcal{D}_{e,k}^* \end{bmatrix},$$

and $\mathcal{A}_k$, and $\mathcal{P}_k$ are as in equations (46) and (51), respectively.

The output of the equalizer 170 is fed to a M-point IDFT module 172 where the equalized symbols are transformed back to the time domain via IDFT.

According to certain embodiments, the RLS update equations (52) and (53) do not necessitate the performance of matrix inversion, which reduces an overall computation complexity of the AFD-DFE. For example, the matrix $\mathcal{P}_{k+1}$ has a diagonal structure such that $\mathcal{P}_{k+1} = \text{diag}([\mathcal{P}_{k+1}^1 \; \mathcal{P}_{k+1}^2])$, where $\mathcal{P}_{k+1}^1$ and $\mathcal{P}_{k+1}^2$ are also diagonal and $\mathcal{P}_{k+1}^1$ can be represented by $$P_{k+1}^1 = \lambda^{-1}[P_k^1 - \lambda^{-1} P_k^1 \mathcal{Z}_{k+1}^H (I_M + \lambda^{-1} \mathcal{Z}_{k+1} P_k^1 \mathcal{Z}_{k+1}^H)^{-1} \mathcal{Z}_{k+1} P_k^1] \qquad (77)$$

Simplifying the term $(\lambda^{-1} \mathcal{Z}_{k+1} P_k^1 \mathcal{Z}_{k+1}^H)$ results in $$\lambda^{-1} \mathcal{Z}_{k+1} P_k^1 \mathcal{Z}_{k+1}^H = \lambda^{-1} P_k^1 \mathcal{Z}_{k+1} \mathcal{Z}_{k+1}^H$$

$$= \lambda^{-1} P_k^1 \begin{bmatrix} \text{diag}(\mathcal{Y}_{o,k+1}) & \text{diag}(\mathcal{Y}^*_{e,k+1}) \\ -\text{diag}(\mathcal{Y}_{e,k+1}) & \text{diag}(\mathcal{Y}^*_{o,k+1}) \end{bmatrix} \begin{bmatrix} \text{diag}(\mathcal{Y}^*_{o,k+1}) & -\text{diag}(\mathcal{Y}^*_{e,k+1}) \\ \text{diag}(\mathcal{Y}_{e,k+1}) & \text{diag}(\mathcal{Y}_{o,k+1}) \end{bmatrix}$$

$$= \lambda^{-1} P_k^1 \begin{bmatrix} \text{diag}(|\mathcal{Y}_{o,k+1}|^2) + \text{diag}(|\mathcal{Y}_{e,k+1}|^2) & 0 \\ 0 & \text{diag}(|\mathcal{Y}_{o,k+1}|^2) + \text{diag}(|\mathcal{Y}_{e,k+1}|^2) \end{bmatrix}$$

Now $\mathcal{Z}_{k+1}{}^H(I_{M'} + \lambda^{-1} \mathcal{Z}_{k+1} P_k^1 \mathcal{Z}_{k+1}{}^H)^{-1} \mathcal{Z}_{k+1} \text{diag}([\emptyset \emptyset])$ $\triangleq \psi_{k\omega 1}{}^1$, where $\phi$ is diagonal given as $\phi = (\text{diag}(|\mathcal{Y}_{o,k+1}|^2) + \text{diag}(|\mathcal{Y}_{e,k+1}|^2))^{-1} + \lambda^{-1} P_k^1]^{-1}$. $\mathcal{P}_{k+1}{}^1$ Can have the form $$P_{k+1}{}^1 = \lambda^{-1}[P_k^1 - \lambda^{-1} P_k^1 \psi_{k+1}{}^1 P_k^1] \quad (78)$$

Using the approach discussed previously with respect to the SISO implementation, $$P_{k+1}{}^2 = \lambda^{-1}[P_k^2 - \lambda^{-1} P_k^2 \psi_{k+1}{}^2 P_k^2] \quad (79)$$

where $\psi_{k+1}{}^2 = (|\mathcal{D}_{k+1}|^{-2} + \lambda^{-1} P_k^2)^{-1}$. The RLS AFD-DFE recursion for the constrained algorithm has the form $$\mathcal{W}_{k+1} = \mathcal{W}_k + \text{diag}([P_{k+1}{}^1 P_{k+1}{}^2])(\mathcal{A}_{k+1}{}^H \varepsilon_{k+1} - \alpha_{k+1} G^T) \quad (80)$$

The RLS AFD-DFE recursion for the unconstrained algorithm has the form $$\mathcal{W}_{k+1} = \mathcal{W}_k + \text{diag}([P_{k+1}{}^1 P_{k+1}{}^2])(\mathcal{A}_{k+1}{}^H \varepsilon_{k+1}) \quad (81)$$

where $\mathcal{P}_{k+1}{}^1$ and $\mathcal{P}_{k+1}{}^2$ are defined by equations (78) and (79), respectively.

Figure 6:
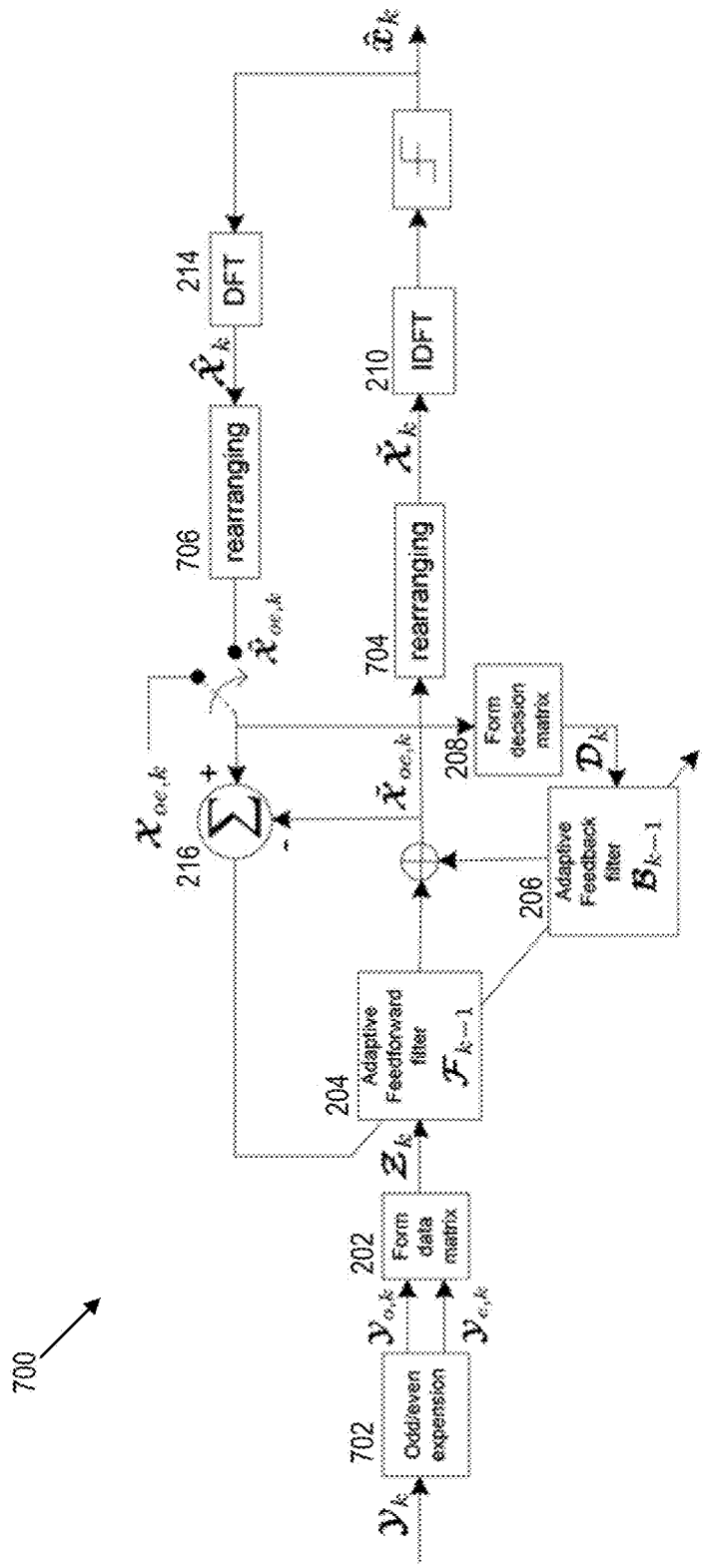
FIG. 6 is an exemplary block diagram of an AFD-DFE for two-transmit one-receive antenna, according to certain embodiments.

FIG. 6 is an exemplary block diagram of an AFD-DFE 700 for a transceiver having two-transmit once-receive antenna, according to certain embodiments. For example, the AFD-DFE 700 can be used as the equalizer 170 in the transceiver 600. The AFD-DFE 700 can be implemented in MIMO SC-FDMA systems and can employ algorithms such as the C-SFBC and E-SFBC RLS algorithms described previously herein. At the odd/even expansion module 702, the processing circuitry separates the odd and even components of the received signal, $\mathcal{Y}_k$. At the forming data matrix module 202, the odd component signal $\mathcal{Y}_{k,o,k}$ and the even component signal, $\mathcal{Y}_{k,e,k}$ are formed into diagonal matrix $\mathcal{Z}_{.}$.

The AFD-DFE 700 uses a training mode to allow the algorithm to converge before switching to a decision-directed mode where the AFD-DFE 700 uses previous decisions to update the weighting factors of the adaptive feedforward filter 204 and adaptive feedback filter 206. For example, in the training mode, the AFD-DFE 700 receives known M-block training signal, $X_{oe,k}$, which is compared to the received signal after the adaptive feedforward filter 204 and adaptive feedback filter 206 have been applied according to equation (75), denoted by $\check{X}_{oe,k}$, at the summing module 216. The output of the summing module 206 is an error signal that is used to update the coefficients of the adaptive feedforward filter 204 and the adaptive feedback filter 206. The error signal is generated by comparing the equalizer output with a desired response in the frequency-domain, which is applied in equations (80) and (81). In addition, the M-block training signal is used to form the decision matrix, $\mathcal{D}_k$, at the form decision matrix module 208, which is then used to update the adaptive feedback filter 206. To prevent the algorithm of the AFD-DFE 700 from diverging, such as in the case of fast fading channels, retraining blocks can also be used.

In the decision-directed mode, the AFD-DFE 700 uses the equalizer output from the previous iteration after an M-point DFT is applied at the DFT module 214, and then rearranged at the rearranging module 706 to calculate the error signal at the summing module 216. For example, the error signal is based on the difference between the output of the rearranging module 706, $\hat{X}_{oe,k}$, and the received signal after the adaptive feedforward filter 204 and adaptive feedback filter 206 have been applied, denoted by $\check{X}_{oe,k}$, according to equation (8). The adaptive feedforward filter 204 and the adaptive feedback filter 206 are updated based on the error signal output from the summing module 216. In addition, the iterated decision, $\hat{X}_{oe,k}$, can be used to produce the decision matrix $\mathcal{D}_k$, at the form decision matrix module 208, which is then used to update the adaptive feedback filter 206. The equalizer output, $\check{X}_{oe,k}$, which includes the odd and event components, is rearranged at the rearranging module 704 and is transformed to the time domain using an IDFT at the IDFT module 210. The output signal from the equalizer 170 is denoted as $\hat{x}_k$.

In the presence of CFO and high Doppler, severe ICI from adjacent carriers occurs which can destroy the Alamouti structure and can result in performance degradation. Therefore, B. Narasimhan, N. Al-Dhahir, and H. Minn, "SFBC design tradeoffs for mobile SC-FDMA with application to LTE-advanced," *IEEE International Conference on Acoustics, Speech and Signal Processing*, pp. 3458-3461, 2010, of which the entire contents are incorporated by reference in their entirety, proposes embedded SFBC (E-SFBC) which preserves the Alamouti structure even when ICI is present. In addition, E-SFBC does not affect the low PAPR property of SC-FDMA, which may not exist in C-SFBC. In some embodiments, the AFD-DFE can be implemented with E-SFBC at the block level. In E-SFBC, pilots may not be used, and the blocks may not be divided into two signals. In E-SFBC, $X_1^{(m)} = [X(0)^{(m)}, X(2)^{(m)}, \ldots, X(M-2)^{(m)}]^T$ and $X_2^{(m)} = [X(1)^{(m)}, X(3)^{(m)}, \ldots, X(M-1)^{(m)}]^T$ such that $X^{(m)}$ is divided into two blocks. In some implementations, the sequence to transmit the sub-blocks is $$\acute{X}_1 = \begin{bmatrix} X_1^{(m)} \\ -X_2^{*(m)} \end{bmatrix} \text{ and } \acute{X}_2 = \begin{bmatrix} X_2^{(m)} \\ -X_1^{*(m)} \end{bmatrix}$$

for a first antenna and a second antenna, respectively. After mapping and applying N-point IDFT, the transmitted signals from the two antennas are $s_1^{(m)}$ and $s_2^{(m)}$ which correspond to $X_1^{(m)}$ and $X_2^{(m)}$. The transmitted signals can be circularly convolved with their respective channels, and the received signal, after applying the N-DFT becomes $$\mathcal{Y} = \sum_{m=1}^{K} \{\hat{\Lambda}_1^{(m)} R^{(m)} \check{X}_1 + \hat{\Lambda}_2^{(m)} R^{(m)} \check{X}_2\} + \mathcal{N} \quad (82)$$

where $\hat{\Lambda}^{(m)}$ is a N×N diagonal matrix, $\hat{\Lambda}^{(m)}$=diag(DFT($h_i^{(m)}$) for i=1, 2, and $\mathcal{N}$ is noise component with variance $\sigma\mathcal{N}\,I_N$. The received signal for the $m^{th}$ user, after de-mapping, can be expressed as $$\mathcal{Y}^{(m)} = R^{(m)T}\hat{\Lambda}_1^{(m)} R^{(m)}[X_1^{(m)} - X_2^{*(m)}]^T +$$
$$R^{(m)T}\hat{\Lambda}_2^{(m)} R^{(m)}[X_2^{(m)} X_1^{*(m)}]^T + \mathcal{N}^{(m)} \quad (83)$$

If $\Lambda_i^{(m)} = \mathcal{R}^{(m)T}\hat{\Lambda}_i^{(m)}\mathcal{R}^{(m)}$ for i=1, 2, then $\Lambda_i^{(m)}$ is a M×M diagonal matrix. To simplify the notation, the superscript m can be removed, and equation (83) can be written as $$\mathcal{Y}_1 = \Lambda_{11} X_1 + \Lambda_{12} X_2 + \mathcal{N}_1 \quad (84)$$

$$\mathcal{Y}_2 = \Lambda_{21} X_1^* - \Lambda_{22} X_2^* + \mathcal{N}_2 \quad (85)$$

where $\Lambda_1$=diag[$\Lambda_{11}\,\Lambda_{22}$] and $\Lambda_2$=diag[$\Lambda_{12}\,\Lambda_{21}$]. Combining equations (84) and (85) results in $$\mathcal{Y} = \begin{bmatrix} \mathcal{Y}_1 \\ \mathcal{Y}_2^* \end{bmatrix}$$
$$= \begin{bmatrix} \Lambda_{11} & \Lambda_{12} \\ \Lambda_{21}^* & -\Lambda_{22}^* \end{bmatrix}\begin{bmatrix} X_1 \\ X_2 \end{bmatrix} + \begin{bmatrix} \mathcal{N}_1 \\ \mathcal{N}_2^* \end{bmatrix}$$
$$\triangleq \Lambda \mathcal{X}_{12} + \mathcal{N}_{12}$$

For Alamouti structure, $\Lambda_{11}=\Lambda_{22}$ and $\Lambda_{12}=\Lambda_{21}$. In addition, the sub-carriers can be reordered before mapping at the transmitter as $O\acute{X}_1$ and $O\acute{X}_2$ where $O=[I_1, I_1, I_1, I_1, \ldots, I_1, I_1]$, and it may be assumed that the channel does not change over two consecutive sub-carriers. At the receiver, the reordering is done after de-mapping by using a matrix $O^T$. The remaining steps performed at the receiver at the equalization module 620 and M-point IDFT module 622 correspond to the steps performed for the C-SFBC signals.

Due to carrier frequency offset (CFO) in SFBC SC-FDMA signals, $\Lambda_{ij}$ in equation (86) can lose the diagonal structure. The matrices of equation (86) can be approximated as a banded (tri-diagonal) structure. It can also be assumed, in some implementations, that the structure of the feedforward matrices corresponds to the structure of the channel matrices, and the equalized signal can be represented as $$\begin{bmatrix} \check{X}_1 \\ \check{X}_2^* \end{bmatrix} = \begin{bmatrix} \Phi_1 & \Phi_2 \\ \Phi_2^* & -\Phi_1^* \end{bmatrix}\begin{bmatrix} \mathcal{Y}_1 \\ \mathcal{Y}_2^* \end{bmatrix} + \begin{bmatrix} \Theta_1 & 0 \\ 0 & \Theta_2^* \end{bmatrix}\begin{bmatrix} D_1 \\ D_2 \end{bmatrix} \quad (87)$$

where $\Phi_i$ is a tri-diagonal matrix and $\Theta_i$ is a diagonal matrix. $\mathcal{D}_1$ and $\mathcal{D}_2$ are $X_1$ and $X_2$, respectively, for the training mode or frequency-domain decisions on $\check{X}_1$ and $\check{X}_2$, respectively, for the decision-directed mode. According to certain embodiments, exact knowledge of the equalizer tap matrices may not be required to obtain an adaptive solution. If $\mathcal{u}_i=[\mathcal{Y}_k(i-2)\mathcal{Y}_k(i)\mathcal{Y}_k(i+2)]$ for i=2, ..., M−3, $\mathcal{u}_i=[\mathcal{Y}_k(i)\mathcal{Y}_k(i+2)]$ for i=0,1, and $\mathcal{u}_i=[\mathcal{Y}_k(i-2)\mathcal{Y}_k(i)]$ for i=M−1, M−2, then equation (87) can be expressed as $$\check{\mathcal{X}} = \begin{bmatrix} \check{X}_1 \\ \check{X}_2^* \end{bmatrix} \quad (88)$$
$$= \begin{bmatrix} Z_0 & Z_1^* \\ -Z_1 & Z_0^* \end{bmatrix}\begin{bmatrix} \Upsilon_1 \\ \Upsilon_2 \end{bmatrix} + \begin{bmatrix} \text{diag}(D_1) & 0 \\ 0 & \text{diag}(D_2^*) \end{bmatrix}\begin{bmatrix} \Psi_1 \\ \Psi_2 \end{bmatrix}$$
$$\triangleq \mathcal{Z}\mathcal{F} + \mathcal{D}\mathcal{B}$$

Where $\mathcal{Z}_j$=diag[$\mathcal{u}_j, \mathcal{u}_{j+2}, \ldots, \mathcal{u}_{j+M-2}$] for j=0, 1. $\Upsilon_1$ and $\Upsilon_2$ ($\Psi_1$ and $\Psi_2$) are the vectors having diagonal elements $\Phi_1$ and $\Phi_2$ ($\Theta_1$ and $\Theta_2$). In addition, the feedforward and feedback filter coefficients in the frequency-domain are $\mathcal{F}$ and $\mathcal{B}$ and have elements $\{\Upsilon_1, \Upsilon_2\}$ and $\{\Psi_1, \Psi_2\}$, respectively. Defining $\mathcal{A}_k$ as in equation (46), $\varepsilon_k$ as in equation (47), and $\mathcal{P}_k$ as in equation (51), the RLS update is equal to equation (57) for the constrained case with $G=[0_{1\times(3M-2)}\,1_{1\times M}]$ and equation (58) for the unconstrained case.

Due to the structure of the SFBC matrix, matrix inversion can be avoided, and the complexity of determining the equalizer output is reduced. Starting with k=0 and using $P_0^1 = \epsilon^{-1} I_{3M-4}$, $P_1^1$ can be represented by $$P_1^1 = \lambda^{-1}[P_0^1 - \lambda^{-1} P_0^1 \mathcal{Z}_1^H (I_M + \lambda^{-1} \mathcal{Z}_1 P_0^1 \mathcal{Z}_1^H)^{-1} \mathcal{Z}_1 P_0^1] \quad (89)$$
$$= \lambda^{-1}[\epsilon^{-1} I_{3M-4} - \lambda^{-1}\epsilon^{-1} I_{3M-4} \mathcal{Z}_1^H (I_M + \lambda^{-1}\epsilon^{-1} \mathcal{Z}_1 \mathcal{Z}_1^H)^{-1} \mathcal{Z}_1 \epsilon^{-1} I_{3M-4}]$$

Now, $$\mathcal{Z}_1\mathcal{Z}_1^H = \begin{bmatrix} Z_0 Z_{0,1}^H + Z_{1,1}^* Z_{1,1}^T & -Z_{0,1} Z_{1,1}^H + Z_{1,1}^* Z_{0,1}^T \\ -Z_{1,1} Z_{0,1}^H + Z_{0,1}^* Z_{1,1}^T & -Z_{1,1} Z_{1,1}^H + Z_{0,1}^* Z_{0,1}^T \end{bmatrix} \quad (90)$$

In addition, $Z_0 Z_0^H + Z_1^* Z_1^T$=diag [$|\mathcal{u}_{0,1}|^2 |\mathcal{u}_{1,1}|^2 + |\mathcal{u}_{3,1}|^2 \ldots |\mathcal{u}_{M-2,1}|^2 + |\mathcal{u}_{M-1,1}|^2$]s a diagonal matrix as well as the other matrix entries in equation (90). Therefore, $\mathcal{Z}_1\mathcal{Z}_1^H$ is a M×M matrix having four $$\frac{M}{2} \times \frac{M}{2}$$

diagonal matrices, which allows the inverse of equation (89) to be computed. Now, $$\mathcal{Z}_1^H (I_M + \lambda^{-1}\epsilon^{-1} \mathcal{Z}_1 \mathcal{Z}_1^H)^{-1} \mathcal{Z}_1 = \begin{bmatrix} \phi_0 & \phi_1 \\ \phi_2 & \phi_3 \end{bmatrix} = \phi \text{ and} \quad (91)$$

$$\phi_i = \begin{bmatrix} \phi_{i,0} & & & \\ & \phi_{i,1} & & \\ & & \ddots & \\ & & & \phi_{i,\frac{M}{2}} \end{bmatrix}$$

The entries $\emptyset_{i,j}$, $$j = 1, \ldots, \frac{M}{2} - 1$$

are 3×3 matrices and $\emptyset_i$, $$i = 0, \frac{M}{2}$$

are 2×2 matrices. $\mathcal{P}_1^1$ has a structure that corresponds to the structure of $\emptyset$ such that $$\mathcal{P}_1^1 = \begin{bmatrix} \mathcal{P}_{1,0}^1 & \mathcal{P}_{1,1}^1 \\ \mathcal{P}_{1,2}^1 & \mathcal{P}_{1,3}^1 \end{bmatrix}.$$

For k=1, $$P_1^1 = \lambda^{-1}[P_1^2 - \lambda^{-1}P_1^1 \mathcal{Z}_2^H(I_M + \lambda^{-1}\mathcal{Z}_2 P_1^1 \mathcal{Z}_2^H)^{-1} \mathcal{Z}_2 P_1^1] \quad (92)$$

Let $$\mathcal{Z}_2 P_1^1 \mathcal{Z}_2^H = \begin{bmatrix} \varphi_0 & \varphi_1 \\ \varphi_2 & \varphi_3 \end{bmatrix}$$

where $\varphi_0 = (Z_0 P_{1,0}^1 + Z_1 * P_{1,2}^1) Z_0^H + (Z_0 P_{1,1}^1 + Z_1 * P_{1,3}^1) Z_1^T$ is a diagonal matrix in addition to the other entries of the matrix. Therefore, the inverse of equation (92) can be determined by using block matrix inversion as described by T. Kailath, *Linear Systems*. Englewood Cliffs, N.J.: Prentice Hall, 1980, the entire contents of which is herein incorporated by reference, as follows $$\begin{bmatrix} A & B \\ C & D \end{bmatrix}^{-1} = \begin{bmatrix} (A - BD^{-1}C)^{-1} & -(A - BD^{-1}C)^{-1}BD^{-1} \\ -D^{-1}C(A - BD^{-1}C)^{-1} & (D - CA^{-1}B)^{-1} \end{bmatrix} \quad (93)$$

where all sub-matrices A, B, C, and D are diagonal, therefore, the inversion of the sub-matrices A, B, C, and D become scalar inversions. For k>1, $\mathcal{P}_k^1$ has a structure that corresponds to the matrix structure for k=1. Also, the method of determining of $\mathcal{P}_k^2$ corresponds to the method of determining $\mathcal{P}_k^2$ for a one-tap AFD-DFE for SFBC.

In order to increase the number of users supported by the system, spatially-multiplexed (SM)SC-FDMA can be used. In SM SC-FDMA, multiple users use the same frequency and times slot to transmit data. The number antennas at the base station (BS) can be equal to the number of users using the same frequency and time slots, and the AFD-DFE is used to perform joint interference cancellation and equalization at the receiver. For example, let $N_t$ be the number of transmit antennas and $N_r$ be the number of receive antennas. Since the number of receive antennas may be assumed to be equal to the number of users who are transmitting with the same frequency band and time slot, then $N_t = N_r$, according to certain embodiments. $\mathcal{Y}_{k,i}$ represents the frequency-domain received signal after de-mapping at the $i^{th}$ antenna as described by M. A. Ruder, U. L. Dang, and W. H. Ger-stacker, "User Pairing for Multiuser SC-FDMA Transmission over Virtual MIMO ISI Channels," *IEEE Global Telecommunications Conference (GLOBECOM)*, pp. 1-7, November 2009, the entire contents of which is incorporated by reference in its entirety. Collecting the received SC-FDMA symbols into one vector produces $$\begin{bmatrix} y_1 \\ y_2 \\ \vdots \\ y_{N_r} \end{bmatrix} = \begin{bmatrix} \Lambda_{11} & \Lambda_{21} & \cdots & \Lambda_{N_r 1} \\ \Lambda_{12} & \Lambda_{22} & \cdots & \Lambda_{N_r 2} \\ \vdots & \vdots & \ddots & \vdots \\ \Lambda_{1N_r} & \Lambda_{2N_r} & \cdots & \Lambda_{N_R N_r} \end{bmatrix} \begin{bmatrix} \mathcal{X}_1 \\ \mathcal{X}_2 \\ \vdots \\ \mathcal{X}_{N_r} \end{bmatrix} + \begin{bmatrix} \mathcal{N}_1 \\ \mathcal{N}_2 \\ \vdots \\ \mathcal{N}_r \end{bmatrix} \quad (94)$$

$$\triangleq \Lambda \mathcal{X} + \mathcal{N}$$

where $\Lambda_{ij}$ is the frequency-domain channel matrix from the $i^{th}$ user's transmit antenna to the $j^{th}$ receive antenna having diagonal structure. The feedforward and feedback tap matrices also have a diagonal structure that corresponds to the structure of the channel matrix $\Lambda$. The output of the AFD-DFE is represented by $$\begin{bmatrix} \check{\mathcal{X}}_1 \\ \check{\mathcal{X}}_2 \\ \vdots \\ \check{\mathcal{X}}_{N_r} \end{bmatrix} = \begin{bmatrix} \mathcal{F}_{1,1} & \mathcal{F}_{1,2} & \cdots & \mathcal{F}_{1,N_r} \\ \mathcal{F}_{2,1} & \mathcal{F}_{2,2} & \cdots & \mathcal{F}_{2,N_r} \\ \vdots & \vdots & \ddots & \vdots \\ \mathcal{F}_{N_r,1} & \mathcal{F}_{N_r,2} & \cdots & \mathcal{F}_{N_r,N_r} \end{bmatrix} \quad (95)$$

$$\begin{bmatrix} y_1 \\ y_2 \\ \vdots \\ y_{N_r} \end{bmatrix} + \begin{bmatrix} \mathcal{B}_{1,1} & \mathcal{B}_{1,2} & \cdots & \mathcal{B}_{1,N_r} \\ \mathcal{B}_{2,1} & \mathcal{B}_{2,2} & \cdots & \mathcal{B}_{2,N_r} \\ \vdots & \vdots & \ddots & \vdots \\ \mathcal{B}_{N_r,1} & \mathcal{B}_{N_r,2} & \cdots & \mathcal{B}_{N_r,N_r} \end{bmatrix} \begin{bmatrix} \mathcal{D}_1 \\ \mathcal{D}_2 \\ \vdots \\ \mathcal{D}_{N_r} \end{bmatrix}$$

where the elements, $\mathcal{F}_{i,j}$ and $\mathcal{B}_{i,j}$ are diagonal matrices that include the feedforward and feedback coefficients as diagonal elements, respectively. Next, an adaptive solution for entries of the matrices from equation (95) is determined so that the high cost and rate overhead associated with accurate multi-user channel estimation can be reduced and/or avoided. The desired response $\mathcal{D}_i$ can be defined as $$D_i = \begin{cases} F_M(x_i), & \text{for training mode} \\ F_M(\hat{x}_i), & \text{for decision-directed mode} \end{cases}$$

Defining $\mathcal{Z}_i = \text{diag}(\mathcal{U}_i)$ and the decision matrix $\mathcal{D}_i = \text{diag}(D_i)$, equation (95) becomes $$\begin{bmatrix} \check{\mathcal{X}}_1 \\ \check{\mathcal{X}}_2 \\ \vdots \\ \check{\mathcal{X}}_{N_r} \end{bmatrix} = \sum_{i=1}^{N_r} \left( \begin{bmatrix} \mathcal{Z}_i & & \\ & \ddots & \\ & & \mathcal{Z}_i \end{bmatrix} \begin{bmatrix} \mathcal{F}_i^1 \\ \vdots \\ \mathcal{F}_i^{N_r} \end{bmatrix} + \begin{bmatrix} \mathcal{D}_i & & \\ & \ddots & \\ & & \mathcal{D}_i \end{bmatrix} \begin{bmatrix} \mathcal{B}_i^1 \\ \vdots \\ \mathcal{B}_i^{N_r} \end{bmatrix} \right) \quad (96)$$

where $\mathcal{F}_i^j$ and $\mathcal{B}_i^j$ are the vectors having the diagonal elements of $\mathcal{F}_{j,i}$ and $\mathcal{B}_{j,i}$, respectively. If $\check{X} = [\check{X}_1^T \ldots \check{X}_{N_j}^T]^T$, $\mathcal{F}_i = [\mathcal{F}_1^{iT} \ldots \mathcal{F}_{N_i}^{iT}]^T$, $\mathcal{B}_i = [\mathcal{B}_1^{iT} \ldots \mathcal{B}_{N_r}^{iT}]^T$ and $\check{\mathcal{z}}_i(\mathcal{D}_i)$ is the $\mathcal{Z}_i(\mathcal{D}_i)$ diagonal matrix having the elements on the diagonal, then equation (96) can be expressed as $$\breve{X} = \sum_{i=1}^{N_r} \left[ \breve{\mathcal{Z}}_i \mathcal{F}_i + \mathcal{D}_i \mathcal{B}_i \right] \triangleq \breve{\mathcal{Z}} \mathcal{F} + \mathcal{D} \mathcal{B} \qquad (97)$$

where $\mathcal{Z} = [\breve{z}_1 \ldots \mathcal{F}_{N_r}]$, $\mathcal{F} = [\mathcal{F}_1^T \ldots \mathcal{F}_{N_r}^T]^T$, $\mathcal{B} = [\mathcal{B}_1^T \ldots \mathcal{B}_{N_r}^T]^T$ and $\mathcal{D} = [\mathcal{D}_1 \ldots \mathcal{D}_{N_r}]$. The output of the equalizer at instant k can be represented as $$\breve{X}_k = \mathcal{Z}_k \mathcal{F}_{k-1} + \mathcal{D}_k \mathcal{B}_{k-1} \qquad (98)$$

Defining the desired response vector as $D_k = [D_{1,k}^T \ldots N_{N_r,k}^T]^T$, then $\mathcal{W}_k$ can be represented by equation (58), $\mathcal{A}_k$ as in equation (46), and $\varepsilon_k$ as in equation (47).

In addition, the complexity of determining the equalizer output can be reduced based on the structure of the matrices used in the equalizer output determination. For example, starting with k=0 and using $P_0^1 = \varepsilon^{-1} I_{(N_r)^2 M}$, $P_1^1$ can be represented by $$P_1^1 = \lambda^{-1}[P_0^1 - \lambda^{-1} P_0^1 \mathcal{Z}_1^H (I_{N_r M} + \lambda^{-1} \mathcal{Z}_1 P_0^1 \mathcal{Z}_1^H)^{-1} \mathcal{Z}_1 P_0^1] \qquad (99)$$
$$= \lambda^{-1}[\varepsilon^{-1} I_{(N_r)^2 M} - \lambda^{-1} \varepsilon^{-1} I_{(N_r)^2 M} \mathcal{Z}_1^H (I_{N_r M} + \lambda^{-1} \varepsilon^{-1} \mathcal{Z}_1 \mathcal{Z}_1^H)^{-1} \mathcal{Z}_1 \varepsilon^{-1} I_{(N_r)^2 M}]$$

In addition, it can be shown that $\mathcal{Z}_1 \mathcal{Z}_1^H = [|\breve{z}_{1,1}|^2 + |\breve{z}_{2,1}|^2 + \ldots |\breve{z}_{N_r,1}|^2]$. Since $|\breve{z}_{i,1}|^2$ has a diagonal structure, $|\breve{z}_1|^2$ is a diagonal matrix, and so computing equation (99) does not include performing matrix inversion, which can be a costly computational operation. Let $\mathcal{Z}_1^H (I_{N_r M} + \lambda^{-1} \varepsilon^{-1} \mathcal{Z}_1 \mathcal{Z}_1^H)^{-1} \mathcal{Z}_1 = \emptyset$ be a $(N_r^2 M \times N_r^2 M)$ block matrix, where each sub-matrix $\emptyset_{i,j}$ is a diagonal matrix given by $\emptyset_{i,j} = \breve{z}_{i,1}^H (I_{N_r M} + \lambda^{-1} \varepsilon^{-1} \mathcal{Z}_1 \mathcal{Z}_1^H)^{-1} \breve{z}_{j,1}$. Therefore, the structure of $\mathcal{P}_1^1$ corresponds to these structure of $\emptyset$ where each sub-matrix $P_{1,(i,j)} = \lambda^{-1}[\varepsilon^{-1} I_{N_r M} - \lambda^{-1} \varepsilon^{-2} I_{N_r M} \emptyset_{i,j}]$ is also a diagonal matrix.

For k=1, $$P_2^1 = \lambda^{-1}[P_1^1 - \lambda^{-1} P_1^1 \mathcal{Z}_2^H (I_{N_r M} + \lambda^{-1} \mathcal{Z}_2 P_1^1 \mathcal{Z}_2^H)^{-1} \mathcal{Z}_2 P_1^1] \qquad (100)$$

where $\mathcal{Z}_2 P_1^1 \mathcal{Z}_2^H = \sum_{j=1}^{N_r} \breve{z}_{j,2} (\sum_{i=1}^{N_r} \breve{z}_{i,2} P_{1,(i,j)}^1)$ is a diagonal matrix. Therefore, the matrix inversion becomes $N_r^2 M$ scalar inversions. For k>1, the structure of $\mathcal{P}_k^1$ corresponds to the structure of $\mathcal{P}_1^1$. In addition, the computation of $\mathcal{P}_k^2$ follows a process that corresponds to the computation of $\mathcal{P}_k^1$ described herein.

Figure 7:
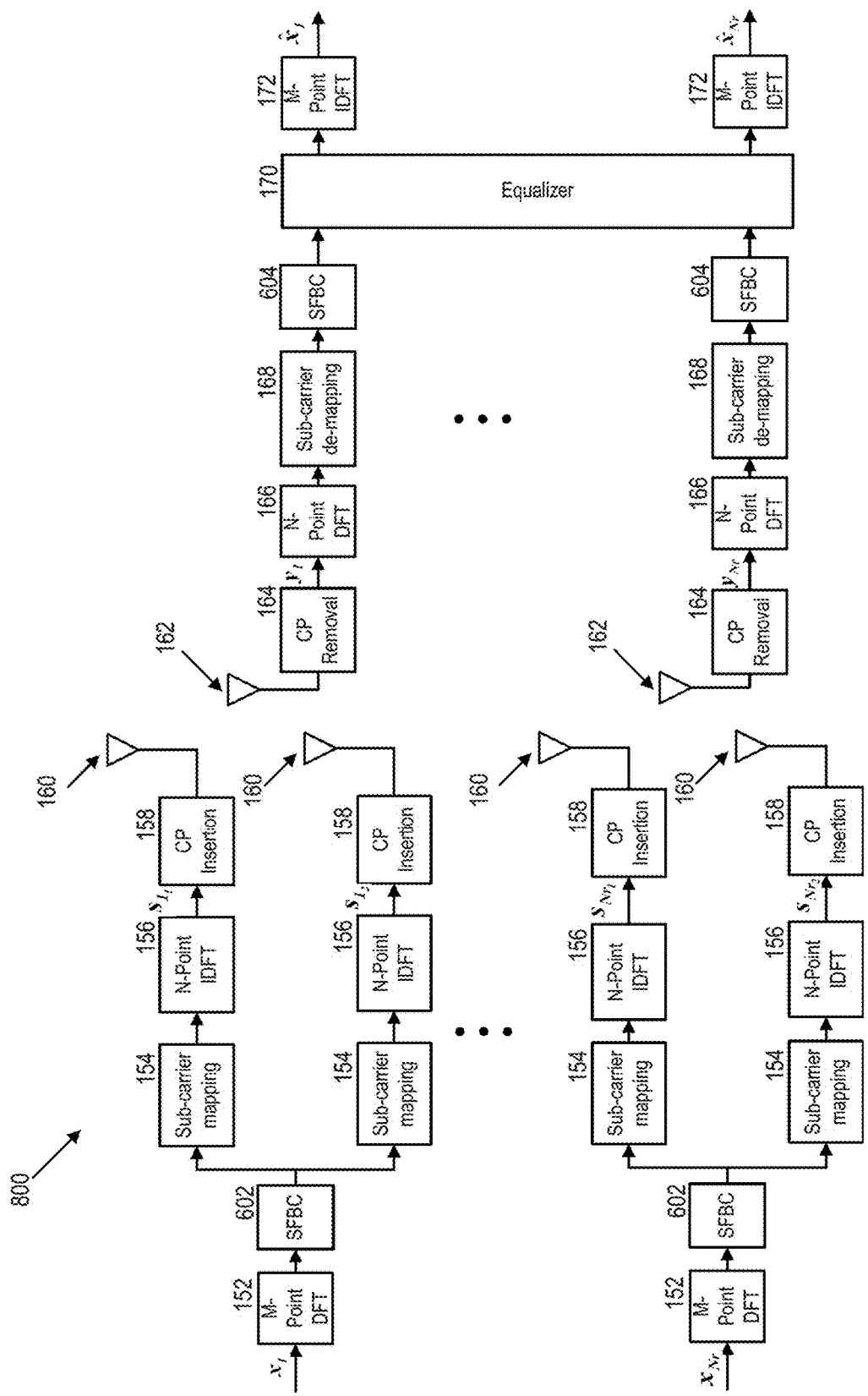
FIG. 7 is an exemplary block diagram of a transceiver for a hybrid SFBC and SM SC-FDMA system, according to certain embodiments.

FIG. 7 is an exemplary block diagram of a transceiver 800 for a hybrid SFBC and SM SC-FDMA system, according to certain embodiments. The hybrid SFBC system can include SFBC and SM SC-FDMA coding techniques to signals. The transceiver 800 includes the functionality of SFBC and SM SC-FDMA techniques so that both capacity and performance of the transceiver 800 can be increased. The transceiver 800 has $N_r$ signals that are input into an M-point DFT module 152 that applies the M-point DFT to a data block, $x^{(m)}$, to transform the signal block $x^{(m)}$ to the frequency-domain symbol, $X^{(m)} = [X(0)^{(m)}; X(1)^{(m)}; \ldots; X(M-1)^{(m)}]^T$. At the SFBC module 602, the processing circuitry of the transceiver 600 applies the SFBC coding scheme to the data block, which results in $X_2^{(m)} = [X(0)^{(m)}; -X^*(1)^{(m)}; \ldots; X(M-2)^{(m)}; -X^*(M-1)^{(m)}]^T$, and $X_1^{(m)} = [X(1)^{(m)}; X^*(0)^{(m)}; \ldots; X(M-1)^{(m)}; X^*(M-2)^{(m)}]^T$, where (.)* denotes the complex-conjugate operation. After mapping is performed at mapping module 154, and the circuitry applies the N-point IDFT at the IDFT module 156, the transmit signals from the two antennas are referred to as $s_1^{(m)}$ and $s_2^{(m)}$ which correspond to $X_1^{(m)}$ and $X_2^{(m)}$. In addition, CP is inserted into the transmit signals at CP insertion module 158. The received signal for the $m^{th}$ user, after received signal is decoded at the SFBC module 604.

The transmit signals can be transmitted across a channel via transmitter 160 and received at receiver 162. At the receiver 610, the circuitry of the transceiver 600 performs CP removal at the CP removal module 164 and applies an N-point DFT at N-point DFT module 166. In addition, at sub-carrier de-mapping module 168, the circuitry de-maps the received signal as discussed with respect to the de-mapping module 118 in transceiver 100.

The transceiver 800 includes $2N_t$ transmit antennas 160 for $N_r$ receive antennas 162. Collecting the received SC-FDMA symbols into one vector produces $$\begin{bmatrix} y_{1_{oe}} \\ y_{2_{oe}} \\ \vdots \\ y_{N_{r_{oe}}} \end{bmatrix} = \begin{bmatrix} \Lambda_{11} & \Lambda_{21} & \ldots & \Lambda_{N_r 1} \\ \Lambda_{12} & \Lambda_{22} & \ldots & \Lambda_{N_r 2} \\ \vdots & \vdots & \ddots & \vdots \\ \Lambda_{1 N_r} & \Lambda_{2 N_r} & \ldots & \Lambda_{N_r N_r} \end{bmatrix} \begin{bmatrix} \mathcal{X}_{1_{oe}} \\ \mathcal{X}_{2_{oe}} \\ \vdots \\ \mathcal{X}_{N_{r_{oe}}} \end{bmatrix} + \begin{bmatrix} \mathcal{N}_{1_{oe}} \\ \mathcal{N}_{2_{oe}} \\ \vdots \\ \mathcal{N}_{N_{r_{oe}}} \end{bmatrix} \qquad (101)$$

$$\triangleq \Lambda \mathcal{X}_{oe} + \mathcal{N}_{oe}$$

where $\Lambda_{ij}$ is the frequency-domain channel matrix from the $i^{th}$ user's transmit antenna 160 to the $j^{th}$ receive antenna 162 having an Alamouti-like structure, and $\mathcal{Y}_{k_{i_{oe}}}$ is the received vector after SFBC at the $i^{th}$ antenna. Since $N_t = 2 \times N_r$, and the feedforward coefficient matrices can have a structure that corresponds to the structure of the channel matrix, $\Lambda$, the output of the equalizer can be represented by $$\begin{bmatrix} \breve{\mathcal{X}}_{1,oe} \\ \breve{\mathcal{X}}_{2,oe} \\ \vdots \\ \breve{\mathcal{X}}_{N_{r_{oe}}} \end{bmatrix} = \begin{bmatrix} \Upsilon_{1,1} & \Upsilon_{1,2} & \ldots & \Upsilon_{1,N_r} \\ \Upsilon_{2,1} & \Upsilon_{2,2} & \ldots & \Upsilon_{2,N_r} \\ \vdots & \vdots & \ddots & \vdots \\ \Upsilon_{N_r,1} & \Upsilon_{N_r,2} & \ldots & \Upsilon_{N_r,N_r} \end{bmatrix} \qquad (102)$$

$$\begin{bmatrix} y_{1_{oe}} \\ y_{2_{oe}} \\ \vdots \\ y_{N_{r_{oe}}} \end{bmatrix} + \begin{bmatrix} \Psi_{1,1} & \Psi_{1,2} & \ldots & \Psi_{1,N_r} \\ \Psi_{2,1} & \Psi_{2,1} & \ldots & \Psi_{2,N_r} \\ \vdots & \vdots & \ddots & \vdots \\ \Psi_{N_r,1} & \Psi_{N_r,2} & \ldots & \Psi_{N_r,N_r} \end{bmatrix} \begin{bmatrix} \mathcal{D}_{1_{oe}} \\ \mathcal{D}_{2_{oe}} \\ \vdots \\ \mathcal{D}_{N_{r_{oe}}} \end{bmatrix}$$

where $\mathcal{D}_{i_{oe}}$ is equal to $X_{i_{oe}}$ in training mode and the frequency-domain decisions on $\breve{X}_{i_{oe}}$ in the decision-directed mode. $\Upsilon_{i,j}$ and $\Psi_{i,j}$ are the Alamouti-like matrices of the feedforward and diagonal matrices of the feedback coefficients of the equalizer, respectively, For example, $$\Upsilon_{i,j} = \begin{bmatrix} \Upsilon_{i,j}^1 & \Upsilon_{i,j}^2 \\ \Upsilon_{i,j}^{2*} & -\Upsilon_{i,j}^{1*} \end{bmatrix}, \Psi_{i,j} = \begin{bmatrix} \Psi_{i,j}^1 & 0 \\ 0 & -\Psi_{i,j}^{2*} \end{bmatrix} \qquad (103)$$

$\Upsilon_{i,j}^1$, $\Upsilon_{i,j}^2$, $\Psi_{i,j}^1$, and $\Psi_{i,j}^2$ are diagonal matrices, according to certain embodiments. However, a closed-form approach to computing the equalizer output may not be used in an adaptive approach. For example for the $i^{th}$ user, $$\check{X}_{ioe} = \begin{bmatrix} \check{X}_{i_o} \\ \check{X}_{i_e} \end{bmatrix} = \sum_{j=1}^{N_r} (\Upsilon_{i,j} y_{joe} + \Psi_{i,j} \mathcal{D}_{joe}) \quad (104)$$

Equation (104) can also be rewritten as $$\begin{bmatrix} \check{X}_{i_o} \\ \check{X}_{i_e}^* \end{bmatrix} = \sum_{j=1}^{N_r} \left( \begin{bmatrix} diag(y_{je}) & diag(y_{jo}^*) \\ -diag(y_{je}) & diag(y_{jo}^*) \end{bmatrix} \begin{bmatrix} \mathcal{F}_{i,j}^1 \\ \mathcal{F}_{i,j}^2 \end{bmatrix} + \begin{bmatrix} diag(\mathcal{D}_{jo}) & 0 \\ 0 & diag(\mathcal{D}_{je}^*) \end{bmatrix} \begin{bmatrix} \mathcal{B}_{i,j}^1 \\ \mathcal{B}_{i,j}^2 \end{bmatrix} \right) \quad (105)$$

$$\triangleq \sum_{j=1}^{N_r} y_{oe}^1 \mathcal{F}_{i,j} + \mathcal{D}_{oe}^1 \mathcal{B}_{i,j}$$

where $\mathcal{F}_{i,j}^1$ and $\mathcal{F}_{i,j}^2$ are the vectors having the diagonal elements of $\Upsilon_{i,j}^1$ and $\Upsilon_{i,j}^2$, respectively. Likewise, $\mathcal{B}_{i,j}^1$ and $\mathcal{B}_{i,j}^2$ are the vectors having the diagonal elements of $\Psi_{i,j}^1$ and $\Psi_{i,j}^2$, respectively. Also, $\mathcal{F}_{i,j} = [\mathcal{F}_{i,j}^{1T} \ldots \mathcal{F}_{i,j}^{2T}]^T$ and $\mathcal{B}_{i,j} = [\mathcal{B}_{i,j}^{1T} \ldots B_{i,j}^{2T}]^T$. For all users, $$\begin{bmatrix} \check{X}_{1_{oe}} \\ \vdots \\ \check{X}_{N_{r_{oe}}} \end{bmatrix} = \sum_{j=1}^{N_r} \left( \begin{bmatrix} y_{oe}^j & & \\ & \ddots & \\ & & y_{oe}^j \end{bmatrix} \begin{bmatrix} \mathcal{F}_{1,j} \\ \vdots \\ \mathcal{F}_{N_r,j} \end{bmatrix} + \begin{bmatrix} \mathcal{D}_{oe}^j & & \\ & \ddots & \\ & & \mathcal{D}_{oe}^j \end{bmatrix} \begin{bmatrix} \mathcal{B}_{1,j} \\ \vdots \\ \mathcal{B}_{N_r,j} \end{bmatrix} \right) \quad (106)$$

which can be rewritten in compact form as $$\check{X}_{oe} = \sum_{j=1}^{N_r} \left[ \check{\mathcal{Z}}_j \mathcal{F}_j + \mathcal{D}_j' \mathcal{B}_j \right] \quad (107)$$

At the $k^{th}$ instant, the output from the equalizer 170 is computed as $$\check{X}_{oe,k} \triangleq \mathcal{Z}_k \mathcal{F}_k + \mathcal{D}_k \mathcal{B}_k \quad (108)$$

where $\mathcal{Z}_k = [\check{z}_{1,k} \ldots \check{z}_{N_r,k}]$, $\mathcal{D}_k = [\check{\mathcal{D}}_{1,k} \ldots \check{\mathcal{D}}_{N_r,k}]$, $\mathcal{F}_k = [\mathcal{F}_{1,k}^T \ldots \mathcal{F}_{N_r,k}^T]^T$ and $\mathcal{B}_k = [\mathcal{B}_{1,k}^T \ldots \mathcal{B}_{N_r,k}^T]^T$. In addition, the output of the equalizer 170 is fed to a M-point IDFT module 172 where the equalized symbols are transformed back to the time domain via IDFT.

The desired response can be defined as $D_k = [D_{1,k}^T \ldots D_{N_r,k}^T]^T$, and $$D_{i,k} = \begin{cases} \begin{bmatrix} X_{i_o,k} \\ X_{i_e,k}^* \end{bmatrix}, & \text{for training mode} \\ \hat{X}_{i_{oe},k}, & \text{for decision-directed mode} \end{cases}$$

Now $\mathcal{W}_k$ can be represented by equation (58), $\mathcal{A}_k$ as in equation (46), and $\varepsilon_k$ as in equation (76).

In addition, the complexity of determining the equalizer output can be reduced based on the structure of the matrices used in the equalizer output determination. For example, starting with k=0 and using $P_0^1 = \epsilon^{-1} I_{(N_r)^2 M}$, $P_1^1$ can be represented by $$P_1^1 = \lambda^{-1} [\epsilon^{-1} I_{(N_r)^2 M} - \lambda^{-1} \epsilon^{-1} I_{(N_r)^2 M} \mathcal{Z}_1^H (I_{N_r M} + \lambda^{-1} \epsilon^{-1} \mathcal{Z}_1 \mathcal{Z}_1^H)^{-1} \mathcal{Z}_1 \epsilon^{-1} I_{(N_r)^2 M}] \quad (109)$$

In addition, $\mathcal{Z}_1 \mathcal{Z}_1^H = [|\check{z}_{1,1}|^2 + \ldots + |\check{z}_{N_r,1}|^2]$, where $\check{z}_{i,k} \check{z}_{i,k}^H = diag[|\mathcal{Y}_{oe}^i|^2, \ldots, |\mathcal{Y}oe^i|^2]$. Since $|\check{z}_k|^2$ has a diagonal structure, computing equation (109) does not include performing matrix inversion, which can be a costly computational operation. In addition, $Z_1^H(I_{N_r M} + \lambda^{-1} \epsilon^{-1} \mathcal{Z}_1 \mathcal{Z}_1^H)^{-1} \mathcal{Z}_1 = \emptyset$ is a $(N_r^2 M \times N_r^2 M)$ matrix, where each entry $\emptyset_{i,j} = \check{z}_{i,1}^H (I_{N_r M} + \lambda^{-1} \epsilon^{-1} \mathcal{Z}_1 \mathcal{Z}_1^H)^{-1} \check{z}_1$ is a $N_r M \times N_r M$ block diagonal matrix. Each sub-matrix in $\emptyset_{i,j}$ is a M×M block matrix, which further includes four $$\frac{M}{2} \times \frac{M}{2}$$

diagonal matrices. Therefore, the structure of $\mathcal{P}_1^1$ corresponds to the structure of $\emptyset$ where each sub-matrix $\mathcal{P}_{1,(i,j)}^1 = \lambda^{-1} [\epsilon^{-1} I_{N_r M} - \lambda^{-1} \epsilon^{-2} I_{N_r M} \emptyset_{i,j}]$ is a $N_r M \times N_r M$ block diagonal matrix.

For k=1, $$P_2^1 = \lambda^{-1} [P_1^1 - \lambda^{-1} P_1^1 \mathcal{Z}_2^H (I_{N_r M} + \lambda^{-1} \mathcal{Z}_2 P_1^1 \mathcal{Z}_2^H)^{-1} \mathcal{Z}_2 P_1^1] \quad (110)$$

In addition, $$(I_{N,M} + \lambda^{-1} \mathcal{Z}_2 P_1^1 \mathcal{Z}_2^H)^{-1} = \begin{bmatrix} A_1^{-1} & & \\ & \ddots & \\ & & A_{N_r}^{-1} \end{bmatrix} \quad (111)$$

where $$A_i = \begin{bmatrix} A_{i,1} & A_{i,2} \\ A_{i,3} & A_{i,4} \end{bmatrix},$$

and each entry $A_{i,j}$ is a diagonal matrix. Therefore, the inverse of $A_i$ can be determined using block matrix inversion described in T. Kailath, *Linear Systems*. Englewood Cliffs, N.J.: Prentice Hall, 1980, where all of the sub-matrices are diagonal, therefore, the inversions can be determined via scalar inversion, which allows for a reduction in computational complexity. For k>1, the structure of $\mathcal{P}_k^1$ corresponds to the structure of $\mathcal{P}_1^1$. In addition, the computation of $\mathcal{P}_k^2$ follows a process that corresponds to the computation of $\mathcal{P}_k^1$ described herein for the spatially-multiplexed (SM) case.

Figure 8:
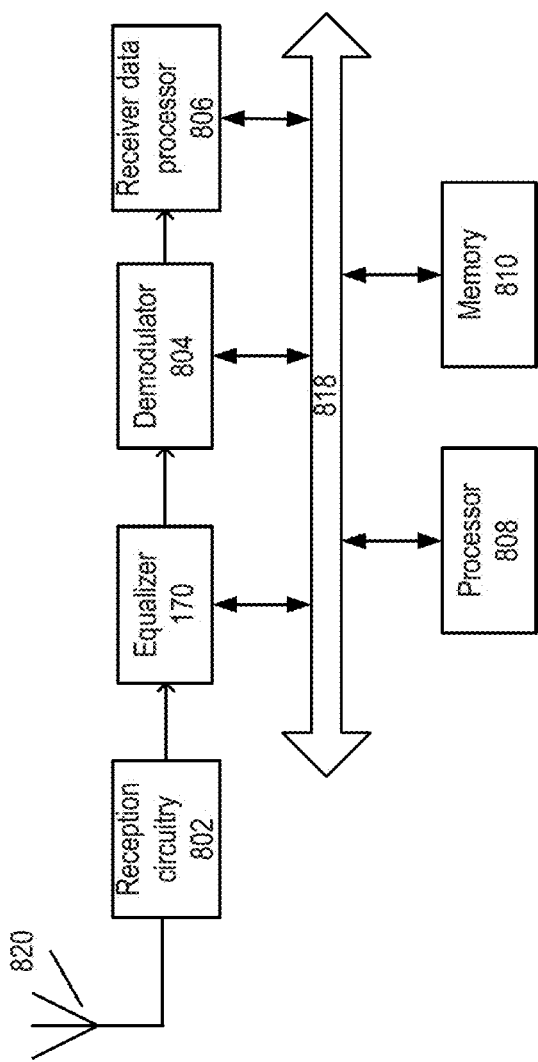
FIG. 8 is an exemplary block diagram of a receiver, according to certain embodiments.

FIG. 8 is a block diagram representation of a receiver, according to certain embodiments. The receiver 104 may include an antenna 820, reception circuitry 802, the equalizer 170, a demodulator 804, a receiver data processor 806, a processor 808, a memory 810, and a bus 818. The receiver 104 may be part of the base station 20. At the base station 250, the reception circuitry 802 may receive an RF signal from the antenna 820. The reception circuitry 802 may also receive other types of signals such as microwave, optical, or the like. The base station 250 may include a plurality of antennas. The reception circuitry 802 provides the RF signal to the equalizer 170. The equalizer 170 may use any of the equalization techniques described previously to provide the output samples to the demodulator 804. The demodulator 804 process the output samples and provides symbol estimates to the receiver data processor 806. The receiver data processor 806 process the symbol estimates and provides decoded data. The memory 810 may store data and program code for the receiver 104. The memory 810 may store past data performance, noise level, number of particles used, and filter coefficients. The equalizer 170, the demodulator 804, the receiver data processor 806, the processor 808, and the memory 810 are connected to each other by the bus 818. The memory 810 may include, for example, a magnetic storage device such as a Hard Disk Drive (HDD), a semiconductor storage device, an optical storage device, or a magneto-optical storage device. The memory 810 may be utilized as working memory by the processor 808 while executing process and algorithms of the present disclosure. The antenna 820 receives electromagnetic wave signals between base stations, mobile devices, for performing radio-based communication, such as the various forms of cellular telephone communication. The processor 808 may be a Xenon or Core processor from Intel of America or an Opteron processor from AMD of America, or may be other processor types that would be recognized by one of ordinary skill in the art. Alternatively, the processor 808, the receiver data processor 806, and the equalizer 170 may be implemented on an FPGA, ASIC, PLD or using discrete logic circuits, as one of ordinary skill in the art would recognize.

The hardware description above, exemplified by any one of the structure examples shown in FIG. 8 constitutes or includes specialized corresponding structure that is programmed or configured to perform the adaptation algorithm 300 shown in FIG. 3.

The system of the present disclosure may be further programmed to execute any algorithm and method disclosed in N. Iqbal, N. Al-Dhabir, and A. Zerguine, "Adaptive Frequency-Domain Decision Feedback Equalization using constraint-based RLS for Uplink LTE" and N. Iqbal, N. Al-Dhabir, and A. Zidouri, "Adaptive Frequency-Domain RLS DFE for Uplink MIMO SC-FDMA," the entire disclosures of which are incorporated herein by reference.

According to certain embodiments, Minimum Mean Square Error (MMSE), transient, steady-state, tracking and computational complexity analyses can be performed for the implementations of the SC-FDMA described herein. In the derivations described further herein, the data sequences (both transmitted data and detected data) can be assumed to be independent and identically distributed (i.i.d) with zero mean, and independent of the noise. The optimal MMSE equalizer weights Wo for $i^{th}$ frequency bin are given as described in N. Benvenuto and S. Tomasin, "Iterative Design and Detection of a DFE in the Frequency Domain," *IEEE Transactions on Communications*, vol. 53, pp. 1867-1875, November 2005, the entire contents of which is incorporated by reference in its entirety and C. Zhang, Z. Wang, Z. Yang, J. Wang, and J. Song, "Frequency Domain Decision Feedback Equalization for Uplink SC-FDMA," *IEEE Transactions on Broadcasting*, vol. 56, pp. 253-257, June 2010, the entire contents of which are incorporated by reference in its entirety, for LE, $$\mathcal{F}^o(i) = \frac{\sigma_x^2 \Lambda(i)^*}{\sigma_x^2 |\Lambda(i)|^2 + \frac{N}{M}\sigma_N^2}$$

and for DFE $$\mathcal{F}^o(i) = \frac{\sigma_x^2 \Lambda(i)^*}{\sigma_x^2 \sum_{j=0}^{M-1} |\Lambda(j)|^2 + \frac{N}{M}\sigma_N^2},$$

$$\mathcal{B}^o(i) = -\mathcal{F}^o(i)\Lambda(i) + \frac{1}{M}\sum_{j=0}^{M-1} \mathcal{F}^o(j)\Lambda(j)$$

Using these weights, the corresponding $i^{th}$ frequency bin MMSE for the LE ($J_L(i)$) and the DFE ($J_D(i)$) can be derived, respectively, and expressed as $$J_L(i) = \frac{N\sigma_N^2 \sigma_x^2 (M|\Lambda(i)|^2 \sigma_x^2 + N\sigma_N^2)}{(\sigma_x^2 |\Lambda(i)|^2 M + N\sigma_N^2)^2} \quad (112)$$

$$\xi_{k+1}(i) = \xi_{k+1}^o(i) + \alpha_{k+1}(i)[\mathcal{W}^o(i) - \mathcal{W}_k(i)] \quad (113)$$
$$\widetilde{\mathcal{W}}_k(i)$$

and

For transient analysis, the transient behavior of the RLS AFD-DFE can be derived in a stationary environment by assuming that the forgetting factor $\lambda$ is unity. The MSE of the RLS AFD-DFE at instant k+1 is represented by $$J_{k+1}^T(i) = E|\xi_{k+1}(i)|^2 \quad (114)$$

The a priori estimation output error $\xi_{k+1}(i)$ can be expressed as $$J_D(i) = \frac{N\sigma_N^2 \sigma_x^2 (M|\Lambda(i)|^2 \sigma_x^2 + N\sigma_N^2)}{(\sigma_x^2 |\Lambda(i)|^2 M + N\sigma_N^2)^2} \quad (115)$$

where $X_k(i) = a_k(i)\mathcal{W}^o(i) + \xi_k^o(i)$, $a_k(i) = [\mathcal{Y}_k(i)\ D_k(i)]$ and $\mathcal{W}_k(i) = [\mathcal{F}_k(i)\ \mathcal{B}_k(i)]^T$·g equation (115) into equation (114) and expanding terms results in $$J_{k+1}^*(i) = \underbrace{E|\xi_{k+1}^o(i)|^2}_{J_U(i)} + E\alpha_{k+1}(i)\widetilde{W}_k(i)\widetilde{W}_k^H(i)\alpha_{k+1}^H(i) + \quad (116)$$
$$E\alpha_{k+1}(i)\widetilde{W}_k(i)\xi_{k+1}^{o_k}(i) + E\xi_{k+1}^o(i)\widetilde{W}_k^H(i)\alpha_{k+1}^H(i)$$

The second expectation in equation (116) can be expressed as $$E\alpha_{k+1}(i)\widetilde{W}_k(i)\widetilde{W}_k^H(i)\alpha_{k+1}^H(i) = E\ Tr\{\alpha_{k+1}(i)\widetilde{W}_k(i)\widetilde{W}_k^H(i)\alpha_{k+1}^H(i)\} \quad (117)$$
$$= E\ TR\{\widetilde{W}_k(i)\widetilde{W}_k^H(i)\alpha_{k+1}^H(i)\alpha_{k+1}(i)\}$$
$$= Tr\ E\{\widetilde{W}_k(i)\widetilde{W}_k^H(i)\alpha_{k+1}^H(i)\alpha_{k+1}(i)\}$$

where $Tr\{\cdot\}$ is the trace of a matrix. Using an assumption that the product $\widetilde{W}_k(i)\widetilde{W}_k(i)$ varies at a rate that is slower than the product $a_{k+1}^H(i)a_{k+1}(i)$, $$E\widetilde{W}_k(i)\widetilde{W}_k^H(i)a_{k+1}^H(i)a_{k+1}(i) \approx Tr[E\widetilde{W}_k(i)\widetilde{W}_k^H(i)$$
$$Ea_{k+1}^H(i)a_{k+1}(i)] \quad (118)$$

where $Ea_{k+1}^H(i)a_{k+1}(i) = R_{\mathcal{A}}(i)$ is an input correlation matrix having diagonal structure, $$i.e.,\ R_{\mathcal{A}}(i) = diag\left(\left[|\Lambda(i)|^2 \sigma_x^2 + \frac{N}{M}\sigma_N^2\ \sigma_x^2\right]\right).\ \text{To} \quad (119)$$

determine $E\widetilde{W}_k(i)\widetilde{W}_k^H(i)$, $\mathcal{W}_k(i) = \Theta_k^{-1}(i)R_k(i)$ where $R_k(i) = \sum_{j=0}^k a_k^H(i)X_j(i)$. Using the values of $\Theta_j(i)$, $R_k(i)$, and $X_k(i)$ in equation (119) and ignoring the initial conditions, $\widetilde{W}_k(i)$ can be represented by $$\tilde{W}_k(i) = -\Theta_k^{-1}(i)\sum_{j=0}^{k+1} \alpha_j^H(i)\xi_j^o(i) + \Theta_k^{-1}(i)\alpha_{k+1}[0\ 1]^T \quad (120)$$

Now, $$|\tilde{W}_k(i)| \leq \left| -\Theta_k^{-1}(i)\underbrace{\sum_{j=0}^{k+1} \alpha_j^H(i)\xi_j^o(i)}_{\tilde{W}_k(i)} \right| \quad (121)$$

Therefore, the weight-error correlation matrix $\tilde{W}_k'(i)$ is given as $$E\tilde{W}_k'(i)\tilde{W}_k'^H(i) = E\Theta_k^{-1}(i)\sum_{j=0}^{k+1}\alpha_j^H(i)\alpha_j(i)\Theta_k^{-1}(i)\xi_j^o(i)\xi_j^{o*}(i) \quad (122)$$

Using an assumption that $a_k(i)$, and therefore $\Theta_k^{-1}(i)$, is independent of the noise $\xi_k^o(i)$, equation (122) can be expressed as a product of two expectations as follows:

$$E\tilde{W}_k'(i)\tilde{W}_k'^H(i) = E\Theta_k^{-1}(i)\sum_{j=0}^{k+1}\alpha_j^H(i)\alpha_j(i)\Theta_k^{-1}(i)\ E\xi_j^o(i)\xi_j^{o*}(i) \quad (123)$$

$$= J_D(i)\ E\Theta_k^{-1}(i)$$

Assuming ergodicity, the ensemble-average correlation matrix of the input of the AFD-DFE can be expressed as $$R_{\mathcal{A}}(i) = \frac{1}{k}\Theta_k(i).$$

Therefore, the weight-error correlation matrix can be reduced to $$E\tilde{W}_k(i)\tilde{W}_k^H(i) = \frac{1}{k}J_D(i)R_{\mathcal{A}}^{-1}(i).$$

Therefore, $$E\alpha_{k+1}(i)\tilde{W}_k'(i)\tilde{W}_k'^H(i)\alpha_{k+1}^H(i) \approx \frac{1}{k}J_D(i)Tr\{R_{\mathcal{A}}(i)R_{\mathcal{A}}^{-1}(i)\} = \frac{2}{k}J_D(i) \quad (124)$$

The third and fourth expectations in equation (116) are zero because $\tilde{w}_k(i)$ depends on past values of $a_{k+1}(i)$ and $\xi_{k+1}^o(i)$. Also, $a_{k+1}(i)$ and $\xi_{k+1}^o(i)$ are statistically independent, and $\xi_{k+1}^o(i)$ has zero mean. Therefore, $$J_{k+1}''(i) = J_D(i)\left[1+\frac{2}{k}\right] \geq J_{k+1}^r(i) \quad (125)$$

To compare the RLS AFD-DFE (both constrained and unconstrained) and LMS AFD-DFE, the MSE of the LMS AFE-DFE can be shown based on S. Haykin, Adaptive Filter Theory. Prentice Hall, Upper-Saddle River, N.J., 4th ed., 2002, the entire contents of which is herein incorporated by reference, to be $$J_{k+1}''^u(i) = \quad (126)$$

$$J_D(i)\left[1+\mu\sum_{j=0}^{l}\frac{r_j}{2-\mu r_j}\right] + \sum_{j=0}^{l} r_j\left(|v_j(0)|^2 - \frac{\mu J_D(i)}{2-\mu r_j}\right)(1-\mu r_j)^{2k}$$

where $r_j$ is the $j^{th}$ eigenvalue of the correlation matrix $R_{\mathcal{A}}$ and $\upsilon(k+1)=[\upsilon_0(k+1),\ [\upsilon_1(k+1)]^T=(I_2-\mu\mathcal{A}_{k+1}(i)^H\varepsilon_{k+1}(i)$. The evolution of $J_{k+1}^u(i)$ with step size $\mu$ is governed by exponential quantity $(1-\mu r_j)^{2k}$. Therefore, the RLS AFD-DFE (for both constrained and unconstrained cases) converges faster than the LMS AFD-DFE. The simulation results discussed further herein illustrate that the RLS AFD-DFE converges more quickly than the LMS AFD-DFE.

For steady-state analysis, the update constrained recursion of equation (52) for the $i^{th}$ frequency bin can be written as $$\mathcal{W}_{k+1}(i) = \mathcal{W}_k(i) + \mathcal{P}_{k+1}(i)(a_{k+1}^H(i)\varepsilon_{k+1}(i) - \alpha_{k+1}G^T) \quad (127)$$

Likewise, the update unconstrained recursion of equation (53) for the $1^{th}$ frequency bin can be written as $$\mathcal{W}_{k+1}(i) = \mathcal{W}_k(i) + \mathcal{P}_{k+1}(i)a_{k+1}^H(i)\xi_{k+1}(i) \quad (128)$$

In terms of the weight error vector $\tilde{W}'_{k+1}(i)$, $$\tilde{W}'_{k+1}(i) = \tilde{W}'_k(i) - \mathcal{P}_{k+1}(i)a_{k+1}^H(i)\xi_{k+1}(i) \quad (129)$$

Multiplying equation (129) by $a_{k+1}(i)$ from the left, the weight error vector can be written in terms of a priori estimation error $\xi_{k+1}^a(i)$ and a posteriori estimation error $\xi_{k+1}^p(i)$ as follows:

$$\frac{\alpha_{k+1}(i)\tilde{W}'_{k+1}(i)}{\xi_{k+1}^a(i)} = \frac{\alpha_{k+1}(i)\tilde{W}'_{k+1}(i)}{\xi_{k+1}^a(i)} - \frac{\alpha_{k+1}(i)\mathcal{P}_{k+1}(i)a_{k+1}^H(i)\xi_{k+1}(i)}{\|\alpha_{k+1}(i)\|_\mathcal{P}} \quad (130)$$

where $\|\bullet\|_\mathcal{P}$ stands for the squared-weighted Euclidean norm of a vector. Combining equations (129) and (130) to eliminate $\xi_{k+1}$, $$\tilde{W}'_{k+1}(i) + \mathcal{P}_{k+1}(i)a_{k+1}^H(i)(\|\alpha_{k+1}(i)\|_\mathcal{P})^\dagger \xi_{k+1}^a(i) = \quad (131)$$

$$\tilde{W}'_k(i) + \mathcal{P}_{k+1}(i)6o_{k+1}^H(i)(\|\alpha_{k+1}(i)\|_\mathcal{P})^\dagger \xi_{k+1}^p(i)$$

where $(\bullet)^\dagger$ represents the pseudo-inverse. By equating the energies (squared Euclidean norms) of both sides of equation (131) with $[\mathcal{P}_{k+1}(i)]^{-1}$ as a weighting matrix, the energy conservation relation becomes $$\|\tilde{W}'_{k+1}(i)\|_{\mathcal{P}^{-1}}^2 + \overline{a}_{k+1}(i)|\xi_{k+1}^a(i)|^2 = \|\tilde{W}'_k(i)\|_{\mathcal{P}^{-1}}^2 + \overline{a}_{k+1}(i)|\xi_{k+1}^p(i)|^2 \quad (132)$$

Taking the expectation of equation (132) and using the steady-state approximations, $$E\mathcal{P}_{k+1}(i) \approx (1-\lambda)\mathcal{R}_{\mathcal{A}}^{-1} = \mathcal{P},\ E\tilde{W}'_{k+1}(i) = E\tilde{W}'_k(i)\text{ and}$$

$$E\|\tilde{W}'_{k+1}(i)\|_{\mathcal{P}^{-1}}^2 = E\|\tilde{W}'_k(i)\|_{\mathcal{P}^{-1}}^2,$$

$$E\overline{a}_{k+1}(i)|\xi_{k+1}^a(i)|^2 = E\overline{a}_{k+1}(i)|\xi_{k+1}^p(i)|^2,\ k\to\infty \quad (133)$$

Substituting $\xi_{k+1}^p(i)$ from equation (130) into equation (133) results in $$E\overline{a}_{k+1}(i)|\xi_{k+1}^a(i)|^2 = E\overline{a}_{k+1}(i)|\xi_{k+1}^p(i)|^2 - \|a_{k+1}(i)\|_\mathcal{P}^2 |\xi_{k+1}(i)|^2,\ k\to\infty \quad (134)$$

which upon expansion and simplification reduces to $$E\|a_{k+1}(i)\|_\mathcal{P}^2 |\xi_{k+1}(i)|^2 = 2Re(E\xi_{k+1}^{a*}(i)\xi_{k+1}(i)),\ k\to\infty \quad (135)$$

As $\xi_{k+1}(i)=\xi_{k+1}^o(i)+\xi_{k+1}^a(i)$, equation (135) becomes $$J_D(i)E\|\alpha_{k+1}(i)\|_\mathcal{P}+E\|\alpha_{k+1}(i)\|_\mathcal{P}|\xi_{k+1}^a(i)|^2 = \underbrace{2E|\xi_{k+1}^a(i)|^2}_{J'_{exss}(i)}, k\to\infty \quad (136)$$

where $J'_{exss}(i)$ is the excess mean square error (EMSE). It can be assumed that at steady-state, $\|a_{k+1}(i)\|_\mathcal{P}$ is independent of $\xi_{k+1}^a(i)$, which allows separation of expectation $E\|a_{k+1}(i)\|_\mathcal{P}$ into a product of two expectations as follows:

$$E\|a_{k+1}(i)\|_\mathcal{P}|\xi_{k+1}^a(i)|^2 = E\|a_{k+1}(i)\|_\mathcal{P} E|\xi_{k+1}^a(i)|_2 \quad (137)$$

If $\mathcal{P}_{k+1}(i)$ is replaced by the assumed mean value, the following approximation is obtained:

$$E\|a_{k+1}(i)\|_\mathcal{P} \approx Tr\{\mathcal{R}\mathcal{P}\}=2(1-\lambda) \quad (138)$$

Substituting equation (138) into equation (136) results in $$J'_{exss}(i) = \frac{J_D(i)(1-\lambda)}{\lambda} \quad (139)$$

Therefore, the MSE at the steady-state $J_{ss}(i)$ is given as $$J'_{ss}(i) = J_D(i) + J'_{exss}(i) = \frac{J_D(i)}{\lambda}. \quad (140)$$

Another cause of ICI is the Doppler Effect, which can occur due to motion of a user of an external device, such as a mobile device. This motion causes the channel $h^{(m)}$ to be time variant with each tap $h_i^{(m)}$, $i=1; \ldots ; L(m)$ being modeled as a Wide Sense Stationary (WSS) narrow-band complex Gaussian process, independent of the other taps. Hence, the amplitude $|h_i^{(m)}|$ is assumed to be Rayleigh distributed, i.e., $$P(|h_i^{(m)}|) = |h_i^{(m)}|e^{-|h_i^{(m)}|^2/2}, |h_i^{(m)}| \geq 0 \quad (141)$$

and the phase of the motion is uniformly distributed, i.e., $$P(\angle h_i^{(m)}) = \frac{1}{2\pi}, -\pi \leq \angle h_i^{(m)} \leq \pi \quad (142)$$

The autocorrelation function of the $h_i^{(m)}$ can be modeled as a zeroth-order Bessel function of the first kind, i.e., $$\mathcal{R}(n) \triangleq \mathcal{J}_o(2\pi f_d t_s n), n=\ldots,-1,0,1\ldots \quad (143)$$

where $f_d$ is the maximum Doppler frequency, $t_s$ is the sampling time, and $\mathcal{J}_o$ can be defined as $$\mathcal{J}_o(z) \triangleq \frac{1}{\pi}\int_0^\pi \cos(z\sin\theta)d\theta \quad (14)$$

The Doppler frequency $f_d$ is related to the user speed $\upsilon$ and carrier frequency $f_c$ as $f_d=\upsilon f_c/c$, where c is the speed of light. The Rayleigh fading channel can be generated using Jake's model.

For time-varying channels, a first-order random walk model can be adopted for the variation in the tap weight vector $\mathcal{W}_k^o$. The model assumes that $\mathcal{W}_k^o$ undergoes random variations of the form $$\mathcal{W}_{k+1}^o(i)=\mathcal{W}_k^o(i)+q_{k+1}(i) \quad (145)$$

where $q_k(i)=[f_L(i)q_k^F(i)f_L(i)q_k^B(i)]^T$ and $f_L(i)$ is the $i^{th}$ row of partial (M×L) DFT matrix. $q_k^F(i)$ and $q_k^B(i)$ are the time-domain random column vectors of length L with zero mean and correlation matrix $Q_t=(1-\mathcal{R}^2(1))I_L$ as described in A. H. Sayed, *Fundamentals of Adaptive Filtering*. New York: Wiley, 2003. Assuming that $q_k^F(i)$ and $q_k^B(i)$ are independent and noting that $f_L(i)f_L(i)^H=L/M$, the covariance matrix of $q_k(i)$, $i=1,\ldots,M$, is $$Q = \frac{L}{M}(1-\mathcal{R}^2(1))I_{2L}.$$

Now, defining $\mathcal{W}_k^o(i)-\mathcal{W}'_k(i)=\tilde{\mathcal{W}}'_k(i)$, the energy conservation relation of equation (132) becomes $$\|\mathcal{W}_{k+1}^o(i)-\mathcal{W}'_{k-1}(i)\|_\mathcal{P}^2+\bar{a}_{k+1}(i)|\xi_{k+1}^a(i)|^2=$$
$$\|\mathcal{W}_{k+1}^o(i)-\mathcal{W}'_k(i)\|_\mathcal{P}^2+\bar{a}_{k+1}(i)|\xi_{k+1}^p(i)|^2 \quad (146)$$

where $\xi_{k+1}^p(i)=a_{k+1}(i)[\mathcal{W}_{k+1}^o(i)-\mathcal{W}'_{k+1}(i)]$ and $\xi_{k+1}^a(i)=a_{k+1}(i)[\mathcal{W}_{k+1}^o(i)-\mathcal{W}'_k(i)]$. Moreover, the random walk model of equation (146) allows $E\|\mathcal{W}_{k+1}^o(i)-\mathcal{W}'_k(i)\|_\mathcal{P}^2$ to be related to $E\|\tilde{\mathcal{W}}'_k(i)\|_\mathcal{P}^2$ as follows:

$$E\|\mathcal{W}_{k+1}^o(i)-\mathcal{W}_k^+(i)\|_{\mathcal{P}^{-1}}^2 = E\|\mathcal{W}_k^o(i)+q_{k+1}(i)-\mathcal{W}'_k(i)\|_{\mathcal{P}^{-1}}^2 \quad (147)$$
$$= E\|\tilde{\mathcal{W}}'_k(i)+q_{k+1}(i)\|_{\mathcal{P}^{-1}}^2$$
$$= E\|\tilde{\mathcal{W}}'_k(i)\|_{\mathcal{P}^{-1}}^2 + \|q_{k+1}(i)\|_{\mathcal{P}^{-1}}^2$$

where the last step of equation (147) follows from the fact that $\mathcal{W}'_k(i)$ is independent of $q_{k+1}(i)$ and uses steady-state assumptions. Next taking the expectation of equation (146) results in $$E\|\tilde{\mathcal{W}}_{+1}(i)\|_\mathcal{P}^2+E\bar{a}_{k+1}(i)|\xi_{k+1}^a(i)|^2=E\|\tilde{\mathcal{W}}(i)\|_\mathcal{P}^2+$$
$$E\|q_{k+1}(i)\|_\mathcal{P}^2+E\bar{a}_{k+1}(i)|\xi_{k+1}^p(i)|^2 \quad (148)$$

Moreover, $q_{k+1}(i)$ is independent of $\mathcal{P}_{k+1}(i)$, so that $$E\|q_{k+1}(i)\|_{\mathcal{P}^{-1}}^2 = \quad (149)$$
$$Tr\ E\{q_{k+1}(i)^H\mathcal{P}^{-1}q_{k+1}(i)\} = Tr\{Q\mathcal{P}^{-1}\} = \frac{1}{(1-\lambda)}Tr\{QR_\mathcal{A}\}$$

Solving equation (148) as solved in the steady-state analysis described previously and using equation (149), in the a time-varying environment, the MSE of the RLS AFD-DFE can be represented as $$J'_{ss}(i) = J_D(i) + \frac{2(1-\lambda)J_{DFE}(i)+\frac{1}{(1-\lambda)}Tr\{QR\}}{2-2(1-\lambda)} \quad (150)$$
$$= \frac{J_D(i)}{\lambda} + \frac{Tr\{QR\}}{2\lambda(1-\lambda)}$$

According to certain embodiments, the computational complexity of the AFD-DFE for SISO SC-FDMA systems can be compared to the MMSE DFE described in C. Zhang, Z. Wang, Z. Yang, J. Wang, and J. Song, "Frequency Domain Decision Feedback Equalization for Uplink SC-FDMA," *IEEE Transactions on Broadcasting*, vol. 56, pp. 253-257, June 2010, with perfect channel knowledge. The computational complexity can be determined in terms of a total number of real multiplication operations performed while computing the feedforward and feedback filter coefficients per block (one SC-FDMA block) for complex-valued data.

For example, for the matrices for $\mathcal{P}_{k+1}^1$ and $\mathcal{P}_{k+1}^2$ described by equations (55) and (56), respectively, 13M real multiplications are performed for $\mathcal{P}_{k+1}^1$ and $\mathcal{P}_{k+1}^2$, therefore 26M real multiplications are performed while computing $\mathcal{P}_{k+1}$. In addition, 16M real multiplications are performed when computing $\mathcal{P}_{k+1}(\mathcal{A}_{k+1}^H + \varepsilon_{k+1} - \alpha_{k+1}G^T)$ in equation (52) $\mathcal{A}$ and $\mathcal{P}_{k+1}\mathcal{A}_{k+1}^H \varepsilon_{k+1}$ in equation (53). Also, 8M multiplications are performed when computing the error term $\varepsilon_{k+1}$ in equation (47). Therefore, 50M multiplications are performed by the processing circuitry when computing the output of the AFD-DFE. For the MMSE DFE described in C. Zhang, Z. Wang, Z. Yang, J. Wang, and J. Song, "Frequency Domain Decision Feedback Equalization for Uplink SC-FDMA," *IEEE Transactions on Broadcasting*, vol. 56, pp. 253-257, June 2010, $20(M+1)N_I+2N_I+12M$ real multiplications are performed, where $N_I$ denotes the number of iterations for each block, and $N_I>1$ (the $N_I$ iterations are performed to solve the causality problem presented by equation (8), which is described in N. Benvenuto and S. Tomasin, "Iterative Design and Detection of a DFE in the Frequency Domain," *IEEE Transactions on Communications*, vol. 53, pp. 1867-1875, November 2005). Compared with the AFD-LE, the number of computations performed by the AFD-DFE is doubled due to the feedback filter. In addition, the AFD-LE does not perform the iterative procedure that is performed by the AFD-DFE.

The AFD-DFE is also computationally efficient for MIMO SC-FDMA systems as compared to the MIMO MMSE DFE described by B. Dhivagar, K. Kuchi, and K. Giridhar, "An iterative MIMO-DFE receiver with MLD for uplink SC-FDMA," *National Conference on Communications (NCC)*, pp. 1-4, February 2013, the entire contents of which is incorporated by reference in its entirety, that performs matrix inversions. The number of real multiplications performed for the MIMO AFD-DFE described herein (assuming equal numbers of transmit and receive antennas) are described as follows. For example, for the matrices for $\mathcal{P}_{k+1}^1$ and $\mathcal{P}_{k+1}^2$, $9N_t^3M+5N_t^2M+N_tM$ real multiplications are performed, therefore, $18N_t^3M+10N_t^2M+2N_tM$ multiplications are performed when computing $\mathcal{P}_{k+1}$. Also, $8N_t^2M$ multiplications are performed when computing the error term $\varepsilon_{k+1}$. An additional $8N_t^3M+8N_t^2M$ real multiplications are also performed when calculating the equalizer weights $\mathcal{W}_{k+1}$.

When computing the output for the MIMO AFD-DFE, $26N_t^3M+26N_t^2M+2N_tM$ real multiplications are performed. In the case of the MIMO MMSE DFE, the number of multiplications performed for the matrix inversions can be estimated based on an approach described in G. H. Golub and C. F. Van Loan, *Matrix Computations*. Johns Hopkins University Press, 4th ed., 2013, the entire contents of which is herein incorporated by reference. Table III summarizes the real multiplications of the AFD-DFE and the MMSE DFE for complex valued data.

Figure 9:
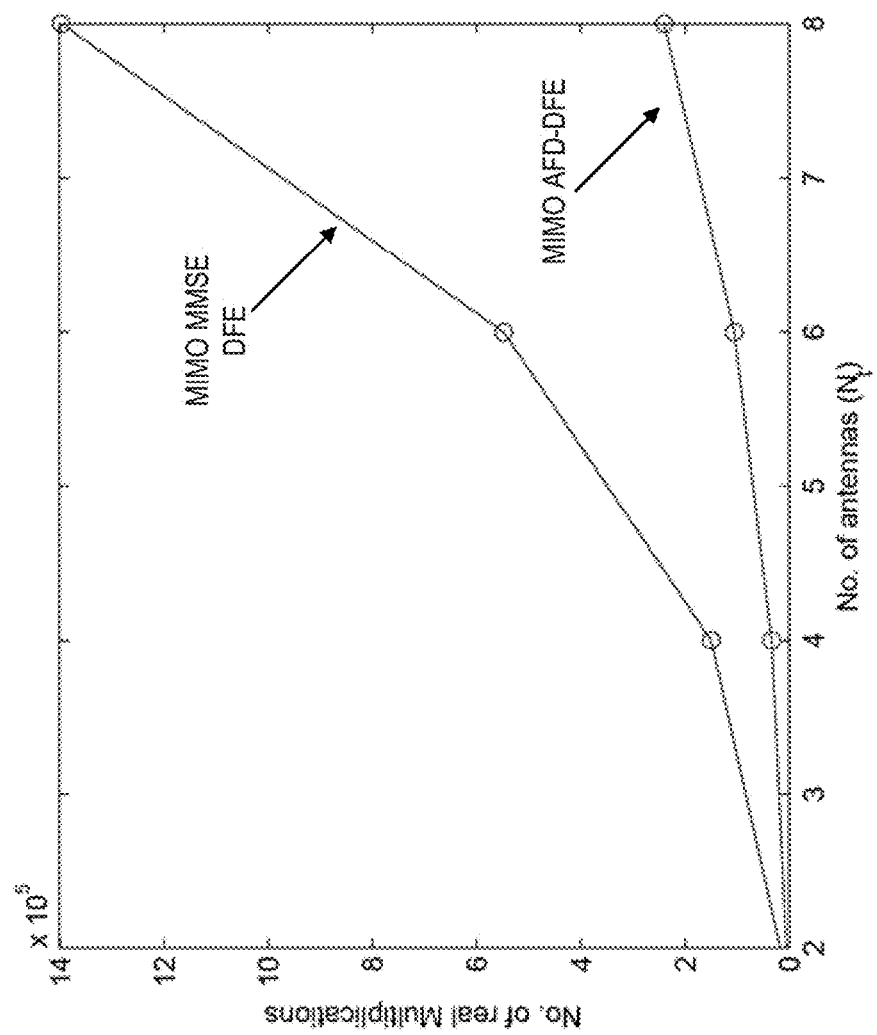
FIG. 9 is an exemplary graph that illustrates computation complexity for an AFD-DFE, according to certain embodiments.

FIG. 9 is an exemplary graph that shows that the computational complexity of the AFD-DFE is less than that of the MMSE DFE for $N_I=4$ (N. Benvenuto and S. Tomasin, "Iterative Design and Detection of a DFE in the Frequency Domain," *IEEE Transactions on Communications*, vol. 53, pp. 1867-1875, November 2005, also describes that $N_I>4$ does not increase performance of the MMSE DFE). In addition, the AFD-DFE described herein does not depend on channel estimation, which can also be referred to as channel state information (CSI). In the computational complexity determinations shown in Table III and FIG. 9, a known channel is assumed. Because the MMSE DFE depends on channel estimation, the overall complexity will be further increased. Also, pilots may be needed for the MMSE DFE to estimate the channel, which may also increase overhead.

TABLE III

Computational complexity of the AFD-DFE and MMSE DFE

| | Structure | Real Multiplications |
| --- | --- | --- |
| SISO | AFD-DFE | 50M |
| | MMSE DFE [16](with known channel) | $20(M + 1)N_I + 2N_I + 12M$ |
| MIMO | AFD-DFE | $26N_t^3M + 26N_t^2M + 2N_tM$ |
| | MMSE DFE [27](with known channel) | $8MN_t^3 - (20N_I)/3 - 6N_IN_t^2 + (62N_IN_t^3)/3 + (4N_IN_t^4)/3 + 2N_t^2 + 2N_t^3 + (20N_IN_t)/3 + (20MN_IN_t)/3 - 6MN_IN_t^2 + (86MN_IN_t^3)/3 + (4MN_IN_t^4)/3$ |

Next, the theoretical findings for the constrained AFD-DFE described herein can be validated through simulation. Like LTE systems, the carrier frequency and bandwidth can be set to 2 GHz and 5 MHz, respectively. Other simulation parameters are M=64 and N=1024, therefore, a maximum number of users that the system can support may be K=16. A Quadrature Phase shift Keying (QPSK) modulation scheme may be used, and the channel is frequency selective with 12-paths with each path fading independently, according to the Rayleigh distribution.

Figure 10:
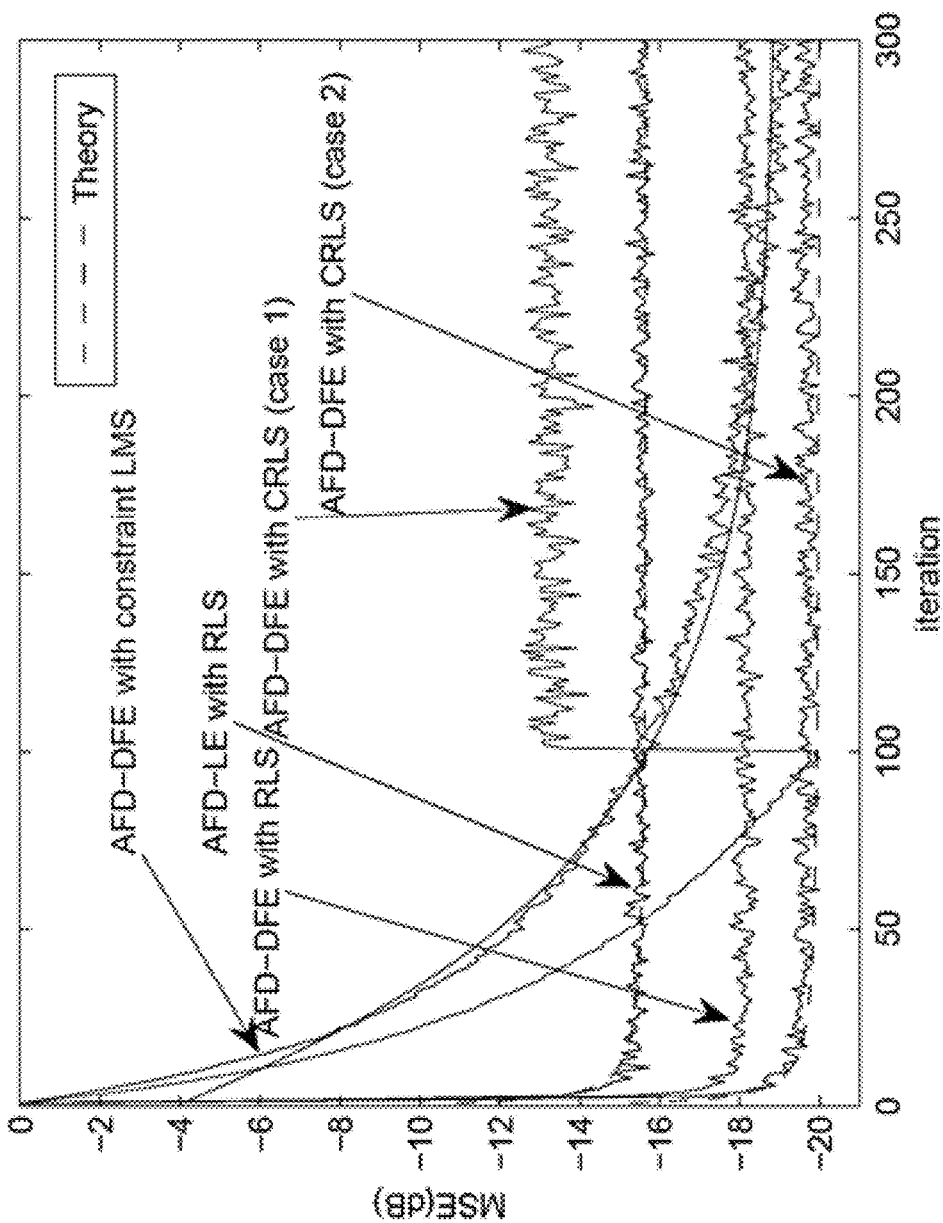
FIG. 10 is an exemplary graph illustrating performance of AFD-DFE algorithms, according to certain embodiments.

FIG. 10 is an exemplary graph depicting performance of the AFD-DFE algorithms described herein, according to certain embodiments. As can be seen in FIG. 10, best performance can be obtained through the use of the AFD-DFE with constraint for Case 2 of the AFD-DFE, while the worst performance is obtained by the AFD-DFE with constraint for Case 1 of the AFD-DFE. In some implementations, case 2 performs best because the input correlation matrix for the feedforward filter is unaffected by the decision errors. In addition, FIG. 10 also illustrates that in Case 1, when the AFD-DFE is switched to decision-directed mode at approximately 100 iterations, the MSE increases to be higher than the MSE for the other illustrated methods. In addition, the computational complexity of the AFD-DFE (Case 1) is higher than that of the AFD-LE but leads to an increased performance. Also, FIG. 10 shows that the performance of the RLS-based AFD-DFE performs better than that of the LMS-based AFD-DFE in terms of convergence speed and MSE. The RLS AFD-DFE converges after fifteen iterations, which can reduce an impact of complexity and latency increase due to adaptation. FIG. 10 also depicts the theoretical curves and close agreement between the theoretical findings and simulations. For example, the theoretical curve of AFD-DFE assumes perfect decisions. For FIGS. 11-18, the simulation results for the Case 2 AFD-DFE are used.

Figure 11:
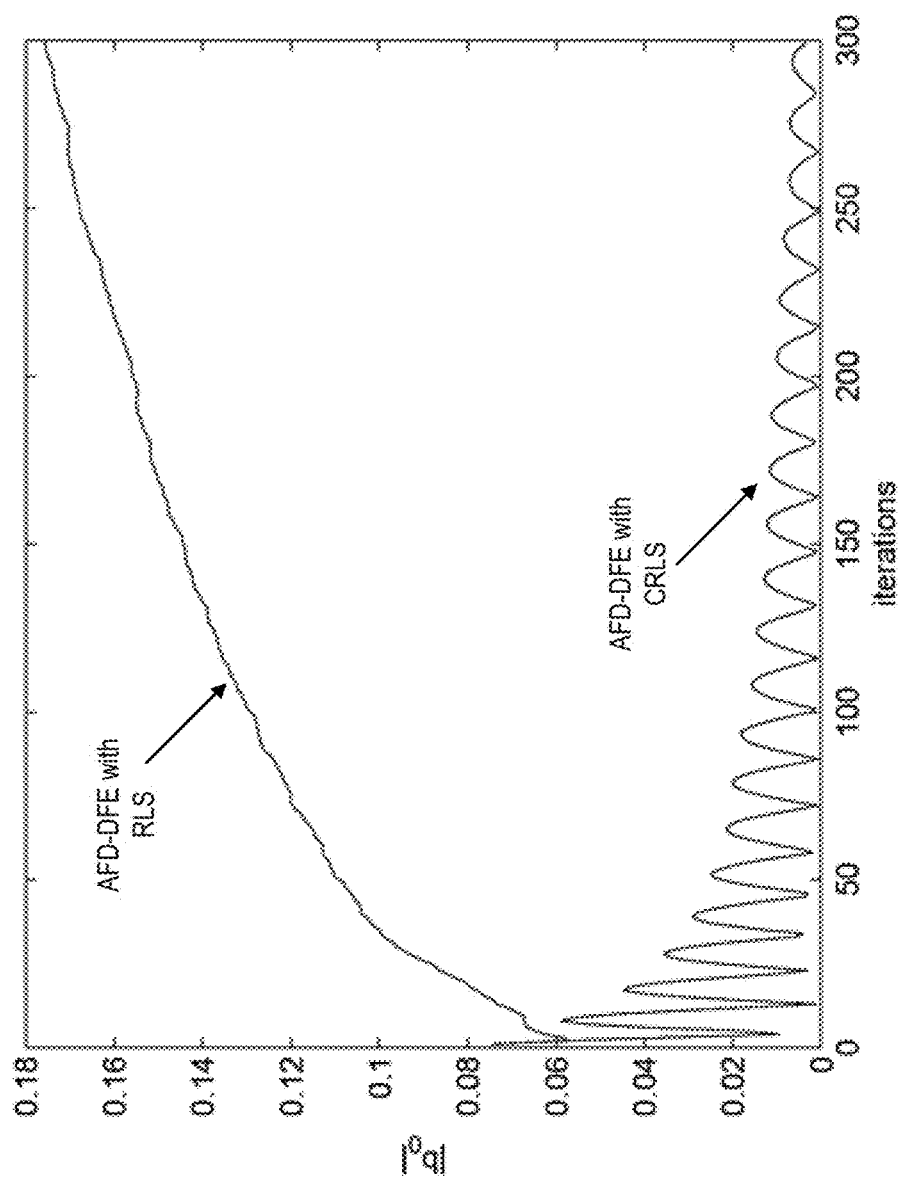
FIG. 11 is an exemplary graph of simulation results for a CRLS AFD-DFE, according to certain embodiments.

FIG. 11 is an exemplary graph of CRLS and RLS performance, according to certain embodiments. Since in CRLS, $b_0$ is closer to zero than in RLS helps ensures that the present symbol is not being canceled out.

Figure 12:
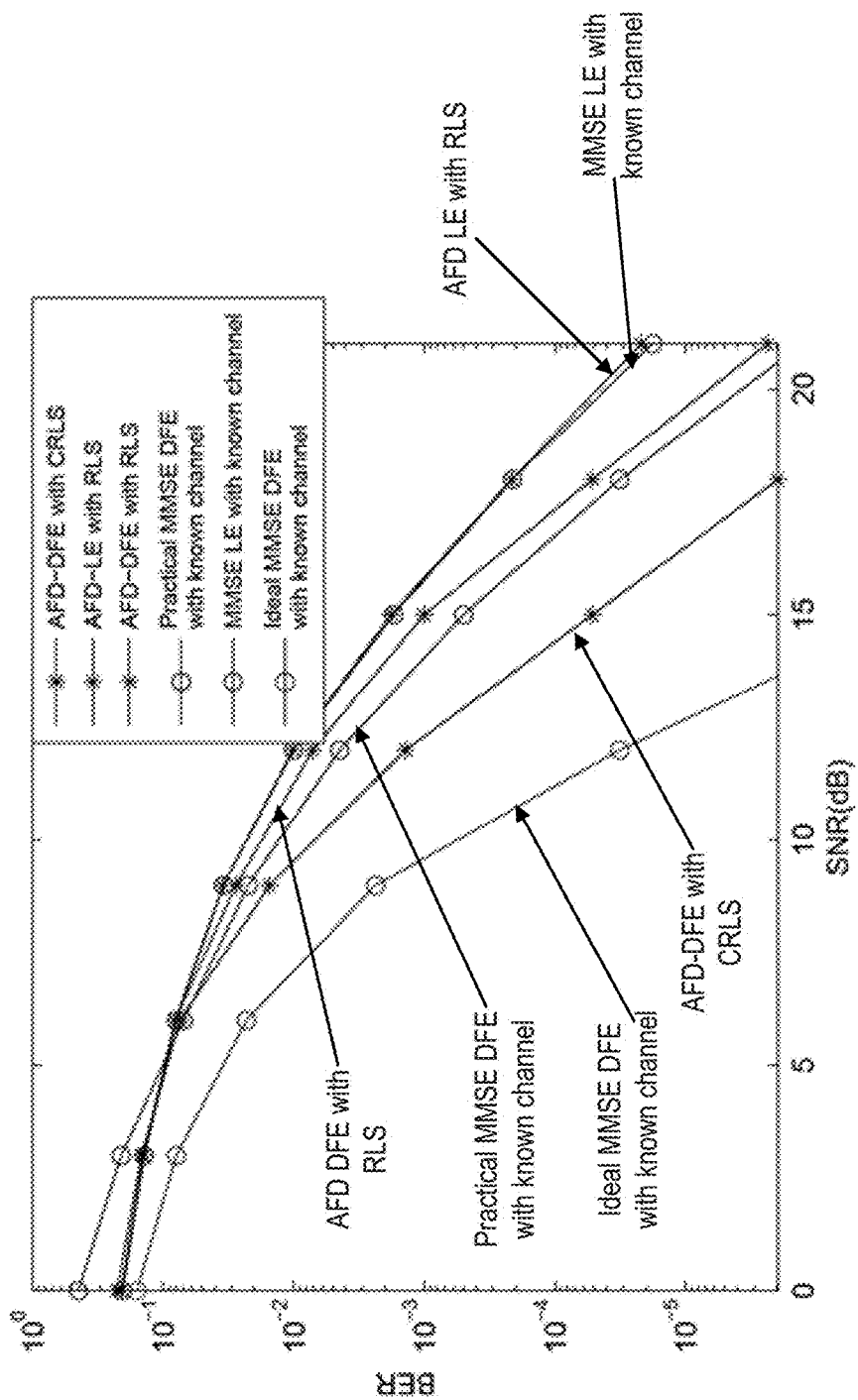
FIG. 12 is an exemplary graph illustrating performance of AFD-DFEs, according to certain embodiments.

FIG. 12 is an exemplary graph of Bit Error Rate (BER) performance of the AFD-DFE, according to certain embodiments. As illustrated in FIG. 12, the AFD-DFE with CRLS outperforms the RLS-based AFD-DFE, practical MMSE DFE and MMSE LE with known channel in terms of BER. In addition, minimal error propagation in the AFD-DFE occurs, which is unlike the practical MMSE DFE of C. Zhang, Z. Wang, Z. Yang, J. Wang, and J. Song, "Frequency Domain Decision Feedback Equalization for Uplink SC-FDMA," IEEE Transactions on Broadcasting, vol. 56, pp. 253-257, June 2010 and N. Benvenuto and S. Tomasin, "Iterative Design and Detection of a DFE in the Frequency Domain," IEEE Transactions on Communications, vol. 53, pp. 1867-1875, November 2005, with a known channel, which has a higher error propagation due to poor estimation of the correlation between the transmitted data and the decisions. Moreover, as can be seen from FIG. 12, the performance of the constraint-based RLS AFD-DFE corresponds to that of an ideal MMSE DFE as described in C. Zhang, Z. Wang, Z. Yang, J. Wang, and J. Song, "Frequency Domain Decision Feedback Equalization for Uplink SC-FDMA," IEEE Transactions on Broadcasting, vol. 56, pp. 253-257, June 2010, with a known channel.

Figure 13:
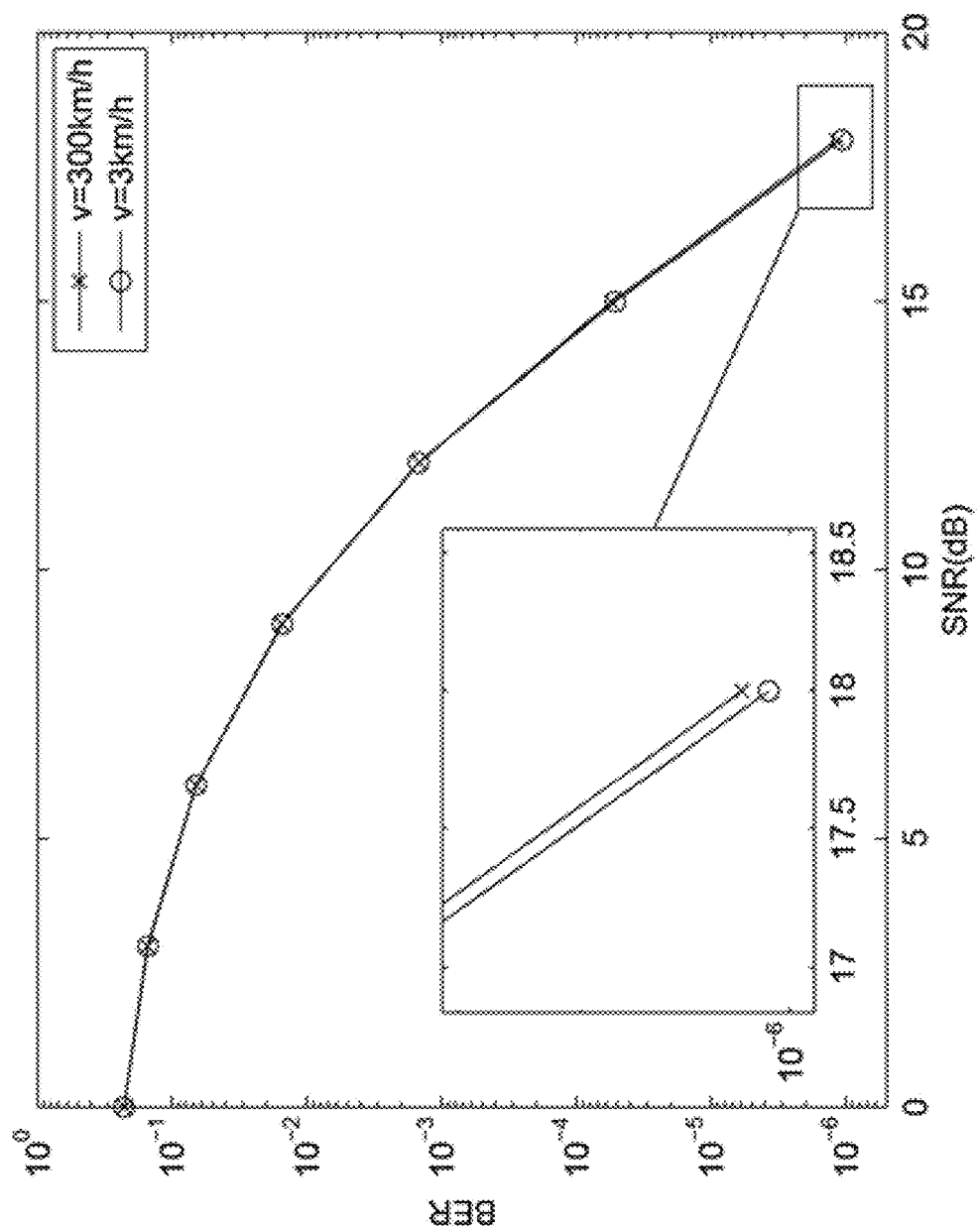
FIG. 13 is an exemplary graph illustrating an effect of Doppler on the AFD-DFE, according to certain embodiments.
Figure 14:
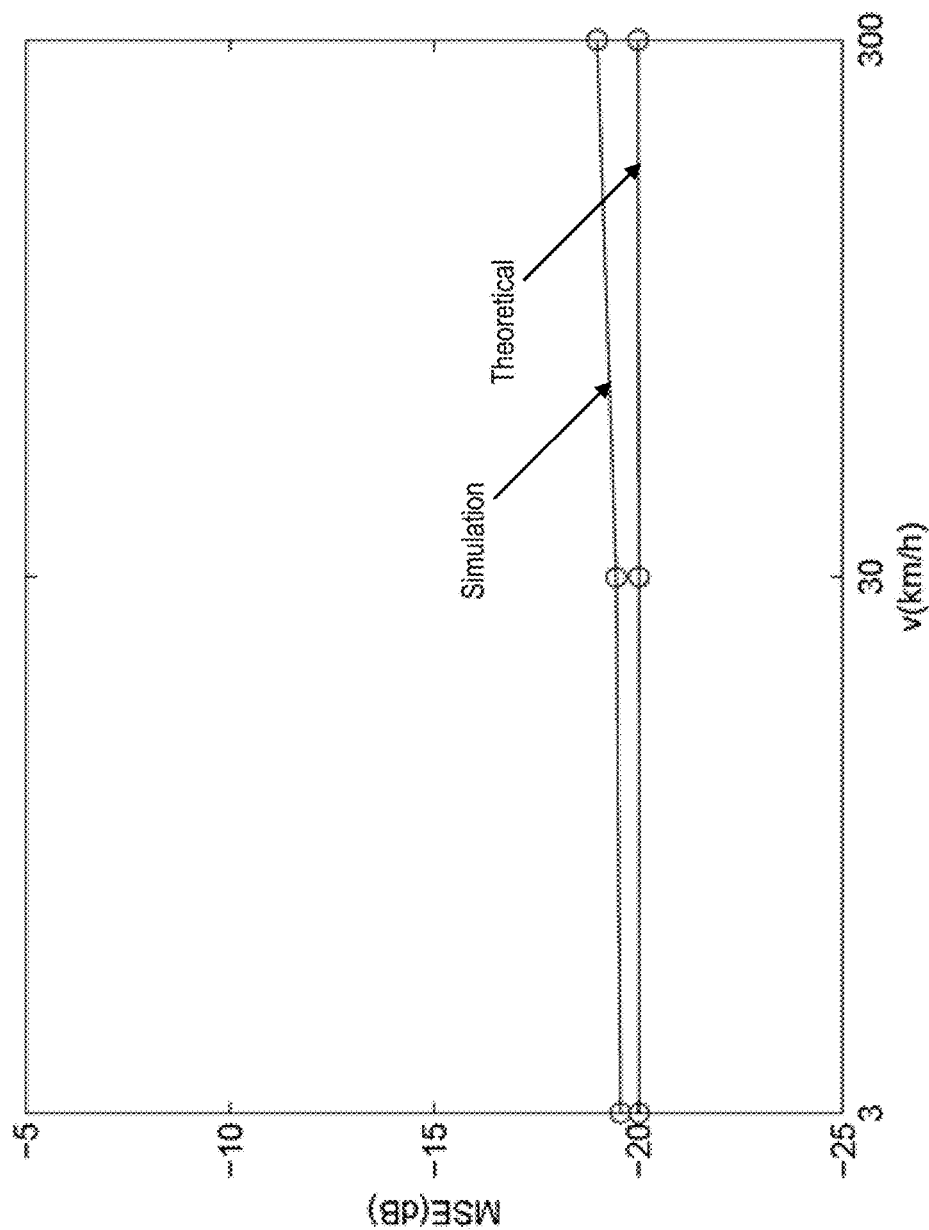
FIG. 14 is an exemplary graph illustrating an effect of Doppler on the AFD-DFE, according to certain embodiments.

In addition, the effect of the Doppler on the SC-FDMA system is illustrated in FIGS. 13 and 14. For this scenario, speed of the user v is varied from 3 km/h to 300 km/h. As can be observed from these two figures, our proposed RLS AFD-DFE is robust to the Doppler Effect. FIG. 14 depicts the theoretical and simulated MSE for different user's velocities, which can apply to both the constrained and unconstrained RLS AFD-DFE.

Figure 15:
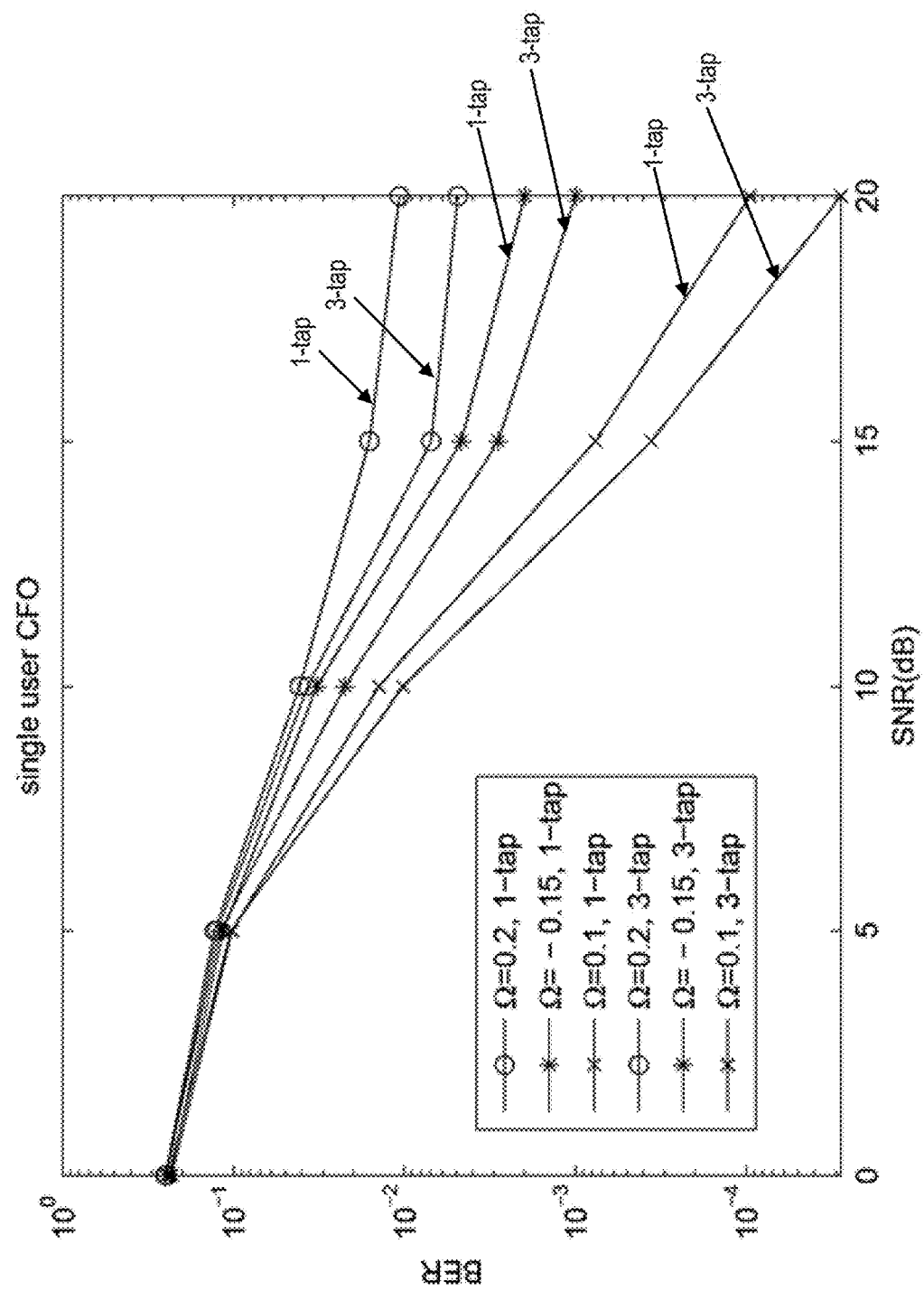
FIG. 15 is an exemplary graph illustrating performance of an AFD-DFE in the presence of CFO, according to certain embodiments.

FIG. 15 is an exemplary graph of SC-FDMA system performance under effect of CFO, according to certain embodiments. For example, if a slip in the frequency occurs, meaning that the transmitter and receiver are no longer synchronized, then the performance of the AFD-DFE can degrade. FIG. 15 shows that the performance of a 3-tap AFD-DFE is better than that of a 1-tap AFD-DFE in large CFO, which can illustrate that the 3-tap AFD-DFE may be more robust to the ICI.

Figure 16:
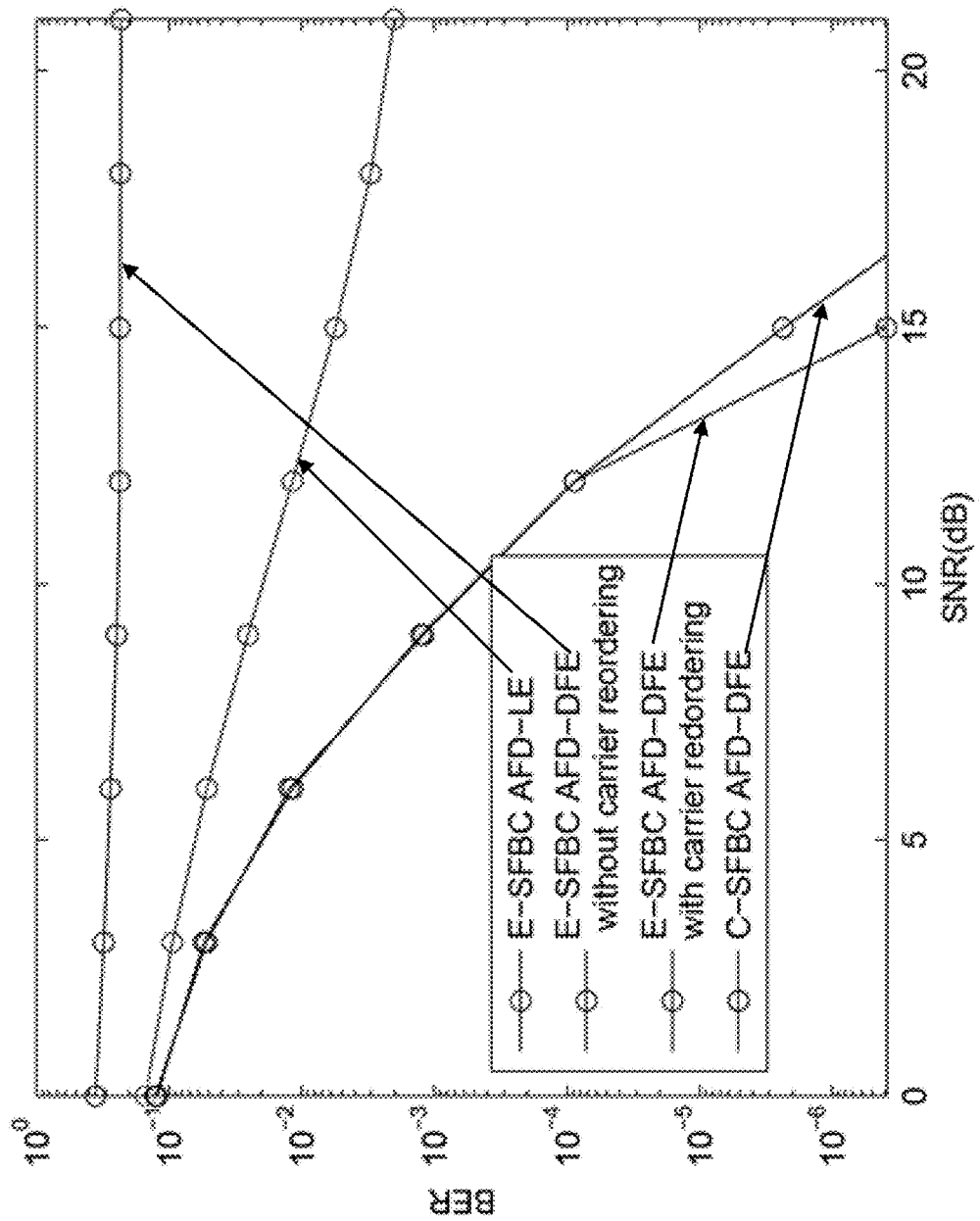
FIG. 16 is an exemplary graph illustrating embedded-SFBC and conventional-SFBC performance results, according to certain embodiments.

For SFBC SC-FDMA system, independent 12-path Rayleigh fading channels can be used for each transmit/receive antenna pair. FIG. 16 is an exemplary graph of a comparison between E-SFBC and C-SFBC. For example, FIG. 16 shows that performance of E-SFBC with reordering is better than without reordering. Also, E-SFBC outperforms C-SFBC at higher SNRs.

Figure 17:
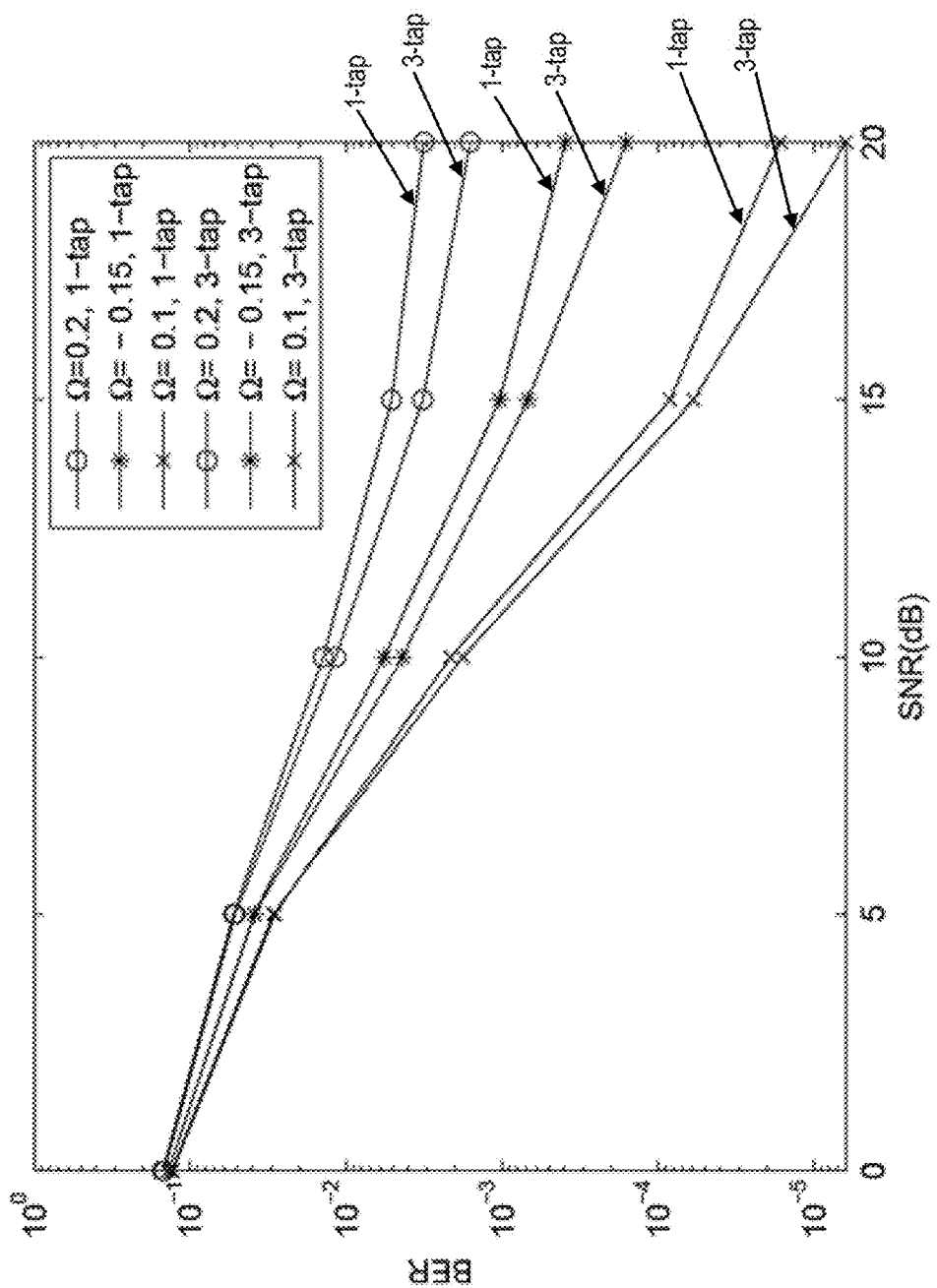
FIG. 17 is an exemplary graph illustrating embedded-SFBC performance results in the presence of CFO, according to certain embodiments.
Figure 18:
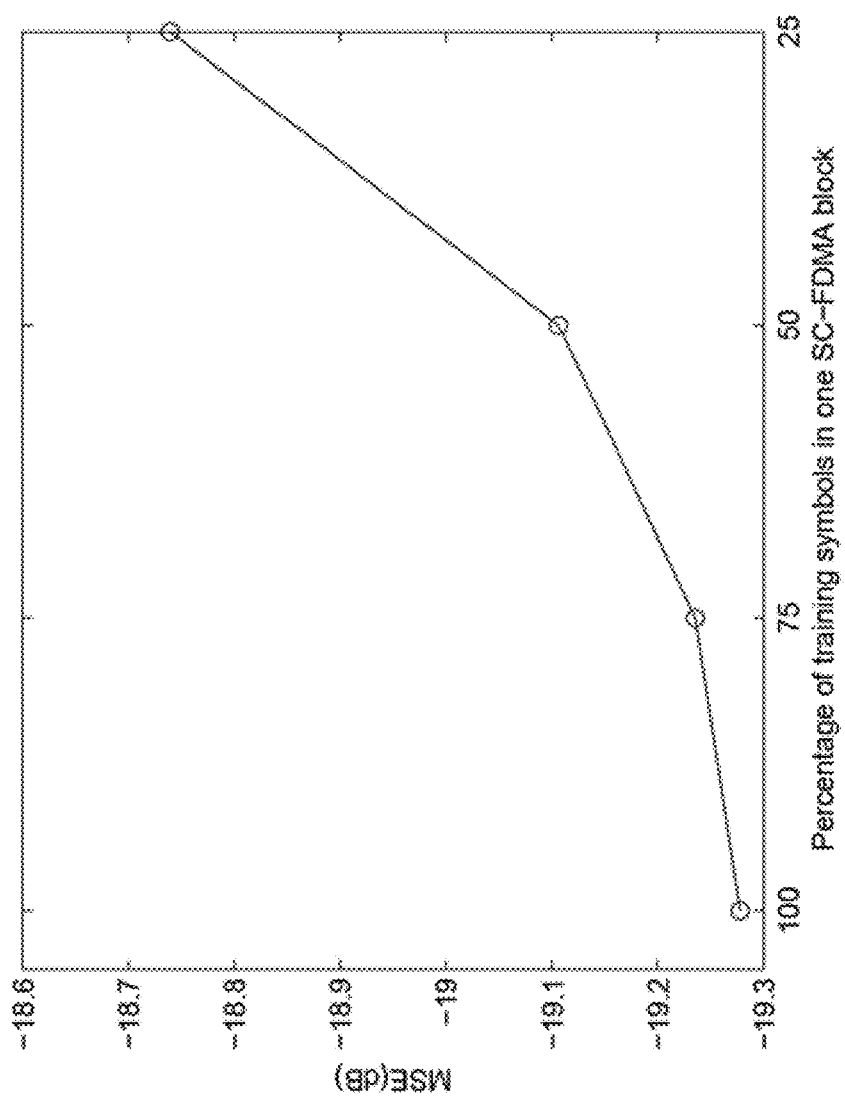
FIG. 18 is an exemplary graph illustrating performance based on percentage of training signals per SC-DFMA block, according to certain embodiments.

FIG. 17 is an exemplary graph of E-SFBC performance under CFO, according to certain embodiments. With CFO, the 3-tap AFD-DFE has a better performance than 1-tap AFD-DFE. FIG. 18 is an exemplary graph showing the effect of a number of training symbols on MSE for the AFD-DFE. As can be seen from FIG. 18, if 25 percent of symbols in one SC-FDMA block are used for training and rest are used for data during the training phase, then the reduction in MSE may be insignificant. In this way we can reduce the overhead can be reduced by not sending all of the symbols in SC-FDMA block as training during training mode.

Next, the theoretical findings for the unconstrained AFD-DFE described herein can be validated through simulation. Like LTE systems, the carrier frequency and bandwidth can be set to 2 GHz and 5 MHz, respectively. Other simulation parameters are M=16 and N=512, therefore, a maximum number of users that the system can support may be K=32. A Quadrature Phase shift Keying (QPSK) modulation scheme may be used, and the channel is frequency selective with 12-paths with each path fading independently, according to the Rayleigh distribution. For FIGS. 19 to 22, the user velocity v can be set to 3 km/h.

Figure 19:
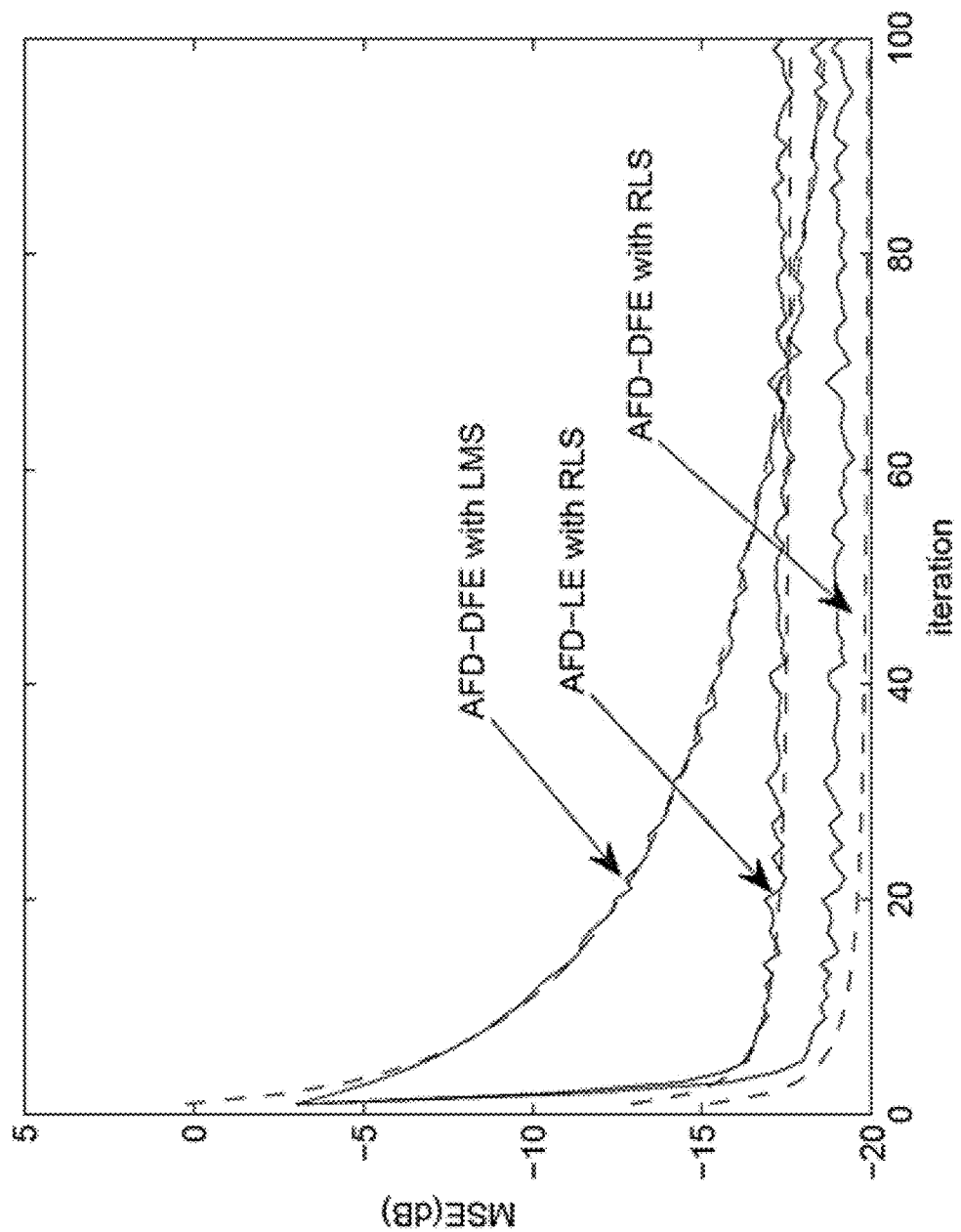
FIG. 19 is an exemplary graph illustrating performance of AFD-DFE algorithms, according to certain embodiments.

FIG. 19 is an exemplary graph of learning curves for LE and DFE in unconstrained SC-FDMA systems, according to certain embodiments. In one implementation, interleaved mapping is assumed with no CFO, and the SNR is set to 20 dB. As can be seen in FIG. 19, the AFD-DFE outperforms the AFD-LE in this scenario where more than 18 dB gain in MSE is achieved. More importantly, both equalizers have convergence speeds that are approximately equal. The computational complexity of the AFD-DFE is higher than that of the AFD-LE but provides an increase in performance as compared to the AFD-LE. Also, FIG. 19 shows that the RLS-based AFD-DFE has a better performance than that of the LMS-based AFD-DFE with respect to convergence speed and MSE. Convergence is achieved for the RLS after fifteen iterations are performed; which may counteract the resulting complexity and latency increases due to adaptation. FIG. 19 also depicts the theoretical curves for the three algorithms (AFD-DFE with LMS, AFD-LE with RLS, and AFD-DFE with RLS) which shows that the simulation results correspond to the theoretical results. In addition, the theoretical curve of the DFE assumes perfect decisions.

Figure 20:
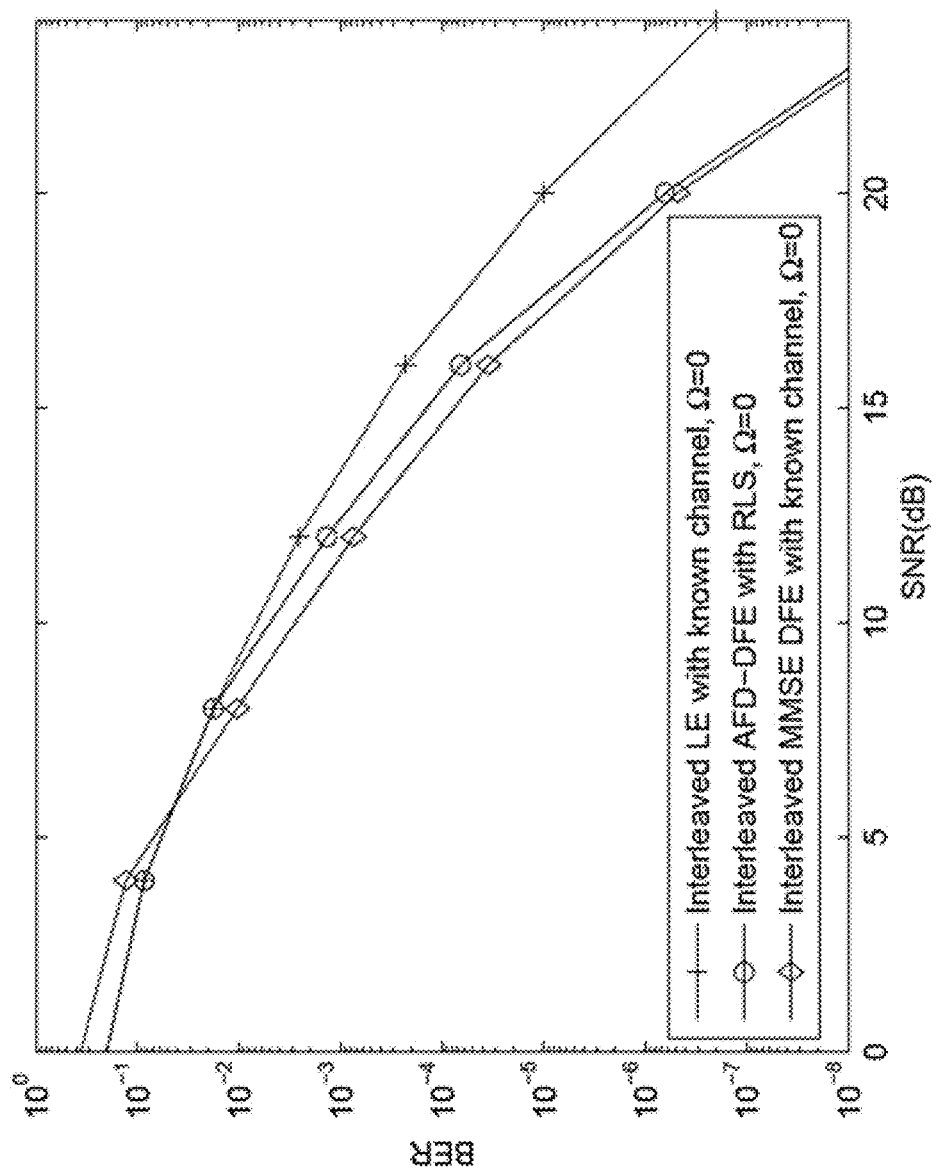
FIG. 20 is an exemplary graph illustrating performance of AFD-DFEs, according to certain embodiments.

FIG. 20 is an exemplary graph of performance of the AFD-DFE, according to certain embodiments. For example, the Bit Error Rate (BER) performance of the AFD-DFE with RLS, the MMSE DFE, and the LE are shown. The AFD-DFE with RLS outperforms the LE with known channel with respect to BER. Also, the performance of the MMSE-DFE described by C. Zhang, Z. Wang, Z. Yang, J. Wang, and J. Song, "Frequency Domain Decision Feedback Equalization for Uplink SC-FDMA," IEEE Transactions on Broadcasting, vol. 56, pp. 253-257, June 2010, the entire contents of which is incorporated by reference in its entirety and N. Benvenuto and S. Tomasin, "Iterative Design and Detection of a DFE in the Frequency Domain," IEEE Transactions on Communications, vol. 53, pp. 1867-1875, November 2005, the entire contents of which is incorporated by reference in its entirety, with known channel is worst at low SNRs, which may be due to poor estimation of the correlation between the transmitted data and the decisions. Furthermore, the reliability of the proposed AFD-DFE with RLS algorithm can be increased based on a selection of the initial value of the autocorrelation matrix for both the feedforward and feedback sections, which makes the performance of the AFD-DFE with RLS algorithm approach that of the linear equalizer at low SNR's. In addition, an assumption can be made that no constraint is put on the feedback filter unlike N. Benvenuto and S. Tomasin, "Iterative Design and Detection of a DFE in the Frequency Domain," IEEE Transactionson Communications, vol. 53, pp. 1867-1875, November 2005, B. Ng, C.-t. Lam, and D. Falco, "Turbo frequency-domain equalization for single-carrier broadband wireless systems," IEEE Transactions on Wireless Communications, vol. 6, pp. 759-767, February 2007 for SISO schemes and G. M. Guvensen and A. O. Yilmaz, "A General Framework for Optimum Iterative Blockwise Equalization of Single Carrier MIMO Systems and Asymptotic Performance Analysis," IEEE Transactions on Communications, vol. 61, pp. 609-619, February 2013 for MIMO schemes.

Figure 21:
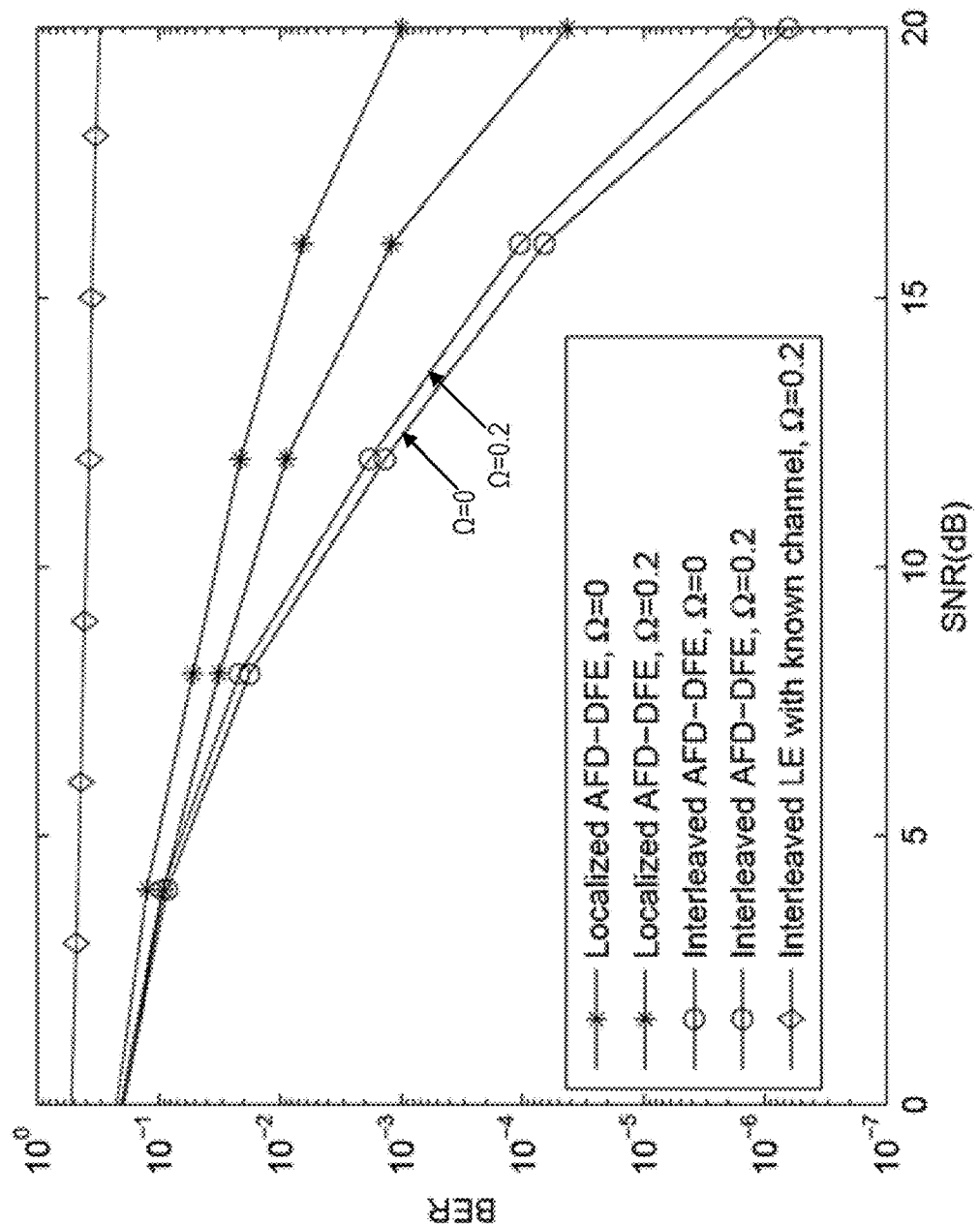
FIG. 21 is an exemplary graph illustrating performance of localized and interleaved AFD-DFEs in the presence of CFO, according to certain embodiments.

FIG. 21 is an exemplary graph of performance of localized and interleaved AFD-DFE, according to certain embodiments. As shown in FIG. 21, the performance of interleaved mapping can exceed the localized mapping because the localized mapping is sub-band dependent. For example, if a user is assigned a sub-band which approaches a deep null of the channel, then the performance may be reduced.

CFO, $\Omega$, can be detrimental to the performance of the AFD-DFE if a slip in frequency occurs and, therefore, can degrade the system's performance. FIG. 21 depicts the performance of the system under two different CFO's, $\Omega=0$ and $\Omega=0.2$ for a single user. Localized mapping can be more sensitive to CFO in the single user case due to interference from adjacent carriers, while there may be no significant performance loss in case of interleaved mapping in worst case ($\Omega=0.2$). Moreover, a clear gain in the performance of AFD-DFE over LE (with perfectly known channel) in case of $\Omega=0.2$, can be seen in the graph of FIG. 21. In the ensuing simulations described herein, the interleaved mapping technique is used due to performance results that do not depend on sub-band assigned to the user.

Figure 22:
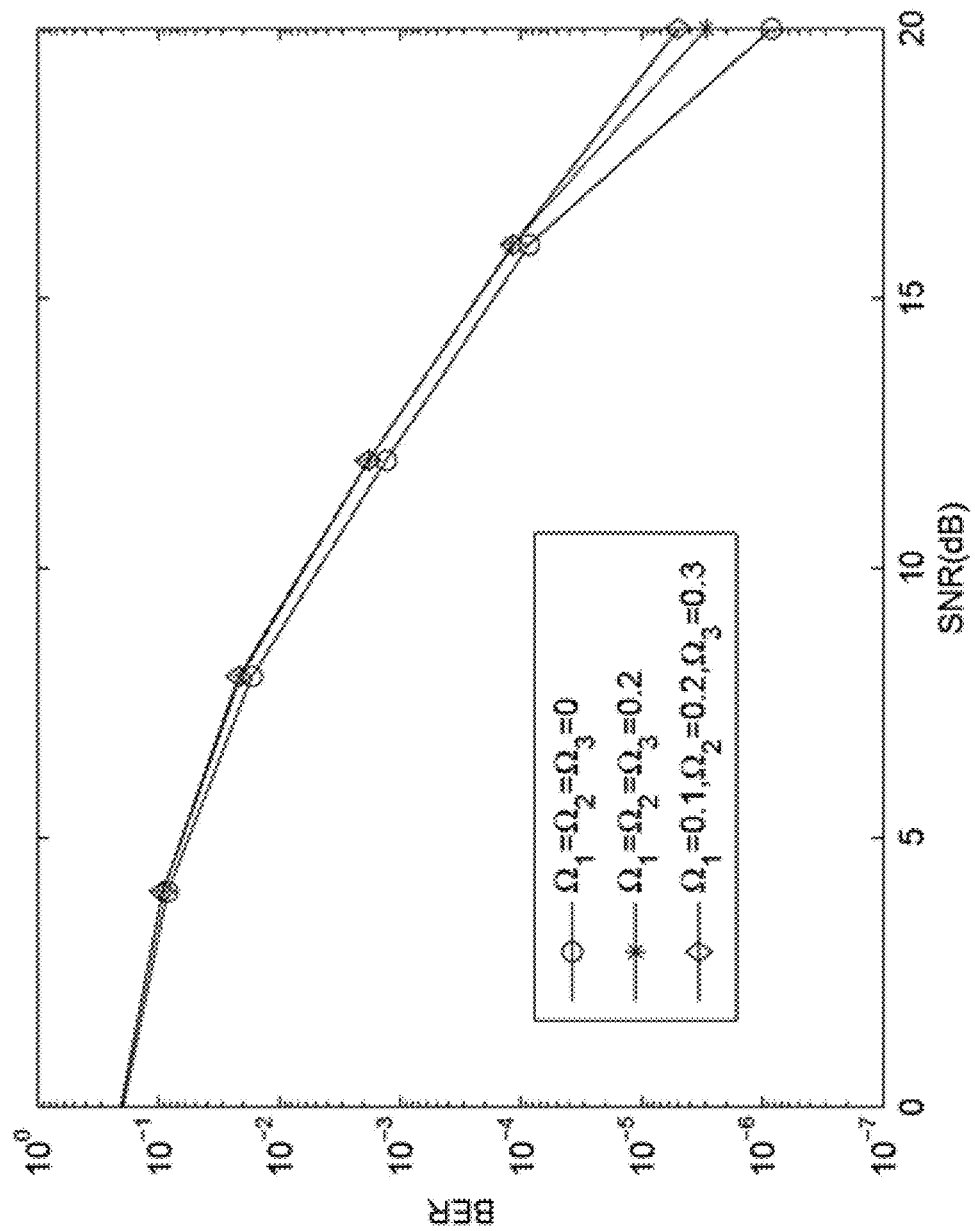
FIG. 22 is an exemplary graph illustrating performance of an AFD-DFE in the presence of CFO, according to certain embodiments.

FIG. 22 is an exemplary graph of AFD-DFE performance under CFO with three users, according to certain embodiments. For the case described by FIG. 22, the CFOs of user 1, user 2 and user 3 are denoted by $\Omega_1$, $\Omega_2$ and $\Omega_3$, respectively. FIG. 22 illustrates the robustness of the AFD-DFE to CFO due to how the performance of the AFD-DFE is maintained even with the worst case CFO of $\Omega_1=0.1$, $\Omega_2=0.2$, $\Omega_3=0.3$ as compared to the best case of $\Omega_1=\Omega_2=\Omega_3=0$, and the AFD-DFE can achieve predetermined performance levels in the presence of CFO. With CFO, the frequency-domain channel matrix is no longer diagonal. However, the three main diagonals of the frequency-domain channel matrix include a majority of the channel energy which means that most of the interference may occur between adjacent subcarriers. Since the simulations described herein have only three users, the users are not assigned adjacent subcarriers for the case of the distributed subcarrier allocation. More specifically, the distribution of the 512 subcarriers among the three users is done as follows: user 1=[1, 17, 33, 49, . . . , 241], user 2=[4, 20, 36, 52, . . . , 244], user 3=[7, 23, 39, 55, . . . , 247], which can mitigate the effect of CFO. However, as the number of users increases to where the system operates under full load conditions, CFO may be unavoidable because the freedom in assigning non-adjacent subcarriers to the users may be reduced.

Figure 23:
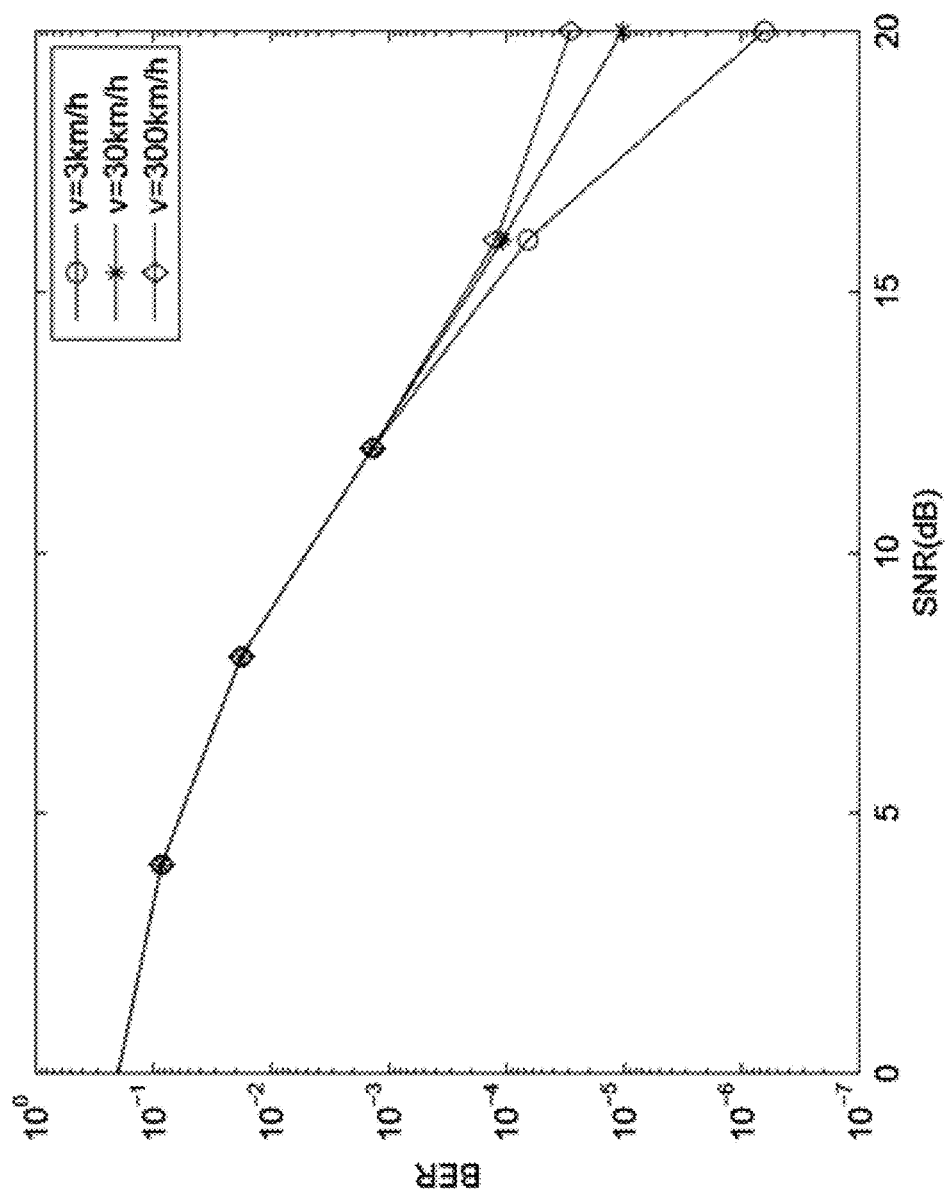
FIG. 23 is an exemplary graph illustrating an effect of velocity of AFD-DFE performance, according to certain embodiments.
Figure 24:
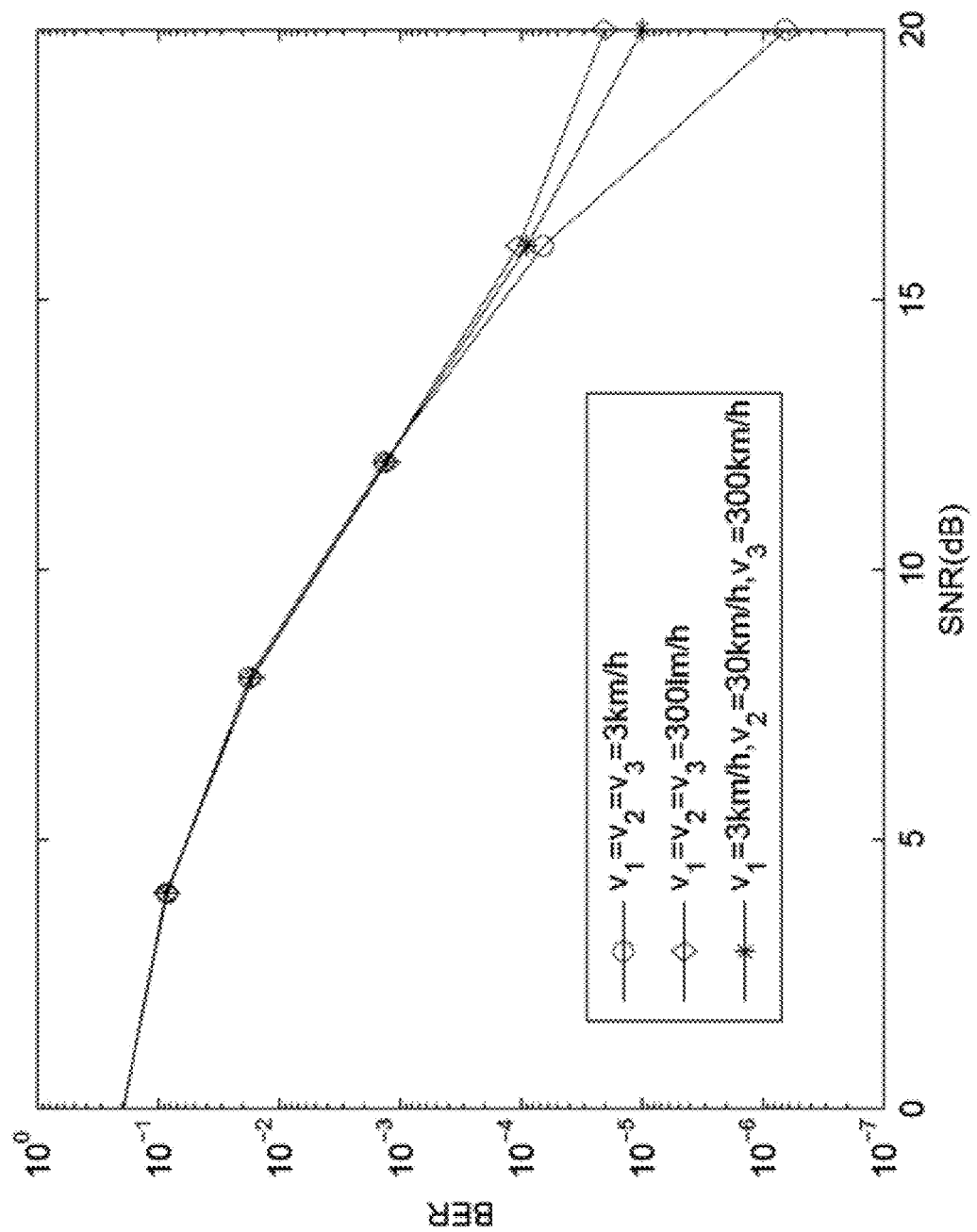
FIG. 24 is an exemplary graph illustrating an effect of velocity of AFD-DFE performance, according to certain embodiments.

FIGS. 23 and 24 are exemplary graphs showing the effect of user velocity on system performance, according to certain embodiments. FIG. 23 illustrates the effect of the user velocity (v) on the system's performance for a single user, and FIG. 24 illustrates the effect of the user velocity (v) on the system's performance for three users. In addition, for purposes of the simulation, perfect transmitter/receiver oscillator's synchronization is assumed when evaluating the performance under Doppler Effect. Three velocities are chosen for comparison, e.g., low (3 km/h), medium (30 km/h) and high (300 km/h). For the case of three users in FIG. 24, unequal velocities are assigned to the users and these are $v_1$, $v_2$ and $v_3$ for user 1, user 2 and user 3, respectively. As can be observed from FIGS. 23 and 24, the RLS AFD-DFE described herein is robust to the Doppler Effect, and the RLS AFD-DFE can perform above a predetermined threshold when subjected to the Doppler Effect. However, as the SNR increases, the system performance deteriorates as the Doppler frequency increases due to interference from adjacent subcarriers.

Figure 25:
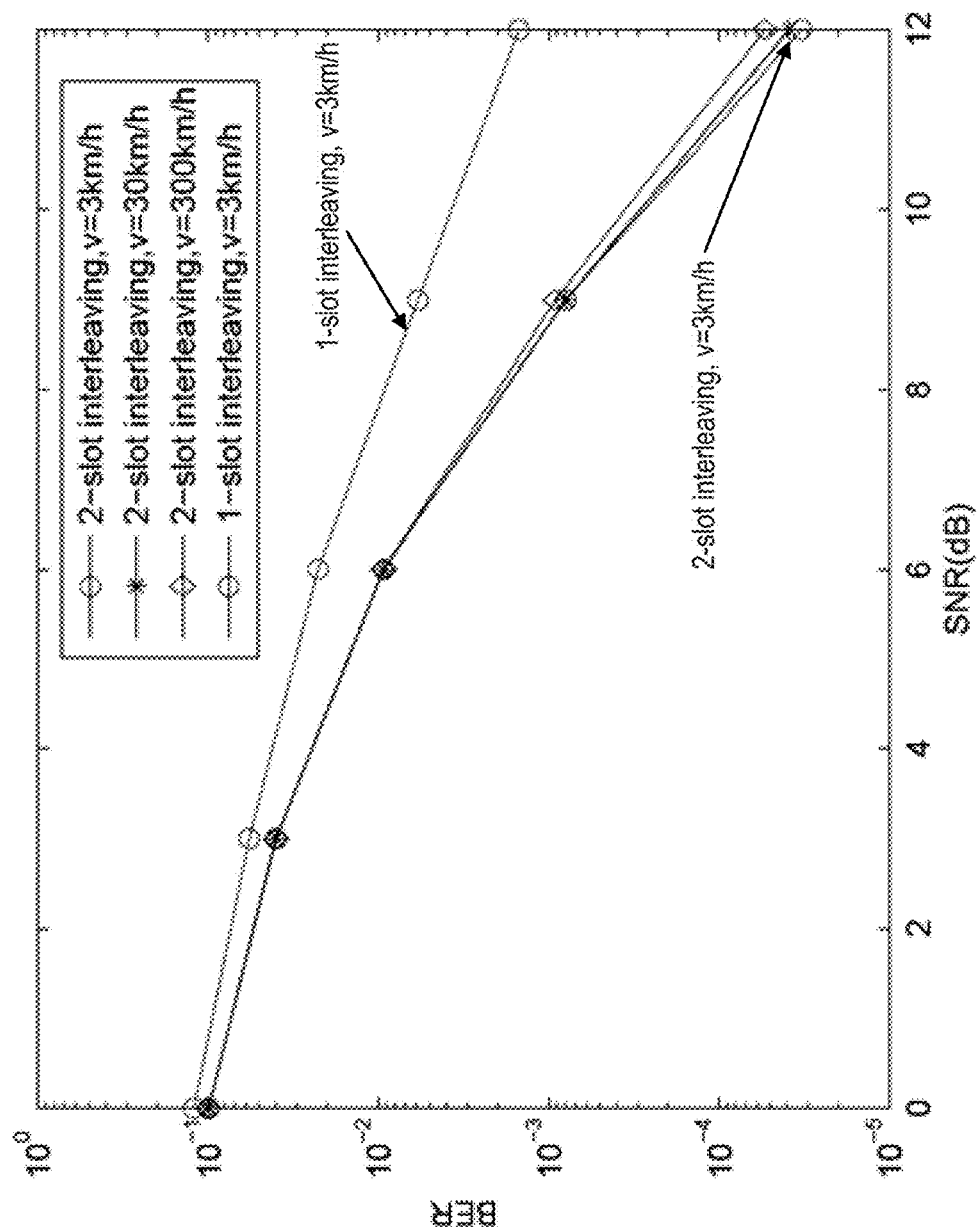
FIG. 25 is an exemplary graph illustrating an effect of interleaving on AFD-DFE performance, according to certain embodiments.
Figure 26:
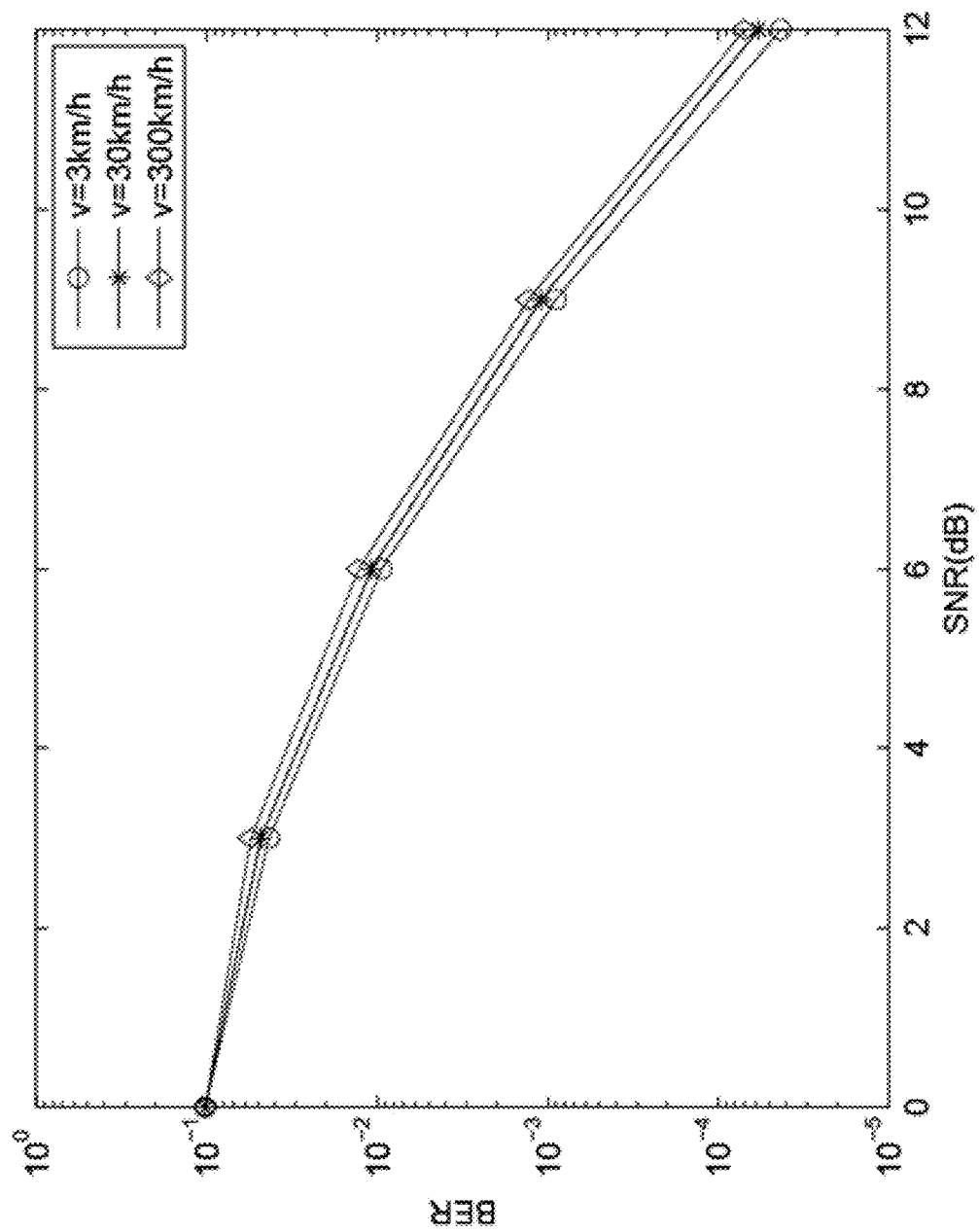
FIG. 26 is an exemplary graph illustrating an effect of velocity on AFD-DFE performance, according to certain embodiments.

FIG. 25 is an exemplary graph of the effect of user velocity on SFBC SC-FDMA systems, according to certain embodiments. In some implementations, a 2-slot interleave mapping is used where two consecutive subcarriers are assigned to one user and this is to satisfy $\Lambda_{io}=\Lambda_{ie}$ for i=1, 2 with an assumption that the channel does not change over two consecutive subcarriers. SFBC can be used with single user and the effect of the users's velocity on the system's performance is shown in FIG. 26. In MIMO scenarios, independent 6-path Rayleigh fading channels can be used for each transmit/receive antenna pair. FIG. 25 shows improvement in performance can be obtained through the use of SFBC with 2-slot interleaving.

In addition, the performance of a four-transmit/two-receive antenna scenario when three users share the same frequency band and time slot with three other different users, is shown in FIG. 26. All users can be assumed to be moving with equal velocities, v. From the FIG. 26, it can be seen that the AFD-DFE can separate co-channel users without sacrificing performance.

A system which includes the features in the foregoing description provides numerous advantages. The AFD-DFE equalization techniques described in the present disclosure have a better performance over other equalization techniques. Thus, the present disclosure provides an improvement to the technical field of communication. For example, it improves the performance of mobile phone and data terminals that use LTE standard. In addition, the present disclosure has the advantage of computational complexity of the equalizer. Thus, the present disclosure improve the functioning of the equalizer by increasing processing speed, decreasing power consumption and resulting in a chip area reduction.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A wireless device SC-FDMA communications system, comprising:
   a wireless device comprising a transmitter to transmit an RF signal, and a base station comprising a receiver to receive the RF signal, wherein the wireless device comprises circuitry configured to
   generate a plurality of signal matrices based on received signals,
   determine feedforward coefficients for an adaptive frequency-domain decision feedback equalizer (AFD-DFE) based in part on the signal matrices,
   generate a plurality of decision matrices based on transformed feedforward coefficients,
   determine feedback coefficients for the AFD-DFE based in part on the plurality of decision matrices,
   generate a first matrix having the plurality of signal matrices and the decision matrices,
   generate a second matrix including the feedforward coefficients and a third matrix including the feedback coefficients of the AFD-DFE,
   determine an equalizer output as a function of the first matrix, the second matrix and the third matrix such that the function includes adding a first product comprising the plurality of signal matrices premultiplied by a variation of the second matrix and a second product comprising the plurality of decision matrices being premultiplied by a variation of the third matrix, wherein the equalizer output is determined for Spatially-Multiplexed (SM) SC-FDMA signals;

update the feedforward and feedback coefficients of the AFD-DFE based on the equalizer output, equalize the received signals using the equalizer output, and decode the equalized signals;

wherein the circuitry is further configured to determine the feedforward and feedback coefficients based in part on a recursive least squares (RLS) calculation with at least one constraint, the at least one constraint is such that filter weights in time-domain are $b_0, b_1, \ldots b_L$, the filter weight $b_0$ corresponds to current symbol and is set to zero, and $b_1, \ldots b_L$ are weights corresponding to symbols other than the current symbol.

2. The wireless device SC-FDMA communications system of claim 1, wherein the circuitry is further configured to apply a three-tap AFD-DFE to the received signal.

3. The wireless device SC-FDMA communications system of claim 1, wherein the circuitry is further configured to operate in a reduced training mode wherein a number of symbols in a training signal used to update the feedforward and feedback filter coefficients of the AFD-DFE is reduced.

4. The wireless device SC-FDMA communications system of claim 1, wherein the circuitry is further configured to determine the equalizer output for Single-Input Single-Output (SISO) Single-Carrier Frequency Division Multiple Access (SC-FDMA) signals.

5. The wireless device SC-FDMA communications system of claim 1, wherein the circuitry is further configured to determine the equalizer output within a predetermined performance threshold when carrier frequency offset is present.

6. The wireless device SC-FDMA communications system of claim 1, wherein the circuitry is further configured to determine the equalizer output within a predetermined performance threshold when Doppler is present.

7. The wireless device SC-FDMA communications system of claim 1, wherein the circuitry is further configured to update the feedforward and feedback coefficients of the AFD-DFE by performing one or more scalar multiplications corresponding to at least one of a number of data symbols in the received signal and a number of transmit antennas.

* * * * *